US011996128B2

(12) United States Patent
Nakano et al.

(10) Patent No.: US 11,996,128 B2
(45) Date of Patent: May 28, 2024

(54) MAGNETIC TAPE CARTRIDGE, MAGNETIC TAPE DRIVE, DETECTION METHOD OF SERVO PATTERN, AND PROGRAM

(71) Applicant: FUJIFILM Corporation, Tokyo (JP)

(72) Inventors: Megumi Nakano, Kanagawa (JP); Atsushi Musha, Kanagawa (JP); Tetsuya Kaneko, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/050,716

(22) Filed: Oct. 28, 2022

(65) Prior Publication Data

US 2023/0135454 A1    May 4, 2023

(30) Foreign Application Priority Data

Oct. 29, 2021  (JP) ................................ 2021-178342

(51) Int. Cl.
*G11B 5/596*    (2006.01)
*G11B 5/02*     (2006.01)
*G11B 5/127*    (2006.01)
*G11B 5/584*    (2006.01)

(52) U.S. Cl.
CPC ............ *G11B 5/59688* (2013.01); *G11B 5/02* (2013.01); *G11B 5/1278* (2013.01)

(58) Field of Classification Search
CPC ... G11B 5/588; G11B 5/00826; G11B 5/5508; G11B 5/59638; G11B 5/584; G11B 5/59627; G11B 5/5965; G11B 5/59633
USPC ..................... 360/75, 77.06, 77.08
See application file for complete search history.

(56) References Cited

U.S. PATENT DOCUMENTS

| 6,542,325 | B1 | 4/2003 | Molstad et al. |
| 7,365,929 | B2 | 4/2008 | Cherubini et al. |
| 9,754,616 | B2 | 9/2017 | Biskeborn et al. |
| 11,017,805 | B2 * | 5/2021 | Kaneko ............. G11B 5/59638 |
| 2020/0273489 | A1 | 8/2020 | Kaneko et al. |
| 2021/0233558 | A1 | 7/2021 | Morita |

OTHER PUBLICATIONS

Extended European Search Report dated Mar. 22, 2023 in Application No. 22203828.3.

* cited by examiner

*Primary Examiner* — Nabil Z Hindi
(74) *Attorney, Agent, or Firm* — Sughrue Mion, PLLC

(57) ABSTRACT

A magnetic tape cartridge includes a magnetic tape in which a plurality of servo patterns are recorded along a longitudinal direction, and a storage medium that is configured to store servo format information including servo pattern inclination information which is information on an inclination of the servo pattern with respect to a first imaginary straight line.

22 Claims, 40 Drawing Sheets

FIG. 29
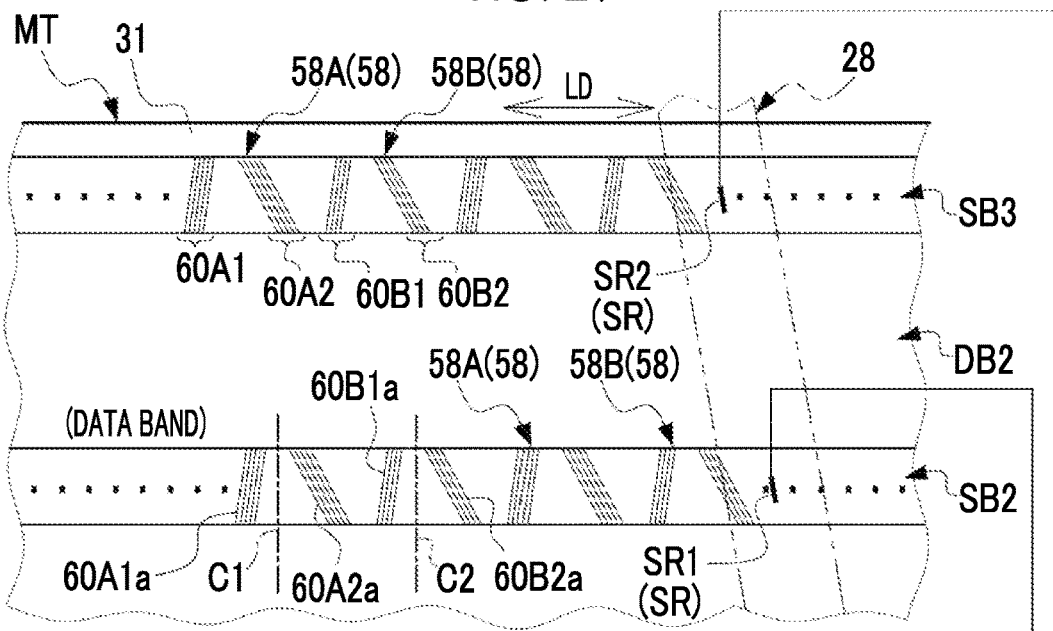
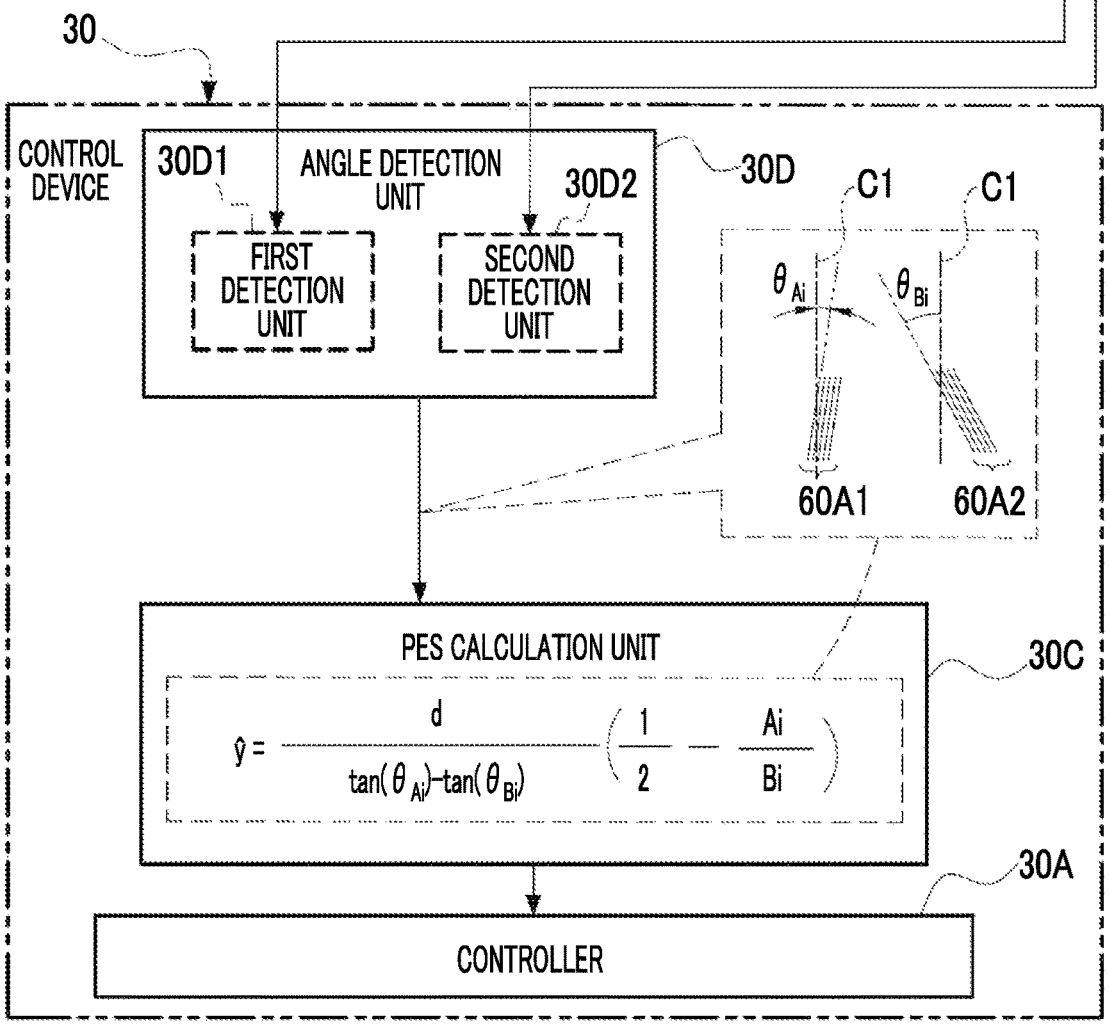

MAGNETIC TAPE CARTRIDGE, MAGNETIC TAPE DRIVE, DETECTION METHOD OF SERVO PATTERN, AND PROGRAM

CROSS-REFERENCE TO RELATED APPLICATION

This application claims priority from Japanese Patent Application No. 2021-178342, filed Oct. 29, 2021, the disclosure of which is incorporated herein by reference in its entirety.

BACKGROUND

Technical Field

The technology of the present disclosure relates to a magnetic tape cartridge, a magnetic tape drive, a detection method of a servo pattern, and a non-transitory storage medium storing a program.

Related Art

In U.S. Pat. No. 7,365,929B, it is disclosed to provide a fully synchronous servo channel for a data tape drive, which includes initial acquisition of synchronous servo channel parameters, generation of a timing basis for signal interpolation, generation of a tape velocity estimation value and a y-position estimation value, and optimum detection of longitudinal position (LPOS) symbols.

U.S. Pat. No. 9,754,616B discloses a device including at least two modules each having an array of converters, in which the at least two modules are fixed to each other, an axis of each array is defined between both ends thereof, the axes of the arrays are oriented approximately parallel to each other, and the array of a first module among the modules is offset from the array of a second module in a first direction parallel to the axis of the array of the second module, and a converter of the first module is approximately aligned with a converter of the second module in an intended tape movement direction in a case in which the axes are oriented at an angle greater than 0.2° relative to a line oriented perpendicular to the intended tape movement direction, and a mechanism for orienting the modules to control a converter pitch presented with respect to the tape.

SUMMARY

One embodiment according to the technology of the present disclosure provides a magnetic tape cartridge, a magnetic tape drive, a detection method of a servo pattern, and a non-transitory storage medium storing a program capable of obtaining a servo pattern signal having high reliability.

A first aspect according to the technology of the present disclosure relates to a magnetic tape cartridge comprising a magnetic tape in which a plurality of servo patterns are recorded along a longitudinal direction, and a storage medium, in which the storage medium stores servo format information including servo pattern inclination information which is information on an inclination of the servo pattern with respect to a first imaginary straight line.

A second aspect according to the technology of the present disclosure relates to the magnetic tape cartridge according to the first aspect, in which the first imaginary straight line is a straight line along a width direction of the magnetic tape, the servo pattern is at least one linear magnetization region pair, the linear magnetization region pair includes a first linear magnetization region which is linearly magnetized, and a second linear magnetization region which is linearly magnetized, the first linear magnetization region and the second linear magnetization region are inclined in opposite directions with respect to the first imaginary straight line, the first linear magnetization region has a steeper inclined angle with respect to the first imaginary straight line than the second linear magnetization region, and the servo pattern inclination information includes information on the inclined angle of the first linear magnetization region with respect to the first imaginary straight line, and information on an inclined angle of the second linear magnetization region with respect to the first imaginary straight line.

A third aspect according to the technology of the present disclosure relates to the magnetic tape cartridge according to the second aspect, in which positions of both ends of the first linear magnetization region and positions of both ends of the second linear magnetization region are aligned in the width direction of the magnetic tape.

A fourth aspect according to the technology of the present disclosure relates to the magnetic tape cartridge according to the third aspect, in which a total length of the first linear magnetization region is shorter than a total length of the second linear magnetization region.

A fifth aspect according to the technology of the present disclosure relates to the magnetic tape cartridge according to any one of the second to fourth aspects, in which the first linear magnetization region is a set of a plurality of first magnetization straight lines, and the second linear magnetization region is a set of a plurality of second magnetization straight lines.

A sixth aspect according to the technology of the present disclosure relates to the magnetic tape cartridge according to any one of the second to fifth aspects, in which a geometrical characteristic of the linear magnetization region pair on the magnetic tape corresponds to a geometrical characteristic based on a pair of imaginary linear regions inclined line-symmetrically with respect to the first imaginary straight line in a case in which an entirety of the pair of imaginary linear regions is inclined with respect to the first imaginary straight line by inclining a symmetry axis of the pair of imaginary linear regions with respect to the first imaginary straight line.

A seventh aspect according to the technology of the present disclosure relates to the magnetic tape cartridge according to any one of the third, fourth, and fifth aspects citing the third or fourth aspect, in which a geometrical characteristic of the linear magnetization region pair on the magnetic tape corresponds to a geometrical characteristic in which positions of both ends of one imaginary linear region of a pair of imaginary linear regions inclined line-symmetrically with respect to the first imaginary straight line and positions of both ends of the other imaginary linear region are aligned in the width direction in a case in which an entirety of the pair of imaginary linear regions is inclined with respect to the first imaginary straight line by inclining a symmetry axis of the pair of imaginary linear regions with respect to the first imaginary straight line.

An eighth aspect according to the technology of the present disclosure relates to the magnetic tape cartridge according to any one of the first to seventh aspects, in which the servo format information includes an ideal waveform signal indicating an ideal waveform of a servo pattern signal which is a result of reading the servo pattern by a servo reading element.

A ninth aspect according to the technology of the present disclosure relates to the magnetic tape cartridge according to the eighth aspect, in which the ideal waveform is a waveform determined in accordance with an orientation of the servo reading element on the magnetic tape.

A tenth aspect according to the technology of the present disclosure relates to the magnetic tape cartridge according to the ninth aspect, in which the ideal waveform is a waveform determined in accordance with a geometrical characteristic of the servo pattern and the orientation of the servo reading element on the magnetic tape.

An eleventh aspect according to the technology of the present disclosure relates to the magnetic tape cartridge according to the eighth aspect, in which the servo reading element is mounted on a magnetic head, and the ideal waveform is a waveform determined in accordance with an orientation of the magnetic head on the magnetic tape.

A twelfth aspect according to the technology of the present disclosure relates to the magnetic tape cartridge according to the eleventh aspect, in which the ideal waveform is a waveform determined in accordance with a geometrical characteristic of the servo pattern and the orientation of the magnetic head on the magnetic tape.

A thirteenth aspect according to the technology of the present disclosure relates to the magnetic tape cartridge according to any one of the first to twelfth aspects, in which the servo format information includes information on a width of the magnetic tape and/or information on a geometrical characteristic of the servo pattern.

A fourteenth aspect according to the technology of the present disclosure relates to the magnetic tape cartridge according to any one of the first to thirteenth aspects, in which the servo format information includes width adjustment information for adjusting a width of the magnetic tape.

A fifteenth aspect according to the technology of the present disclosure relates to the magnetic tape cartridge according to the fourteenth aspect, in which the width adjustment information includes information on tension of the magnetic tape in total length direction.

A sixteenth aspect according to the technology of the present disclosure relates to the magnetic tape cartridge according to the fifteenth aspect, in which the information on the tension is determined in accordance with the width of the magnetic tape, a characteristic of the magnetic tape itself, a use history of the magnetic tape, a temperature given to the magnetic tape, and/or humidity given to the magnetic tape.

A seventeenth aspect according to the technology of the present disclosure relates to the magnetic tape cartridge according to any one of the first to sixteenth aspects, in which the servo format information includes information on a skew angle which is an angle at which a magnetic head on which a servo reading element that reads the servo pattern is mounted is skewed on the magnetic tape.

An eighteenth aspect according to the technology of the present disclosure relates to the magnetic tape cartridge according to the seventeenth aspect, in which the information on the skew angle is determined in accordance with a width of the magnetic tape, a characteristic of the magnetic tape itself, a use history of the magnetic tape, a temperature given to the magnetic tape, and/or humidity given to the magnetic tape.

A nineteenth aspect according to the technology of the present disclosure relates to the magnetic tape cartridge according to any one of the first to eighteenth aspects, in which the magnetic tape is accommodated in a cartridge, and a noncontact storage medium is provided in the cartridge as the storage medium.

A twentieth aspect according to the technology of the present disclosure relates to the magnetic tape cartridge according to any one of the first to eighteenth aspects, in which the storage medium is the magnetic tape.

A twenty-first aspect according to the technology of the present disclosure relates to a magnetic tape drive comprising a processor, in which the processor acquires the servo format information stored in the storage medium provided in the magnetic tape cartridge according to any one of the first to twentieth aspects, and executes processing in accordance with the acquired servo format information.

A twenty-second aspect according to the technology of the present disclosure relates to a detection method of a servo pattern, the method comprising acquiring servo format information that is stored in a storage medium provided in a magnetic tape cartridge including a magnetic tape in which a plurality of servo patterns are recorded along a longitudinal direction, and includes servo pattern inclination information which is information on an inclination of the servo pattern with respect to a first imaginary straight line, and executing processing in accordance with the acquired servo format information.

A twenty-third aspect according to the technology of the present disclosure relates to a non-transitory storage medium storing a program causing a computer to execute a process comprising acquiring servo format information that is stored in a storage medium provided in a magnetic tape cartridge including a magnetic tape in which a plurality of servo patterns are recorded along a longitudinal direction, and includes servo pattern inclination information which is information on an inclination of the servo pattern with respect to a first imaginary straight line, and executing processing in accordance with the acquired servo format information.

BRIEF DESCRIPTION OF THE DRAWINGS

FIG. 29 is a conceptual diagram showing a fifth modification example, and is a conceptual diagram showing an example of the functions of the controller and the PES calculation unit provided in the control device provided in the magnetic tape drive according to the embodiment.

DETAILED DESCRIPTION

In the following, an example of an embodiment of a magnetic tape cartridge, a magnetic tape drive, and a detection method of a servo pattern according to the technology of the present disclosure will be described with reference to the accompanying drawings.

First, the terms used in the following description will be described.

NVM refers to an abbreviation of "non-volatile memory". CPU refers to an abbreviation of "central processing unit". RAM refers to an abbreviation of "random access memory". EEPROM refers to an abbreviation of "electrically erasable and programmable read only memory". SSD refers to an abbreviation of "solid state drive". HDD refers to an abbreviation of "hard disk drive". ASIC refers to an abbreviation of "application specific integrated circuit". FPGA refers to an abbreviation of "field-programmable gate array". PLC is an abbreviation of "programmable logic controller". IC refers to an abbreviation of "integrated circuit". RFID refers to an abbreviation of "radio frequency identifier". BOT refers to an abbreviation of "beginning of tape". EOT refers to an abbreviation of "end of tape". UI refers to an abbreviation of "user interface". WAN refers to an abbreviation of "wide area network". LAN refers to an abbreviation of "local area network". PES refers to an abbreviation of "position error signal".

Figure 1:
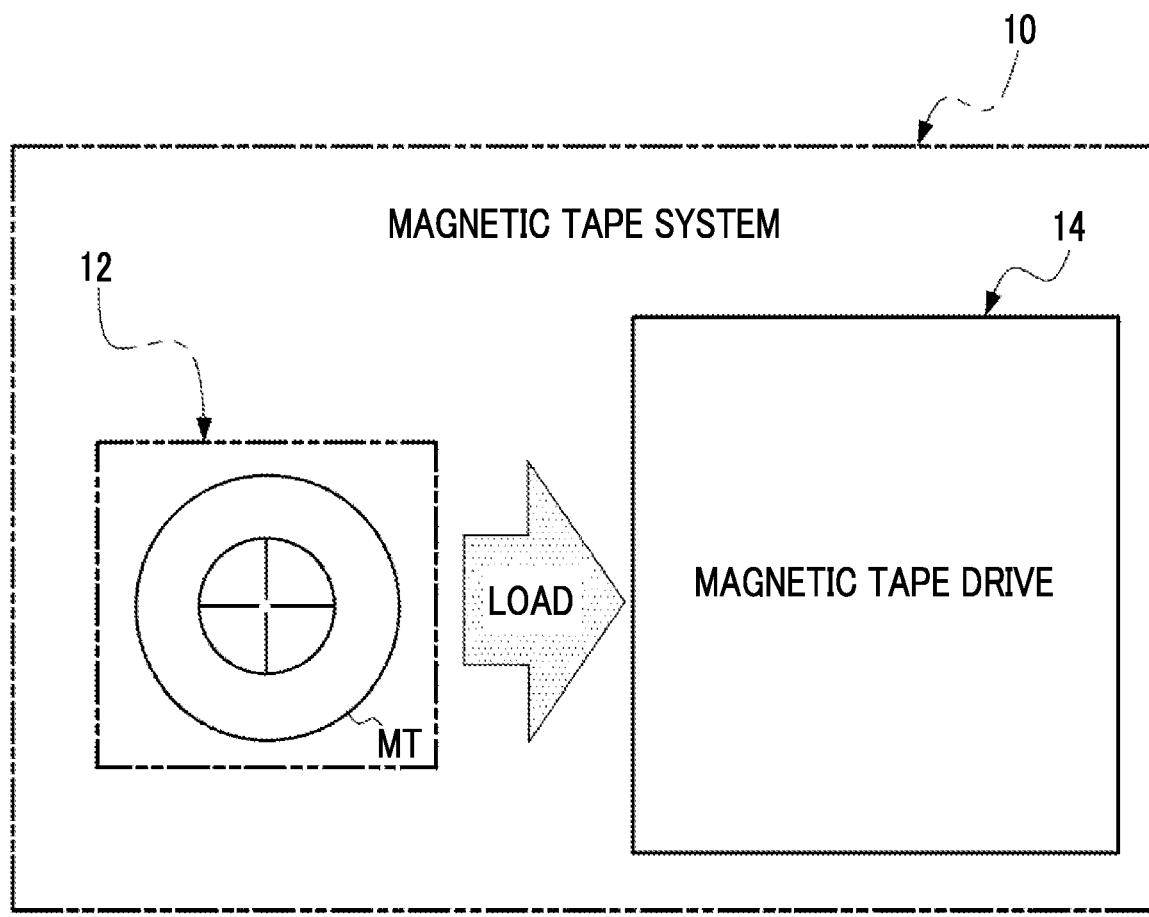
FIG. 1 is a block diagram showing an example of a configuration of a magnetic tape system according to an embodiment.

As an example, as shown in FIG. 1, a magnetic tape system 10 comprises a magnetic tape cartridge 12 and a magnetic tape drive 14. A magnetic tape cartridge 12 is loaded into the magnetic tape drive 14. The magnetic tape cartridge 12 accommodates a magnetic tape MT. The magnetic tape drive 14 pulls out the magnetic tape MT from the loaded magnetic tape cartridge 12, and records data in the magnetic tape MT and reads data from the magnetic tape MT while causing the pulled out magnetic tape MT to travel.

In the present embodiment, the magnetic tape drive 14 is an example of a "magnetic tape drive" according to the technology of the present disclosure. In addition, the magnetic tape cartridge 12 is an example of a "magnetic tape cartridge" according to the technology of the present disclosure. In addition, the magnetic tape MT is an example of a "magnetic tape" according to the technology of the present disclosure.

Next, an example of a configuration of the magnetic tape cartridge 12 will be described with reference to FIGS. 2 to 4. It should be noted that, in the following description, for convenience of description, in FIGS. 2 to 4, a loading direction of the magnetic tape cartridge 12 into the magnetic tape drive 14 is indicated by an arrow A, a direction of the arrow A is defined as a front direction of the magnetic tape cartridge 12, and a side of the magnetic tape cartridge 12 in the front direction is defined as a front side of the magnetic tape cartridge 12. In the following description of the structure, "front" refers to the front side of the magnetic tape cartridge 12.

In addition, in the following description, for convenience of description, in FIGS. 2 to 4, a direction of an arrow B orthogonal to the direction of the arrow A is defined as a right direction, and a side of the magnetic tape cartridge 12 in the right direction is defined as a right side of the magnetic tape cartridge 12. In the following description of the structure, "right" refers to the right side of the magnetic tape cartridge 12.

In addition, in the following description, for convenience of description, in FIGS. 2 to 4, a direction opposite to the direction of the arrow B is defined as a left direction, and a side of the magnetic tape cartridge 12 in the left direction is defined as a left side of the magnetic tape cartridge 12. In the following description of the structure, "left" refers to the left side of the magnetic tape cartridge 12.

In addition, in the following description, for convenience of description, in FIGS. 2 to 4, a direction orthogonal to the direction of the arrow A and the direction of the arrow B is indicated by an arrow C, a direction of the arrow C is defined as an upper direction of the magnetic tape cartridge 12, and a side of the magnetic tape cartridge 12 in the upper direction is defined as an upper side of the magnetic tape cartridge 12. In the following description of the structure, "upper" refers to the upper side of the magnetic tape cartridge 12.

In addition, in the following description, for convenience of description, in FIGS. 2 to 4, a direction opposite to the front direction of the magnetic tape cartridge 12 is defined as a rear direction of the magnetic tape cartridge 12, and a side of the magnetic tape cartridge 12 in the rear direction is defined as a rear side of the magnetic tape cartridge 12. In the following description of the structure, "rear" refers to the rear side of the magnetic tape cartridge 12.

In addition, in the following description, for convenience of description, in FIGS. 2 to 4, a direction opposite to the upper direction of the magnetic tape cartridge 12 is defined as a lower direction of the magnetic tape cartridge 12, and a side of the magnetic tape cartridge 12 in the lower direction is defined as a lower side of the magnetic tape cartridge 12. In the following description of the structure, "lower" refers to the lower side of the magnetic tape cartridge 12.

Figure 2:
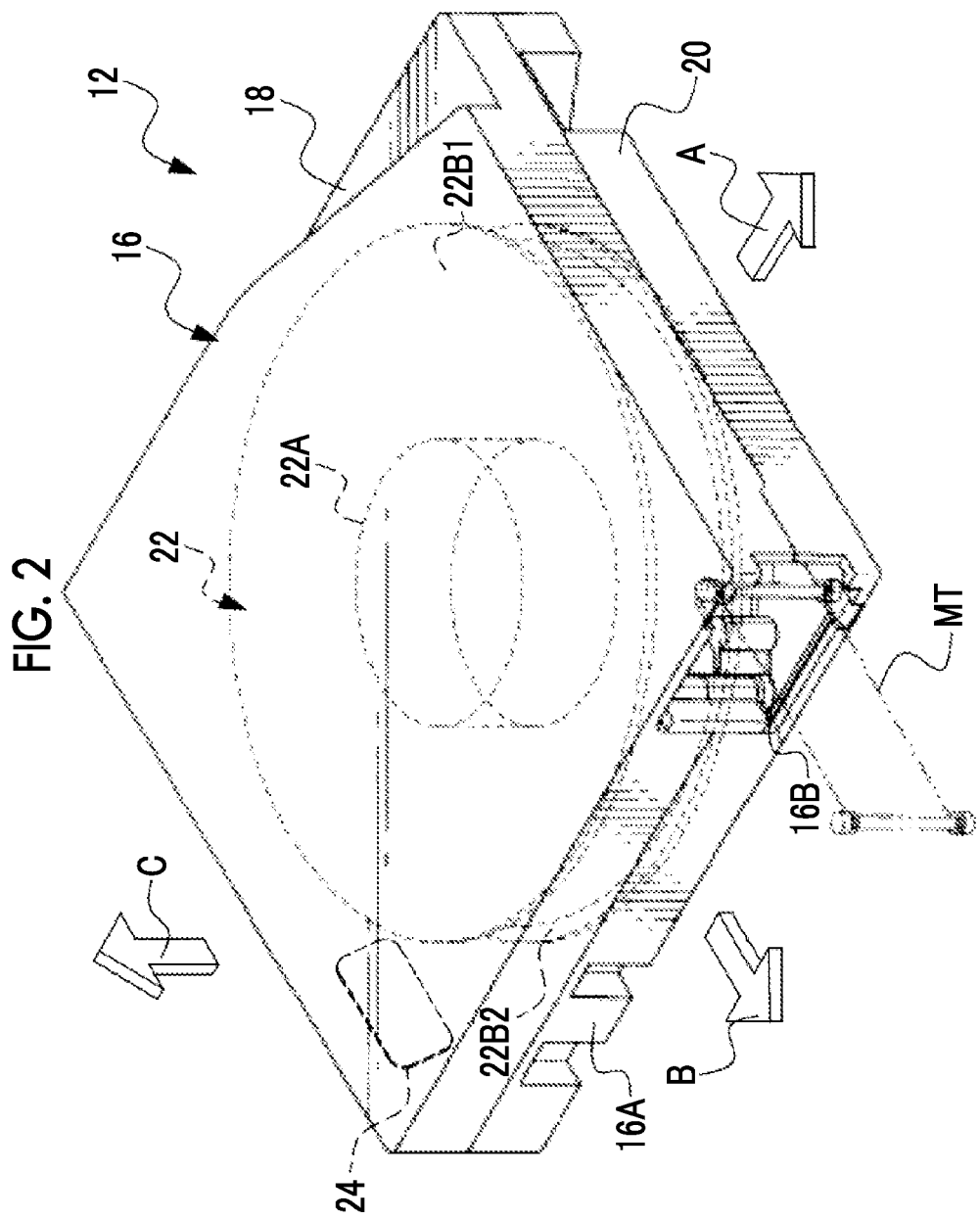
FIG. 2 is a schematic perspective view of an example of an appearance of a magnetic tape cartridge according to the embodiment.

As an example, as shown in FIG. 2, the magnetic tape cartridge 12 has a substantially rectangular shape in a plan view, and comprises a box-shaped case 16. The magnetic tape MT is accommodated in the case 16. The case 16 is made of resin, such as polycarbonate, and comprises an upper case 18 and a lower case 20. The upper case 18 and the lower case 20 are bonded by welding (for example, ultrasound welding) and screwing in a state in which a lower peripheral edge surface of the upper case 18 and an upper peripheral edge surface of the lower case 20 are brought into contact with each other. The bonding method is not limited to welding and screwing, and other bonding methods may be used. The case 16 is an example of a "cartridge" according to the technology of the present disclosure.

A sending reel 22 is rotatably accommodated inside the case 16. The sending reel 22 comprises a reel hub 22A, an upper flange 22B1, and a lower flange 22B2. The reel hub 22A is formed in a cylindrical shape. The reel hub 22A is an axial center portion of the sending reel 22, has an axial center direction along an up-down direction of the case 16, and is disposed in a center portion of the case 16. Each of the upper flange 22B1 and the lower flange 22B2 is formed in an annular shape. A center portion of the upper flange 22B1 in a plan view is fixed to an upper end portion of the reel hub 22A, and a center portion of the lower flange 22B2 in a plan view is fixed to a lower end portion of the reel hub 22A. It should be noted that the reel hub 22A and the lower flange 22B2 may be integrally molded.

The magnetic tape MT is wound around an outer peripheral surface of the reel hub 22A, and an end portion of the magnetic tape MT in a width direction is held by the upper flange 22B1 and the lower flange 22B2.

An opening 16B is formed on a front side of a right wall 16A of the case 16. The magnetic tape MT is pulled out from the opening 16B.

A cartridge memory 24 is provided in the lower case 20. Specifically, the cartridge memory 24 is accommodated in a right rear end portion of the lower case 20. An IC chip including an NVM is mounted on the cartridge memory 24. In the present embodiment, a so-called passive RFID tag is adopted as the cartridge memory 24, and the read/write of various pieces of information is performed with respect to the cartridge memory 24 in a noncontact manner. The cartridge memory 24 is an example of a "noncontact storage medium" and a "storage medium" according to the technology of the present disclosure.

The cartridge memory 24 stores management information for managing the magnetic tape cartridge 12. Examples of the management information include information on the cartridge memory 24 (for example, information for specifying the magnetic tape cartridge 12), information on the magnetic tape MT (for example, information indicating a recording capacity of the magnetic tape MT, information indicating an outline of the data recorded in the magnetic tape MT, information indicating items of the data recorded in the magnetic tape MT, and information indicating a recording format of the data recorded in the magnetic tape MT), and information on the magnetic tape drive 14 (for example, information indicating a specification of the magnetic tape drive 14 and a signal used in the magnetic tape drive 14). In addition, as will be described in detail below, servo format information (see FIG. 14) is stored in the cartridge memory 24.

Figure 3:
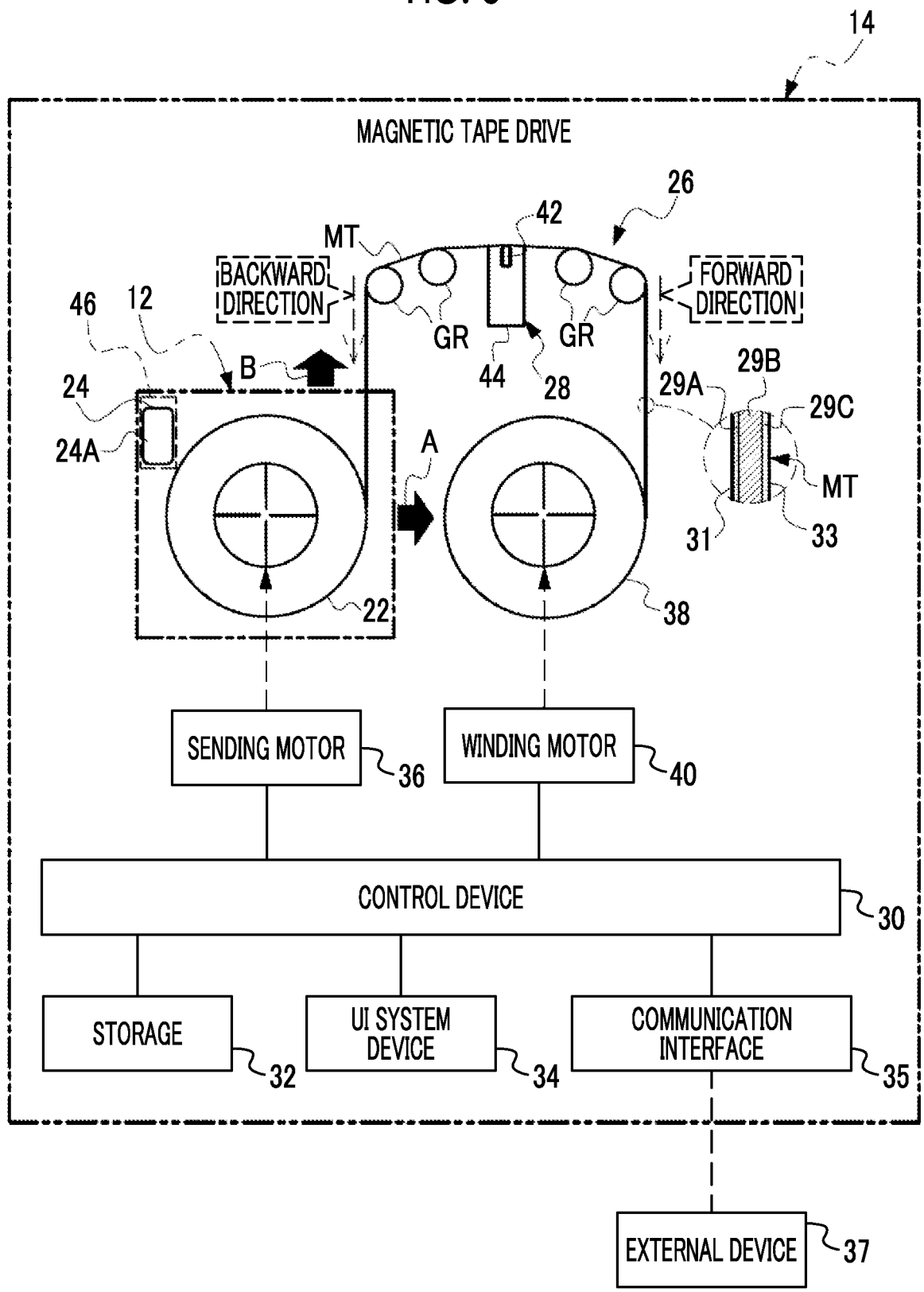
FIG. 3 is a schematic configuration diagram showing an example of a hardware configuration of a magnetic tape drive according to the embodiment.

As an example, as shown in FIG. 3, the magnetic tape drive 14 comprises a transport device 26, a magnetic head 28, a control device 30, a storage 32, a UI system device 34, and a communication interface 35. The magnetic tape drive 14 is loaded into the magnetic tape cartridge 12 along the direction of the arrow A. In the magnetic tape drive 14, the magnetic tape MT is pulled out from the magnetic tape cartridge 12 and used. The magnetic head 28 is an example of a "magnetic head" according to the technology of the present disclosure.

The magnetic tape MT has a magnetic layer 29A, a base film 29B, and a back coating layer 29C. The magnetic layer 29A is formed on one surface side of the base film 29B, and the back coating layer 29C is formed on the other surface side of the base film 29B. The data is recorded in the magnetic layer 29A. The magnetic layer 29A contains ferromagnetic powder. As the ferromagnetic powder, for example, ferromagnetic powder generally used in the magnetic layer of various magnetic recording media is used. Preferable specific examples of the ferromagnetic powder include hexagonal ferrite powder. Examples of the hexagonal ferrite powder include hexagonal strontium ferrite powder and hexagonal barium ferrite powder. The back coating layer 29C is a layer containing non-magnetic powder, such as carbon black. The base film 29B is also referred to as a support, and is made of, for example, polyethylene terephthalate, polyethylene naphthalate, or polyamide. It should be noted that a non-magnetic layer may be formed between the base film 29B and the magnetic layer 29A. In the magnetic tape MT, a surface on which the magnetic layer 29A is formed is a front surface 31 of the magnetic tape MT, and a surface on which the back coating layer 29C is formed is a back surface 33 of the magnetic tape MT.

The magnetic tape drive 14 performs magnetic processing on the front surface 31 of the magnetic tape MT by using the magnetic head 28. Here, the magnetic processing refers to recording the data in the front surface 31 of the magnetic tape MT and reading the data (that is, reproducing the data) from the front surface 31 of the magnetic tape MT. In the present embodiment, the magnetic tape drive 14 selectively records the data in the front surface 31 of the magnetic tape MT and reads the data from the front surface 31 of the magnetic tape MT by using the magnetic head 28. That is, the magnetic tape drive 14 pulls out the magnetic tape MT from the magnetic tape cartridge 12, records the data in the front surface 31 of the pulled out magnetic tape MT by using the magnetic head 28, or reads the data from the front surface 31 of the pulled out magnetic tape MT by using the magnetic head 28.

The control device 30 controls the entire magnetic tape drive 14. In the present embodiment, although the control device 30 is realized by an ASIC, the technology of the present disclosure is not limited to this. For example, the control device 30 may be realized by an FPGA and/or a PLC. In addition, the control device 30 may be realized by the computer including a CPU, a flash memory (for example, an EEPROM and/or an SSD), and a RAM. In addition, the control device 30 may be realized by combining two or more of an ASIC, an FPGA, a PLC, and a computer. That is, the control device 30 may be realized by a combination of a hardware configuration and a software configuration. It should be noted that the control device 30 is an example of a "processor" according to the technology of the present disclosure.

The storage 32 is connected to the control device 30, and the control device 30 writes various pieces of information to the storage 32 and reads out various pieces of information from the storage 32. Examples of the storage 32 include a flash memory and/or an HDD. The flash memory and the HDD are merely examples, and any memory may be used as long as the memory is a non-volatile memory that can be mounted on the magnetic tape drive 14.

The UI system device 34 is a device having the reception function of receiving a command signal indicating a command from a user and the presentation function of presenting the information to the user. The reception function is realized by a touch panel, a hard key (for example, a keyboard), and/or a mouse, for example. The presentation function is realized by a display, a printer, and/or a speaker, for example. The UI system device 34 is connected to the control device 30. The control device 30 acquires the command signal received by the UI system device 34. The UI system device 34 presents various pieces of information to the user under the control of the control device 30.

The communication interface 35 is connected to the control device 30. In addition, the communication interface 35 is connected to an external device 37 via a communication network (not shown), such as a WAN and/or a LAN. The communication interface 35 controls the exchange of various pieces of information (for example, the data to be recorded in the magnetic tape MT, the data read from the magnetic tape MT, and/or a command signal given to the control device 30) between the control device 30 and the external device 37. It should be noted that examples of the external device 37 include a personal computer and a mainframe.

The transport device 26 is a device that selectively transports the magnetic tape MT along a predetermined path in a forward direction and a backward direction, and comprises a sending motor 36, a winding reel 38, a winding motor 40, and a plurality of guide rollers GR. It should be noted that, here, the forward direction refers to a sending direction of the magnetic tape MT, and the backward direction refers to a rewinding direction of the magnetic tape MT.

The sending motor 36 rotates the sending reel 22 in the magnetic tape cartridge 12 under the control of the control device 30. The control device 30 controls the sending motor 36 to control a rotation direction, a rotation speed, a rotation torque, and the like of the sending reel 22.

The winding motor 40 rotates the winding reel 38 under the control of the control device 30. The control device 30 controls the winding motor 40 to control a rotation direction, a rotation speed, a rotation torque, and the like of the winding reel 38.

In a case in which the magnetic tape MT is wound by the winding reel 38, the control device 30 rotates the sending motor 36 and the winding motor 40 such that the magnetic tape MT travels along the predetermined path in the forward direction. The rotation speed, the rotation torque, and the like of the sending motor 36 and the winding motor 40 are adjusted in accordance with a speed at which the magnetic tape MT is wound around the winding reel 38. In addition, by adjusting the rotation speed, the rotation torque, and the like of each of the sending motor 36 and the winding motor 40 by the control device 30, the tension is applied to the magnetic tape MT. In addition, the tension applied to the magnetic tape MT is controlled by adjusting the rotation speed, the rotation torque, and the like of each of the sending motor 36 and the winding motor 40 by the control device 30.

It should be noted that, in a case in which the magnetic tape MT is rewound to the sending reel 22, the control device 30 rotates the sending motor 36 and the winding motor 40 such that the magnetic tape MT travels along the predetermined path in the backward direction.

In the present embodiment, the tension applied to the magnetic tape MT is controlled by controlling the rotation speed, the rotation torque, and the like of the sending motor 36 and the winding motor 40, but the technology of the present disclosure is not limited to this. For example, the tension applied to the magnetic tape MT may be controlled by using a dancer roller, or may be controlled by drawing the magnetic tape MT into a vacuum chamber.

Each of the plurality of guide rollers GR is a roller which guides the magnetic tape MT. The predetermined path, that is, a traveling path of the magnetic tape MT is determined by separately disposing the plurality of guide rollers GR at positions straddling the magnetic head 28 between the magnetic tape cartridge 12 and the winding reel 38.

The magnetic head 28 comprises a magnetic element unit 42 and a holder 44. The magnetic element unit 42 is held by the holder 44 to come into contact with the traveling magnetic tape MT. The magnetic element unit 42 includes a plurality of magnetic elements.

The magnetic element unit 42 records the data in the magnetic tape MT transported by the transport device 26, and reads the data from the magnetic tape MT transported by the transport device 26. Here, the data refers to, for example, a servo pattern 58 (see FIG. 9) and the data other than the servo pattern 58, that is, the data recorded in a data band DB (see FIG. 9).

The magnetic tape drive 14 comprises a noncontact read/write device 46. The noncontact read/write device 46 is disposed to face a back surface 24A of the cartridge memory 24 on the lower side of the magnetic tape cartridge 12 in a state in which the magnetic tape cartridge 12 is loaded, and performs the read/write of the information with respect to the cartridge memory 24 in a noncontact manner.

Figure 4:
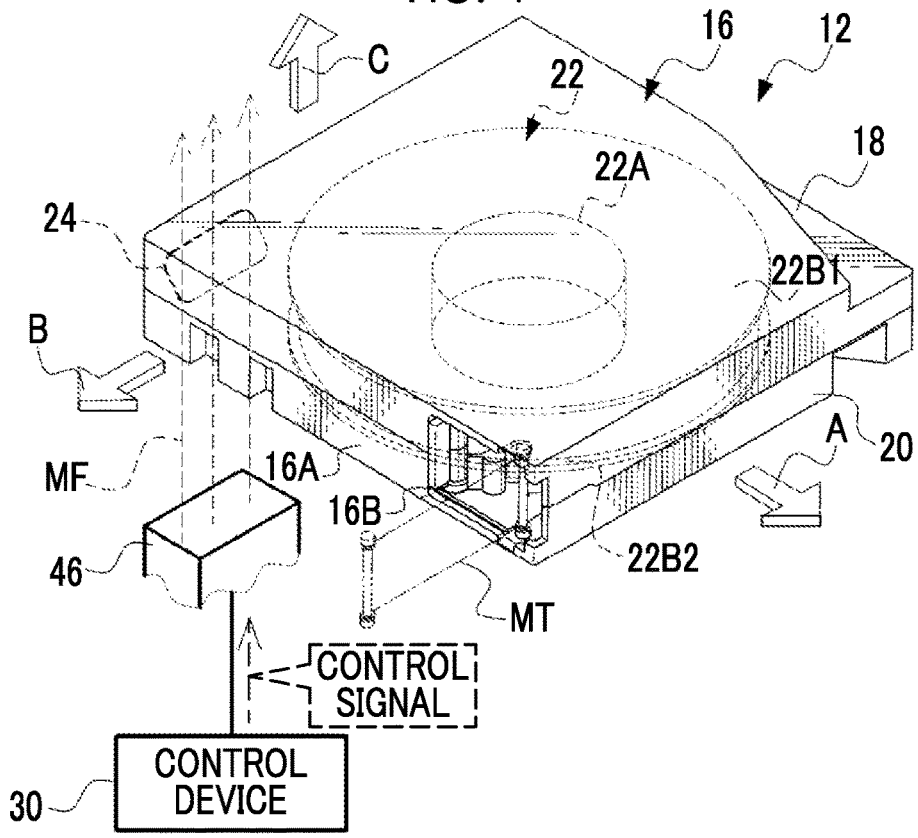
FIG. 4 is a schematic perspective view showing an example of an aspect in which a magnetic field is released by a noncontact read/write device from a lower side of the magnetic tape cartridge according to the embodiment.

As an example, as shown in FIG. 4, the noncontact read/write device 46 releases a magnetic field MF from the lower side of the magnetic tape cartridge 12 toward the cartridge memory 24. The magnetic field MF passes through the cartridge memory 24.

The noncontact read/write device 46 is connected to the control device 30. The control device 30 outputs a control signal to the noncontact read/write device 46. The control signal is a signal for controlling the cartridge memory 24. The noncontact read/write device 46 generates the magnetic field MF in response to the control signal input from the control device 30, and releases the generated magnetic field MF toward the cartridge memory 24.

The noncontact read/write device 46 performs noncontact communication with the cartridge memory 24 via the magnetic field MF to perform processing on the cartridge memory 24 in response to the control signal. For example, the noncontact read/write device 46 selectively performs, under the control of the control device 30, processing of reading the information from the cartridge memory 24 and processing of storing the information in the cartridge memory 24 (that is, processing of writing the information to the cartridge memory 24).

Figure 5:
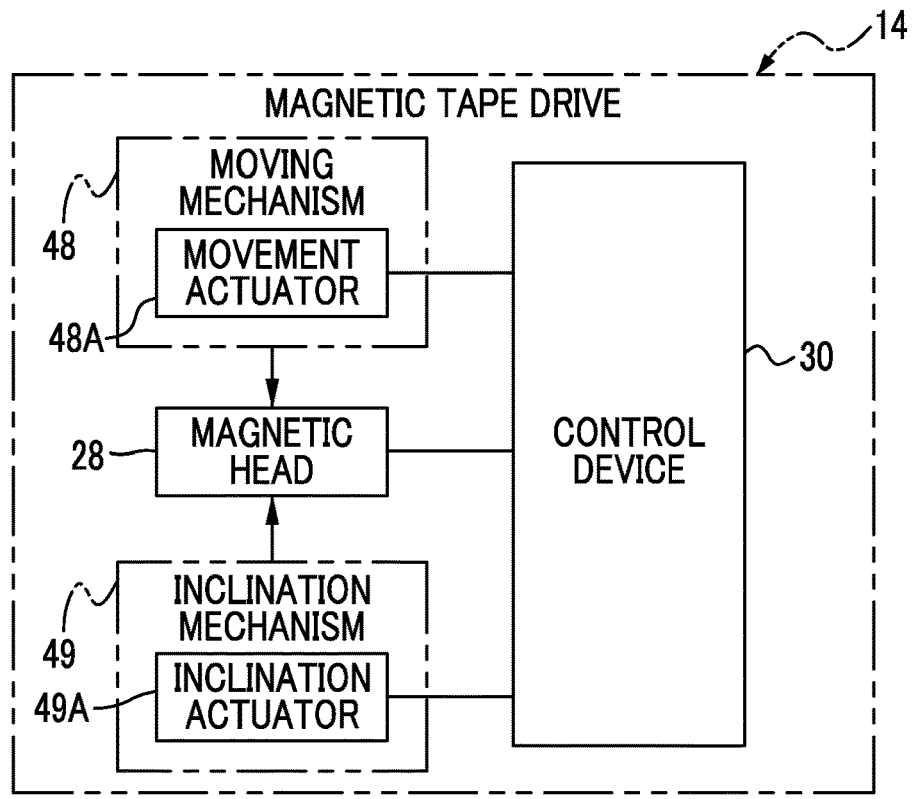
FIG. 5 is a schematic configuration diagram showing an example of the hardware configuration of the magnetic tape drive according to the embodiment.

As an example, as shown in FIG. 5, the magnetic tape drive 14 comprises a moving mechanism 48. The moving mechanism 48 includes a movement actuator 48A. Examples of the movement actuator 48A include a voice coil motor and/or a piezo actuator. The movement actuator 48A is connected to the control device 30, and the control device 30 controls the movement actuator 48A. The movement actuator 48A generates power under the control of the control device 30. The moving mechanism 48 moves the magnetic head 28 in the width direction of the magnetic tape MT by receiving the power generated by the movement actuator 48A.

The magnetic tape drive 14 comprises an inclination mechanism 49. The inclination mechanism 49 includes an inclination actuator 49A. Examples of the inclination actuator 49A include a voice coil motor and/or a piezo actuator. The inclination actuator 49A is connected to the control device 30, and the control device 30 controls the inclination actuator 49A. The inclination actuator 49A generates power under the control of the control device 30. The inclination mechanism 49 inclines the magnetic head 28 to a longitudinal direction LD side of the magnetic tape MT with respect to a width direction WD of the magnetic tape MT by receiving the power generated by the inclination actuator 49A (see FIG. 8). That is, the magnetic head 28 is skewed on the magnetic tape MT under the control of the control device 30.

Here, as a comparative example with respect to the magnetic tape MT, a case in which a known magnetic tape MT0 in the related art is used instead of the magnetic tape MT will be described with reference to FIGS. 6 to 8. It should be noted that, in a case in which the magnetic tape MT0 and the magnetic tape MT are compared, there is a difference in that the servo pattern 52 (see FIG. 6) is applied to the magnetic tape MT0, whereas the servo pattern 58 (see FIG. 9) is applied to the magnetic tape MT.

Figure 6:
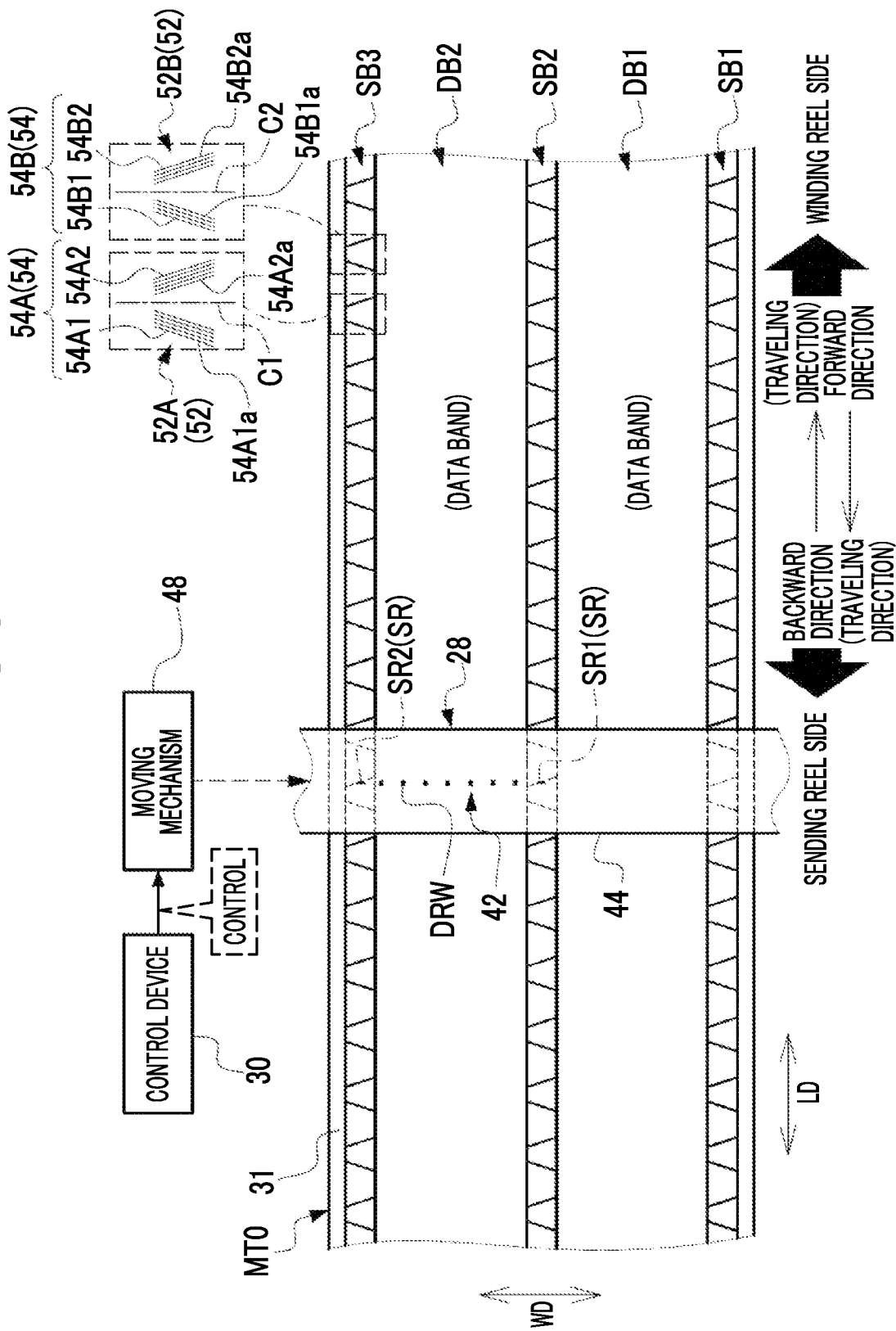
FIG. 6 is a conceptual diagram showing an example of an aspect in which a state in which a magnetic head is disposed on a known magnetic tape in the related art is observed from a front surface side of the magnetic tape.

As an example, as shown in FIG. 6, on the front surface 31 of the magnetic tape MT0, servo bands SB1, SB2, and SB3 are data bands DB1 and DB2 are formed. It should be noted that, in the following, for convenience of description, in a case in which the distinction is not specifically needed, the servo bands SB1 to SB3 are referred to as a servo band SB, and the data bands DB1 and DB2 are referred to as the data band DB.

The servo bands SB1 to SB3 and the data bands DB1 and DB2 are formed along the longitudinal direction LD (that is, a total length direction) of the magnetic tape MT0. Here, the total length direction of the magnetic tape MT0 refers to the traveling direction of the magnetic tape MT0, in other words. The traveling direction of the magnetic tape MT0 is defined in two directions of the forward direction which is a direction in which the magnetic tape MT0 travels from the sending reel 22 side to the winding reel 38 side (hereinafter, also simply referred to as "forward direction"), and the backward direction which is a direction in which the magnetic tape MT0 travels from the winding reel 38 side to the sending reel 22 side (hereinafter, also simply referred to as "backward direction").

The servo bands SB1 to SB3 are arranged at positions spaced in the width direction WD of the magnetic tape MT0 (hereinafter, also simply referred to as "width direction WD"). For example, the servo bands SB1 to SB3 are arranged at equal intervals along the width direction WD. It should be noted that, in the present embodiment, "equal interval" refers to the equal interval in the sense of including an error generally allowed in the technical field to which the technology of the present disclosure belongs, which is the error to the extent that it does not contradict the purpose of the technology of the present disclosure, in addition to the exact equal interval.

The data band DB1 is disposed between the servo band SB1 and the servo band SB2, and the data band DB2 is disposed between a servo band SB2 and a servo band SB3. That is, the servo bands SB and the data bands DB are arranged alternately along the width direction WD.

It should be noted that, in the example shown in FIG. 6, for convenience of description, three servo bands SB and two data bands DB are shown, but these are merely examples, and two servo bands SB and one data band DB may be used, and the technology of the present disclosure is established even in a case in which four or more servo bands SB and three or more data bands DB are used.

A plurality of servo patterns 52 are recorded in the servo band SB along the longitudinal direction LD of the magnetic tape MT0. The servo patterns 52 are classified into a servo pattern 52A and a servo pattern 52B. The plurality of servo patterns 52 are disposed at regular intervals along the longitudinal direction LD of the magnetic tape MT0. It should be noted that, in the present embodiment, "regular" refers to the regularity in the sense of including an error generally allowed in the technical field to which the technology of the present disclosure belongs, which is the error to the extent that it does not contradict the purpose of the technology of the present disclosure, in addition to the exact regularity.

In the servo band SB, the adjacent servo patterns 52 are a set. In the example shown in FIG. 6, the servo patterns 52A and 52B are shown as an example of the set of servo patterns 52. In the set of the servo patterns 52, the servo pattern 52A is positioned on an upstream side in the forward direction, and the servo pattern 52B is positioned on a downstream side in the forward direction.

The servo pattern 52 consists of a linear magnetization region pair 54. The linear magnetization region pair 54 is classified into a linear magnetization region pair 54A and a linear magnetization region pair 54B.

The servo pattern 52A consists of the linear magnetization region pair 54A. In the example shown in FIG. 6, linear magnetization regions 54A1 and 54A2 are shown as an example of the linear magnetization region pair 54A. Each of the linear magnetization regions 54A1 and 54A2 is a linearly magnetized region.

The linear magnetization regions 54A1 and 54A2 are inclined in opposite directions with respect to an imaginary straight line C1 which is an imaginary straight line along the width direction WD. In the example shown in FIG. 6, the linear magnetization regions 54A1 and 54A2 are inclined line-symmetrically with respect to the imaginary straight line C1. More specifically, the linear magnetization regions 54A1 and 54A2 are formed in a state of being not parallel to each other and being inclined at a predetermined angle (for example, 5 degrees) in opposite directions on the longitudinal direction LD side of the magnetic tape MT0 with the imaginary straight line C1 as the symmetry axis. In the present embodiment, the imaginary straight line C1 is an example of a "first imaginary straight line" according to the technology of the present disclosure.

The linear magnetization region 54A1 is a set of magnetization straight lines 54A1a, which are five magnetized straight lines. The linear magnetization region 54A2 is a set of magnetization straight lines 54A2a, which are five magnetized straight lines.

The servo pattern 52B consists of the linear magnetization region pair 54B. In the example shown in FIG. 6, linear magnetization regions 54B1 and 54B2 are shown as an example of the linear magnetization region pair 54B. Each of the linear magnetization regions 54B1 and 54B2 is a linearly magnetized region.

The linear magnetization regions 54B1 and 54B2 are inclined in opposite directions with respect to an imaginary straight line C2 which is an imaginary straight line along the width direction WD. In the example shown in FIG. 6, the linear magnetization regions 54B1 and 54B2 are inclined line-symmetrically with respect to the imaginary straight line C2. More specifically, the linear magnetization regions 54B1 and 54B2 are formed in a state of being not parallel to each other and being inclined at a predetermined angle (for example, 5 degrees) in opposite directions on the longitudinal direction LD side of the magnetic tape MT0 with the imaginary straight line C2 as the symmetry axis. In the present embodiment, the imaginary straight line C2 is an example of a "first imaginary straight line" according to the technology of the present disclosure.

The linear magnetization region 54B1 is a set of magnetization straight lines 54B1a, which are four magnetized straight lines. The linear magnetization region 54B2 is a set of magnetization straight lines 54B2a, which are four magnetized straight lines.

The magnetic head 28 is disposed on the front surface 31 side of the magnetic tape MT0 configured as described above. The holder 44 is formed in a rectangular parallelepiped shape, and is disposed to cross the front surface 31 of the magnetic tape MT0 along the width direction WD. The plurality of magnetic elements of the magnetic element unit 42 are arranged in a straight line along the longitudinal direction of the holder 44. The magnetic element unit 42 has a pair of servo reading elements SR and a plurality of data read/write elements DRW as the plurality of magnetic elements. A length of the holder 44 in the longitudinal direction is sufficiently long with respect to the width of the magnetic tape MT0. For example, the length of the holder 44 in the longitudinal direction is set to a length exceeding the width of the magnetic tape MT0 even in a case in which the magnetic element unit 42 is disposed at any position on the magnetic tape MT. The servo reading element SR is an example of a "servo reading element" according to the technology of the present disclosure.

The pair of servo reading elements SR consists of servo reading elements SR1 and SR2. The servo reading element SR1 is disposed at one end of the magnetic element unit 42, and the servo reading element SR2 is disposed at the other end of the magnetic element unit 42. In the example shown in FIG. 6, the servo reading element SR1 is provided at a position corresponding to the servo band SB2, and the servo reading element SR2 is provided at a position corresponding to the servo band SB3.

The plurality of data read/write elements DRW are disposed in a straight line between the servo reading element SR1 and the servo reading element SR2. The plurality of data read/write elements DRW are disposed at intervals along the longitudinal direction of the magnetic head 28 (for example, are disposed at equal intervals along the longitudinal direction of the magnetic head 28). In the example shown in FIG. 6, the plurality of data read/write elements DRW are provided at positions corresponding to the data band DB2.

The control device 30 acquires a servo pattern signal which is a result of reading the servo pattern 52 by the servo reading element SR, and performs a servo control in response to the acquired servo pattern signal. Here, the servo control refers to a control of moving the magnetic head 28 in the width direction WD of the magnetic tape MT0 by operating the moving mechanism 48 in accordance with the servo pattern 52 read by the servo reading element SR.

By performing the servo control, the plurality of data read/write elements DRW are positioned on a designated region in the data band DB, and perform the magnetic processing on the designated region in the data band DB. In the example shown in FIG. 6, the plurality of data read/write elements DRW perform the magnetic processing on the designated region in the data band DB2.

In addition, in a case in which the data band DB of which the data is to be read by the magnetic element unit 42 is changed (in the example shown in FIG. 6, the data band DB of which the data is to be read by the magnetic element unit 42 is changed from the data band DB2 to the data band DB1), the moving mechanism 48 moves, under the control of the control device 30, the magnetic head 28 in the width direction WD to change the position of the pair of servo reading elements SR. That is, by moving the magnetic head 28 in the width direction WD, the moving mechanism 48 moves the servo reading element SR1 to a position corresponding to the servo band SB1 and moves the servo reading element SR2 to the position corresponding to the servo band SB2. As a result, the positions of the plurality of data read/write elements DRW are changed from the data band DB2 to the data band DB1, and the plurality of data read/write elements DRW perform the magnetic processing on the data band DB1.

By the way, in recent years, research on a technology of reducing the influence of transverse dimensional stability (TDS) has been advanced. It has been known that the TDS is affected by a temperature, humidity, a pressure at which the magnetic tape is wound around the reel, temporal deterioration, or the like, the TDS is increased in a case in which no measures are taken, and off-track (that is, misregistration of the data read/write element DRW with respect to the track in the data band DB) occurs in a scene in which the magnetic processing is performed on the data band DB.

Figure 7:
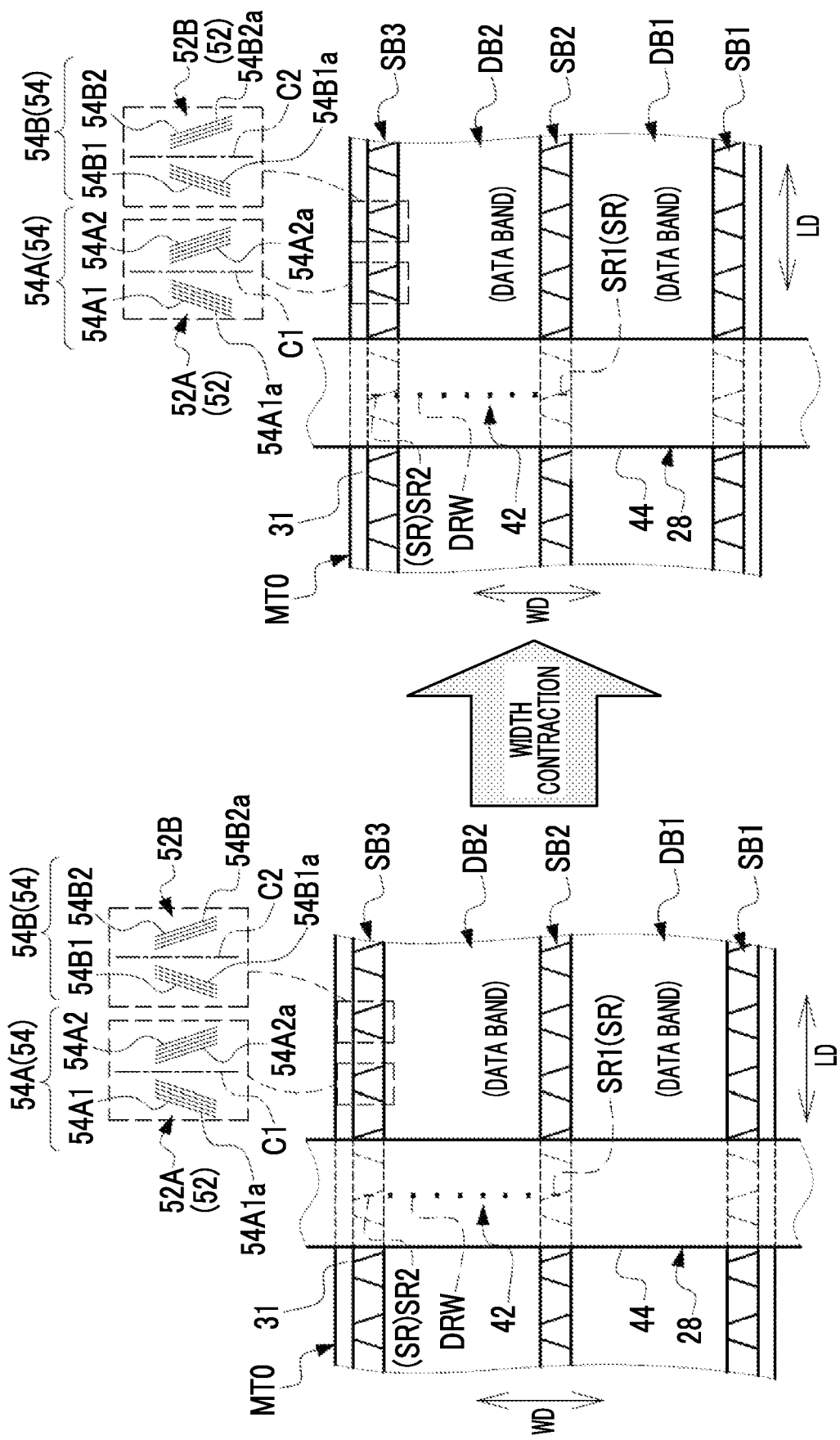
FIG. 7 is a conceptual diagram showing an example of an aspect in which the known magnetic tape in the related art before and after a width of the magnetic tape contracts is observed from the front surface side of the magnetic tape.

In the example shown in FIG. 7, an aspect is shown in which the width of the magnetic tape MT0 contracts with the elapse of time. In this case, the off-track occurs. In some cases, the width of the magnetic tape MT0 expands, and the off-track occurs in this case as well. That is, in a case in which the width of the magnetic tape MT0 contracts or expands with the elapse of time, the position of the servo reading element SR with respect to the servo pattern 52 diverges from a predetermined position (for example, the center position of each of the linear magnetization regions 54A1, 54A2, 54B1, and 54B2) determined by design in the width direction WD. In a case in which the position of the servo reading element SR with respect to the servo pattern 52 diverges from the predetermined position determined by the design in the width direction WD, the accuracy of the servo control is deteriorated, and the position of the track in the data band DB and the position of the data read/write element DRW deviate from each other. Then, an originally planned track will not be subjected to the magnetic processing.

Figure 8:
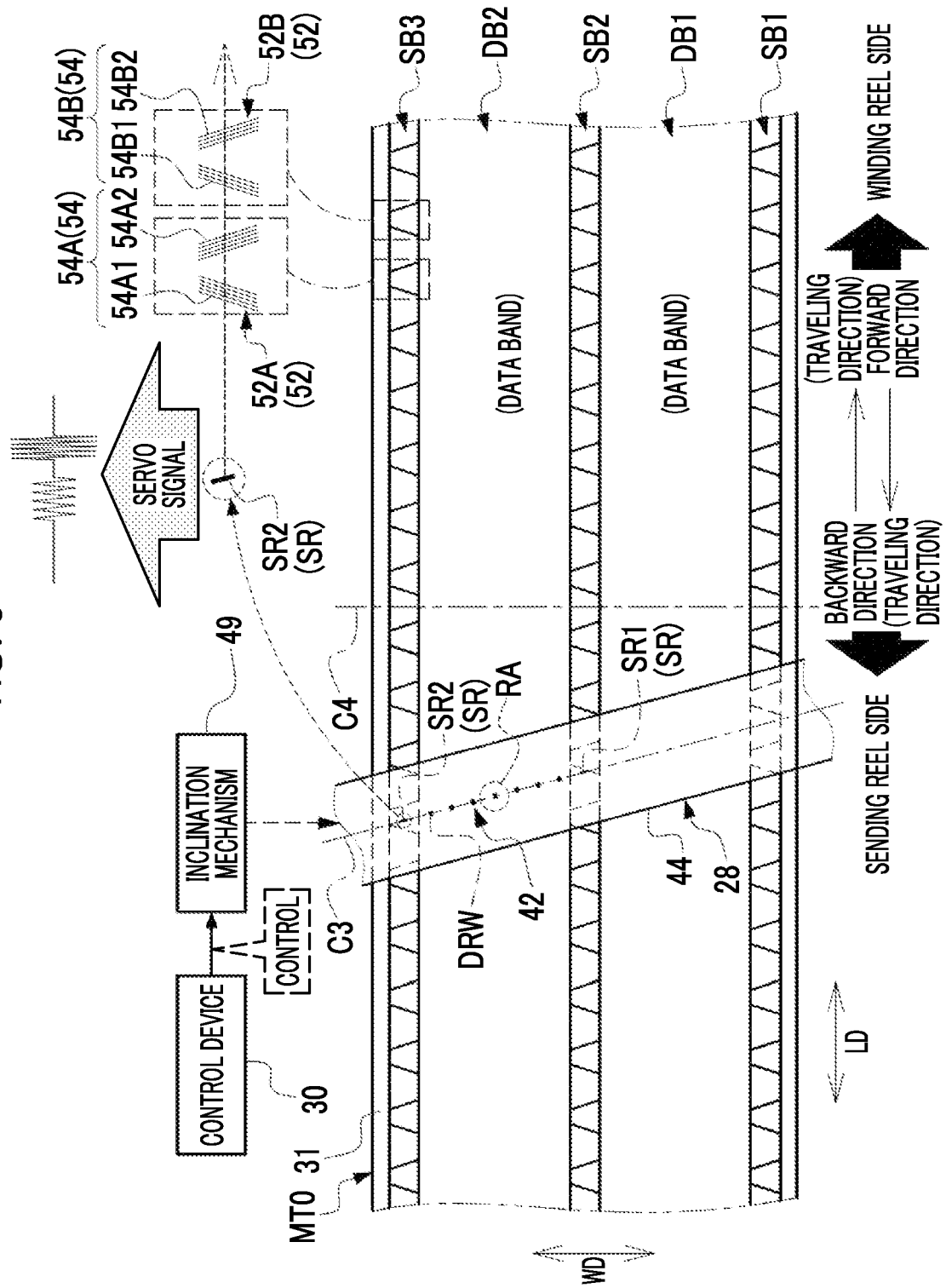
FIG. 8 is a conceptual diagram showing an example of an aspect in which a state in which the magnetic head is skewed on the known magnetic tape in the related art is observed from the front surface side of the magnetic tape.

As a method of reducing the influence of the TDS, as shown in FIG. 8 as an example, a method of holding the position of the servo reading element SR with respect to the servo pattern 52 at the predetermined position determined by design by skewing the magnetic head 28 on the magnetic tape MT0 is known.

The magnetic head 28 comprises a rotation axis RA. The rotation axis RA is provided at a position corresponding to a center portion of the magnetic element unit 42 provided in the magnetic head 28 in a plan view. The magnetic head 28 is rotatably held by the inclination mechanism 49 via the rotation axis RA. An imaginary straight line C3 which is an imaginary center line is provided in the magnetic head 28. The imaginary straight line C3 is a straight line that passes through the rotation axis RA and extends in the longitudinal direction of the magnetic head 28 in a plan view (that is, the direction in which the plurality of data read/write elements DRW are arranged). The magnetic head 28 is held by the inclination mechanism 49 to have a posture in which the imaginary straight line C3 is inclined to the longitudinal direction LD side of the magnetic tape MT0 with respect to an imaginary straight line C4 which is an imaginary straight line along the width direction WD. In the example shown in FIG. 8, the magnetic head 28 is held by the inclination mechanism 49 in a posture in which the imaginary straight line C3 is inclined toward the sending reel 22 side with respect to the imaginary straight line C4 (that is, a posture inclined counterclockwise as viewed from a paper surface side of FIG. 8).

The inclination mechanism 49 receives the power from the inclination actuator 49A (see FIG. 5) to rotate the magnetic head 28 around the rotation axis RA on the front surface 31 of the magnetic tape MT0. The inclination mechanism 49 rotates, under the control of the control device 30, the magnetic head 28 around the rotation axis RA on the front surface 31 of the magnetic tape MT0 to change the direction of the inclination of the imaginary straight line C3 with respect to the imaginary straight line C4 (that is, azimuth) and the inclined angle.

By changing the direction of the inclination of the imaginary straight line C3 with respect to the imaginary straight line C4 and the inclined angle in accordance with the temperature, the humidity, the pressure at which the magnetic tape MT0 is wound around the reel, the temporal deterioration, and the like, or expansion and contraction of the magnetic tape MT in the width direction WD due to these, the position of the servo reading element SR with respect to the servo pattern 52 is held at the predetermined position determined in design.

By the way, the servo reading element SR is formed in a straight line along the imaginary straight line C3. Therefore, in a case in which the servo pattern 52A is read by the servo reading element SR, in the linear magnetization region pair 54A, an angle formed by the linear magnetization region 54A1 and the servo reading element SR and an angle formed by the linear magnetization region 54A2 and the servo reading element SR are different. In a case in which the angles are different in this way, a variation due to an azimuth loss (for example, variation in signal level and waveform distortion) occurs between the servo pattern signal derived from the linear magnetization region 54A1 (that is, the servo pattern signal obtained by reading the linear magnetization region 54A1 by the servo reading element SR) and the servo pattern signal derived from the linear magnetization region 54A2 (that is, the servo pattern signal obtained by reading the linear magnetization region 54A2 by the servo reading element SR). In the example shown in FIG. 8, since the angle formed by the servo reading element SR and the linear magnetization region 54A1 is larger than the angle formed by the servo reading element SR and the linear magnetization region 54A2, the output of the servo pattern signal is small, and the waveform also spreads, so that the variation occurs in the servo pattern signal read by the servo reading element SR across the servo band SB in a state in which the magnetic tape MT travels. In addition, also in a case in which the servo pattern 52B is read by the servo reading element SR, the variation due to the azimuth loss occurs between the servo pattern signal derived from the linear magnetization region 54B1 and the servo pattern signal derived from the linear magnetization region 54B2. Such a variation in the servo pattern signal can contribute to a decrease in the accuracy of the servo control.

Figure 9:
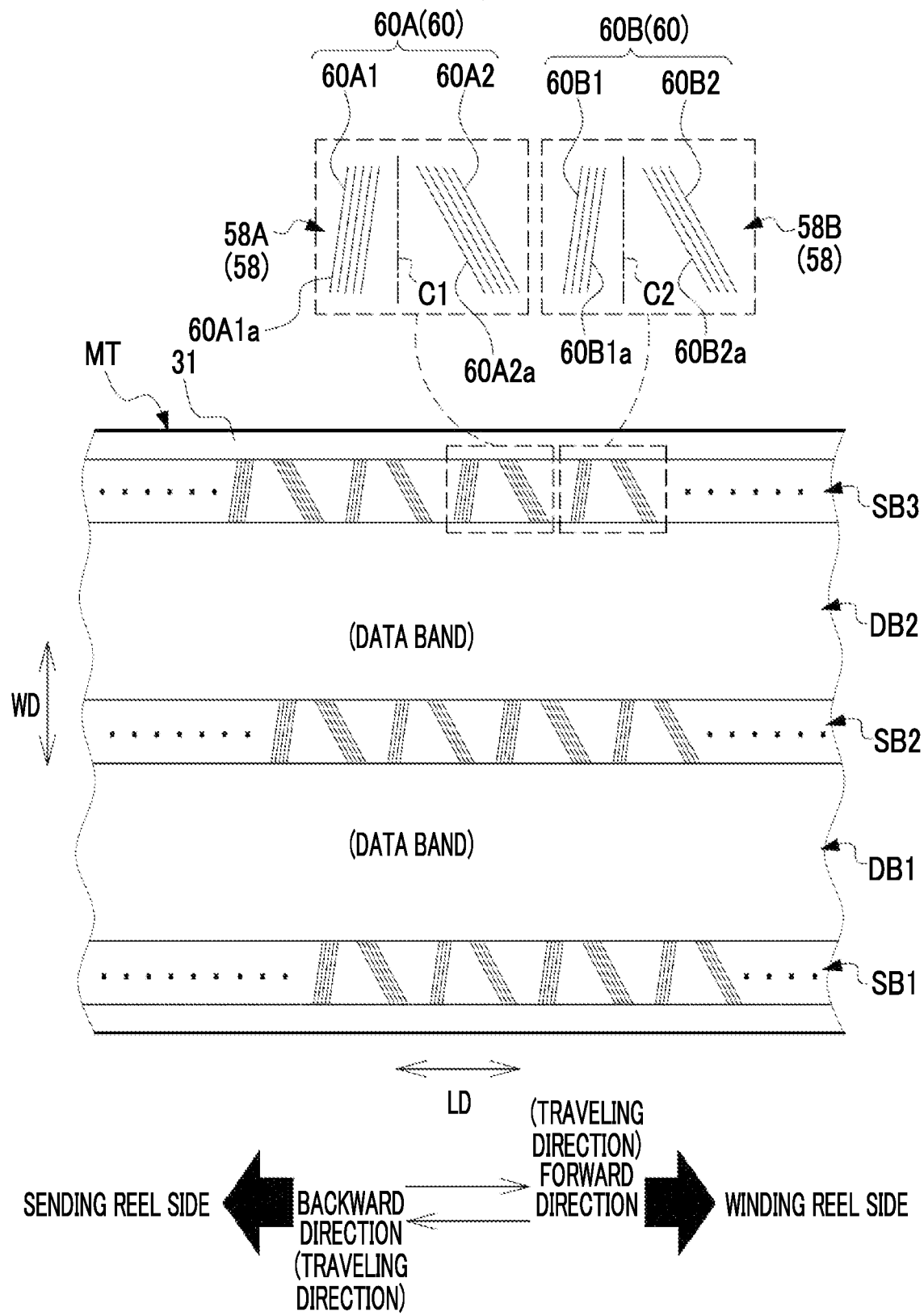
FIG. 9 is a conceptual diagram showing an example of an aspect in which the magnetic tape according to the embodiment is observed from the front surface side of the magnetic tape.

Therefore, in view of such circumstances, in the present embodiment, as shown in FIG. 9, the magnetic tape MT is adopted as an example. The magnetic tape MT is different from the magnetic tape MT0 in that the servo pattern 58 is provided instead of the servo pattern 52. A plurality of servo patterns 58 are recorded in the servo band SB along the longitudinal direction LD of the magnetic tape MT. The plurality of servo patterns 58 are disposed at regular intervals along the longitudinal direction LD of the magnetic tape MT, similarly to the plurality of servo patterns 52 recorded in the magnetic tape MT0.

In the example shown in FIG. 9, servo patterns 58A and 58B are shown as an example of the set of servo patterns 58. The servo patterns 58A and 58B are adjacent to each other along the longitudinal direction LD of the magnetic tape MT. The servo pattern 58A is positioned on the upstream side in the forward direction, and the servo pattern 58B is positioned on the downstream side in the forward direction.

The servo pattern 58 consists of a linear magnetization region pair 60. The linear magnetization region pair 60 is classified into a linear magnetization region pair 60A and a linear magnetization region pair 60B. In the present embodiment, the linear magnetization region pair 60 is an example of a "linear magnetization region pair" according to the technology of the present disclosure.

The servo pattern 58A consists of the linear magnetization region pair 60A. In the example shown in FIG. 9, linear magnetization regions 60A1 and 60A2 are shown as an example of the linear magnetization region pair 60A. Each of the linear magnetization regions 60A1 and 60A2 is a linearly magnetized region.

In the present embodiment, the linear magnetization region 60A1 is an example of a "first linear magnetization region" according to the technology of the present disclosure, and the linear magnetization region 60A2 is an example of a "second linear magnetization region" according to the technology of the present disclosure.

The linear magnetization regions 60A1 and 60A2 are inclined in opposite directions with respect to the imaginary straight line C1. The linear magnetization regions 60A1 and 60A2 are not parallel to each other and are inclined at different angles with respect to the imaginary straight line C1. The linear magnetization region 60A1 has a steeper inclined angle with respect to the imaginary straight line C1 than the linear magnetization region 60A2. Here, "steep" means that, for example, an angle of the linear magnetization region 60A1 with respect to the imaginary straight line C1 is smaller than an angle of the linear magnetization region 60A2 with respect to the imaginary straight line C1.

In addition, a total length of the linear magnetization region 60A1 is shorter than a total length of the linear magnetization region 60A2.

In the servo pattern 58A, a plurality of magnetization straight lines 60A1*a* are included in the linear magnetization region 60A1, and a plurality of magnetization straight lines 60A2*a* are included in the linear magnetization region 60A2. The number of the magnetization straight lines 60A1*a* included in the linear magnetization region 60A1 is the same as the number of the magnetization straight lines 60A2*a* included in the linear magnetization region 60A2.

The linear magnetization region 60A1 is a set of magnetization straight lines 60A1*a*, which are five magnetized straight lines, and the linear magnetization region 60A2 is a set of magnetization straight lines 60A2*a*, which are five magnetized straight lines. In the servo band SB, the positions of both ends of the linear magnetization region 60A1 (that is, the positions of both ends of each of the five magnetization straight lines 60A1*a*) and the positions of both ends of the linear magnetization region 60A2 (that is, the positions of both ends of each of the five magnetization straight lines 60A2*a*) are aligned in the width direction WD. It should be noted that, here, the example has been described in which the positions of both ends of each of the five magnetization straight lines 60A1*a* and the positions of both ends of each of the five magnetization straight lines 60A2*a* are aligned, but this is merely an example, and the positions of both ends of one or more magnetization straight lines 60A1*a* among the five magnetization straight lines 60A1*a* and the positions of both ends of one or more magnetization straight lines 60A2*a* among of the five magnetization straight lines 60A2*a* need only be aligned. In addition, in the present embodiment, the concept of "aligned" also includes meaning of "aligned" including an error generally allowed in the technical field to which the technology of the present disclosure belongs, which is the error to the extent that it does not contradict the purpose of the technology of the present disclosure, in addition to the meaning of being exactly aligned.

The servo pattern 58B consists of the linear magnetization region pair 60B. In the example shown in FIG. 9, linear magnetization regions 60B1 and 60B2 are shown as an example of the linear magnetization region pair 60B. Each of the linear magnetization regions 60B1 and 60B2 is a linearly magnetized region.

In the present embodiment, the linear magnetization region 60B1 is an example of a "first linear magnetization region" according to the technology of the present disclosure, and the linear magnetization region 60B2 is an example of a "second linear magnetization region" according to the technology of the present disclosure.

The linear magnetization regions 60B1 and 60B2 are inclined in opposite directions with respect to the imaginary straight line C2. The linear magnetization regions 60B1 and 60B2 are not parallel to each other and are inclined at different angles with respect to the imaginary straight line C2. The linear magnetization region 60B1 has a steeper inclined angle with respect to the imaginary straight line C2 than the linear magnetization region 60B2. Here, "steep" means that, for example, an angle of the linear magnetization region 60B1 with respect to the imaginary straight line C2 is smaller than an angle of the linear magnetization region 60B2 with respect to the imaginary straight line C2.

In addition, a total length of the linear magnetization region 60B1 is shorter than a total length of the linear magnetization region 60B2.

In the servo pattern 58B, a plurality of magnetization straight lines 60B1a are included in the linear magnetization region 60B1, and a plurality of magnetization straight lines 60B2a are included in the linear magnetization region 60B2. The number of the magnetization straight lines 60B1a included in the linear magnetization region 60B1 is the same as the number of the magnetization straight lines 60B2a included in the linear magnetization region 60B2.

The total number of the magnetization straight lines 60B1a and 60B2a included in the servo pattern 58B is different from the total number of the magnetization straight lines 60A1a and 60A2a included in the servo pattern 58A. In the example shown in FIG. 9, the total number of the magnetization straight lines 60A1a and 60A2a included in the servo pattern 58A is ten, whereas the total number of the magnetization straight lines 60B1a and 60B2a included in the servo pattern 58B is eight.

The linear magnetization region 60B1 is a set of magnetization straight lines 60B1a, which are four magnetized straight lines, and the linear magnetization region 60B2 is a set of magnetization straight lines 60B2a, which are four magnetized straight lines. In the servo band SB, the positions of both ends of the linear magnetization region 60B1 (that is, the positions of both ends of each of the four magnetization straight lines 60B1a) and the positions of both ends of the linear magnetization region 60B2 (that is, the positions of both ends of each of the four magnetization straight lines 60B2a) are aligned in the width direction WD.

It should be noted that, here, the example has been described in which the positions of both ends of each of the four magnetization straight lines 60B1a and the positions of both ends of each of the four magnetization straight lines 60B2a are aligned, but this is merely an example, and the positions of both ends of one or more magnetization straight lines 60B1a among the four magnetization straight lines 60B1a and the positions of both ends of one or more magnetization straight lines 60B2a among of the four magnetization straight lines 60B2a need only be aligned.

In addition, here, the set of magnetization straight lines 60A1a, which are five magnetized straight lines, is described as an example of the linear magnetization region 60A1, the set of magnetization straight lines 60A2a, which are five magnetized straight lines, is described as an example of the linear magnetization region 60A2, the set of magnetization straight lines 60B1a, which are four magnetized straight lines, is described as an example of the linear magnetization region 60B1, and the set of magnetization straight lines 60B2a, which are four magnetized straight lines, is described as an example of the linear magnetization region 60B2, but the technology of the present disclosure is not limited thereto. For example, the linear magnetization region 60A1 need only have the number of the magnetization straight lines 60A1a that contribute to specifying the position of the magnetic head 28 on the magnetic tape MT, the linear magnetization region 60A2 need only have the number of the magnetization straight lines 60A2a that contribute to specifying the position of the magnetic head 28 on the magnetic tape MT, the linear magnetization region 60B1 need only have the number of the magnetization straight lines 60B1a that contribute to specifying the position of the magnetic head 28 on the magnetic tape MT, and the linear magnetization region 60B2 need only have the number of the magnetization straight lines 60B2a that contribute to specifying the position of the magnetic head 28 on the magnetic tape MT.

Here, the geometrical characteristic of the linear magnetization region pair 60A on the magnetic tape MT will be described with reference to FIG. 10. It should be noted that, in the present embodiment, the geometrical characteristic refers to a generally recognized geometrical characteristic, such as a length, a shape, an orientation, and/or a position.

Figure 10:
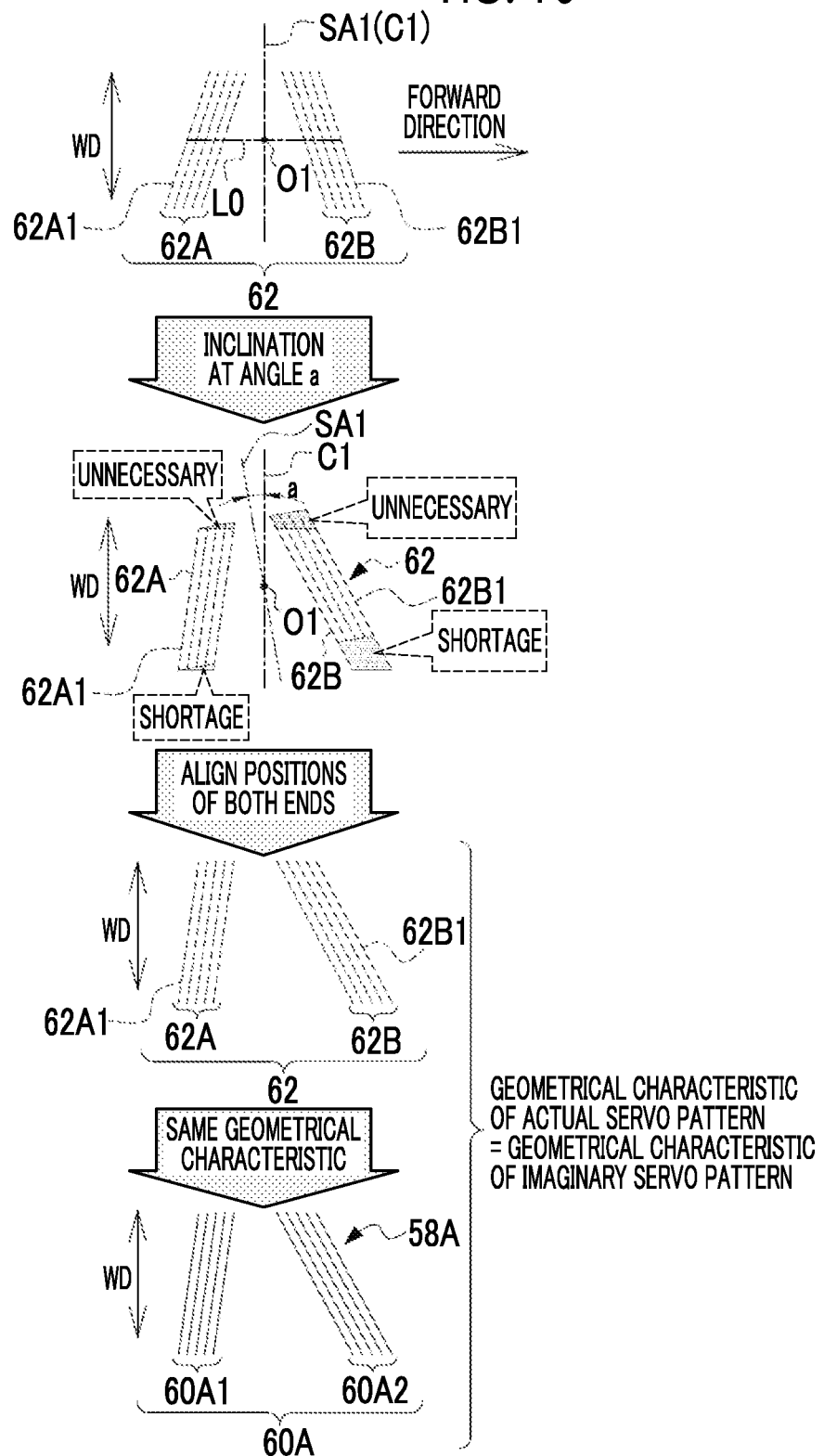
FIG. 10 is a conceptual diagram showing an example of a relationship between a geometrical characteristic of an actual servo pattern and a geometrical characteristic of an imaginary servo pattern.

As an example, as shown in FIG. 10, the geometrical characteristic of the linear magnetization region pair 60A on the magnetic tape MT can be expressed by using an imaginary linear region pair 62. The imaginary linear region pair 62 consists of an imaginary linear region 62A and an imaginary linear region 62B. The geometrical characteristic of the linear magnetization region pair 60A on the magnetic tape MT corresponds to the geometrical characteristic based on the imaginary linear region pair 62 inclined line-symmetrically with respect to the imaginary straight line C1 in a case in which an entirety of the imaginary linear region pair 62 is inclined with respect to the imaginary straight line C1 by inclining a symmetry axis SA1 of the imaginary linear region 62A and the imaginary linear region 62B with respect to the imaginary straight line C1.

In the present embodiment, the imaginary linear region pair 62 is an example of a "pair of imaginary linear regions" according to the technology of the present disclosure, the imaginary linear region 62A is an example of "one imaginary linear region" according to the technology of the present disclosure, and the imaginary linear region 62B is an example of "the other imaginary linear region" according to the technology of the present disclosure.

The imaginary linear region pair 62 is an imaginary linear magnetization region pair having the same geometrical characteristic as the linear magnetization region pair 54A shown in FIG. 6. The imaginary linear region pair 62 is an imaginary magnetization region used for convenience for describing the geometrical characteristic of the linear magnetization region pair 60A on the magnetic tape MT, and is not an actually present magnetization region.

The imaginary linear region 62A has the same geometrical characteristic as the linear magnetization region 54A1 shown in FIG. 6, and consists of five imaginary straight lines 62A1 corresponding to the five magnetization straight lines 54A1a shown in FIG. 6. The imaginary linear region 62B has the same geometrical characteristic as the linear magnetization region 54B1 shown in FIG. 6, and consists of five imaginary straight lines 62B1 corresponding to the five magnetization straight lines 54A2a shown in FIG. 6.

A center O1 is provided in the imaginary linear region pair 62. For example, the center O1 is a center of a line segment LO connecting a center of the straight line 62A1 positioned on the most upstream side of the five straight lines 62A1 in the forward direction and a center of the straight line 62B1 positioned on the most downstream side of the five straight lines 62B1 in the forward direction.

Since the imaginary linear region pair 62 has the same geometrical characteristic as the linear magnetization region pair 54A shown in FIG. 6, the imaginary linear region 62A and the imaginary linear region 62B are inclined line-symmetrically with respect to the imaginary straight line C1. Here, a case will be considered in which reading by the servo reading element SR is performed tentatively with respect to the imaginary linear region pair 62 in a case in which the entirety of the imaginary linear region pair 62 is inclined with respect to the imaginary straight line C1 by inclining the symmetry axis SA1 of the imaginary linear regions 62A and 62B at an angle $\alpha$ (for example, 10 degrees) with respect to the imaginary straight line C1 with the center O1 as the rotation axis. In this case, in the imaginary linear region pair 62, in the width direction WD, a portion is generated in which the imaginary linear region 62A is read but the imaginary linear region 62B is not read or the imaginary linear region 62A is not read is read but the imaginary linear region 62B. That is, in each of the imaginary linear regions 62A and 62B, in a case in which reading by the servo reading element SR is performed, a shortage part and an unnecessary part is generated.

Therefore, by compensating for the shortage part and removing the unnecessary part, the positions of both ends of the imaginary linear region 62A (that is, the positions of both ends of each of the five straight lines 62A1) and the positions of both ends of the imaginary linear region 62B (that is, the positions of both ends of each of the five straight lines 62B1) are aligned in the width direction WD.

The geometrical characteristic of the imaginary linear region pair 62 (that is, the geometrical characteristic of the imaginary servo pattern) obtained as described above corresponds to the geometrical characteristic of the actual servo pattern 58A. That is, the linear magnetization region pair 60A having the geometrical characteristic corresponding to the geometrical characteristic of the imaginary linear region pair 62 obtained by aligning the positions of both ends of the imaginary linear region 62A and the positions of both ends of the imaginary linear region 62B in the width direction WD is recorded in the servo band SB.

Figure 11:
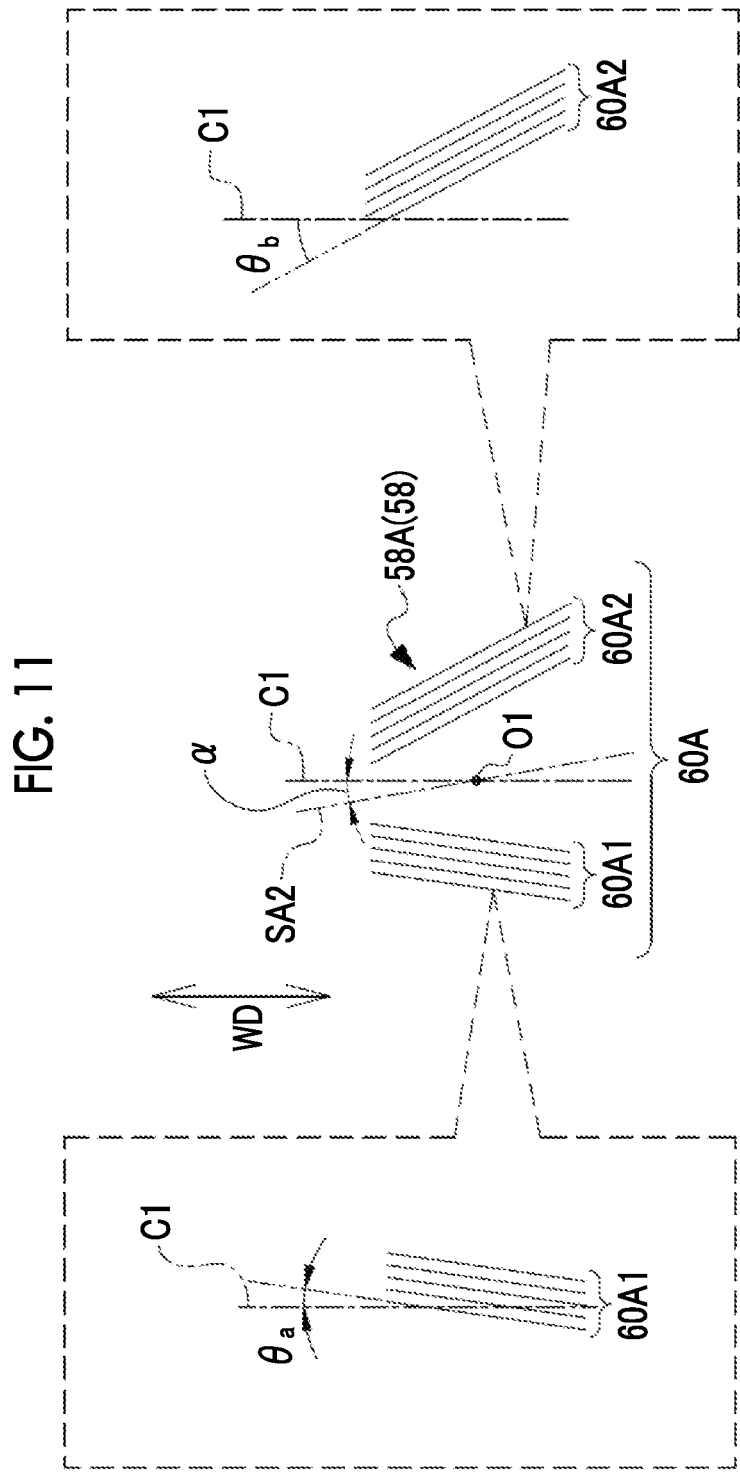
FIG. 11 is a conceptual diagram showing an example of an inclined angle of the actual servo pattern.

Here, the inclination of the geometrical characteristic of the linear magnetization region pair 60A with respect to the imaginary straight line C1 will be described with reference to FIG. 11. The geometrical characteristic of the linear magnetization region pair 60A corresponds to the geometrical characteristic of the imaginary linear region pair 62. Therefore, similarly to the imaginary linear region pair 62, the linear magnetization region pair 60A is obtained by inclining a symmetry axis SA2 of the linear magnetization regions 60A1 and 60B2 at an angle $\alpha$ (that is, corresponding to the angle a) with respect to the imaginary straight line C1 with the center O1 as the rotation axis. That is, the entirety of the linear magnetization region pair 60A is inclined by the angle $\alpha$ with respect to the imaginary straight line C1. Therefore, the servo pattern 58 including the linear magnetization region pair 60A is also inclined at the angle $\alpha$ (hereinafter, referred to as an inclined angle $\alpha$ of the servo pattern 58) with respect to the imaginary straight line C1.

Further, the linear magnetization region 60A1 of the linear magnetization region pair 60A is inclined at an angle $\theta$a (hereinafter, referred to as an inclined angle $\theta$a of the linear magnetization region 60A1) with respect to the imaginary straight line C1. In addition, the linear magnetization region 60A2 of the linear magnetization region pair 60A is inclined at an angle $\theta$b (hereinafter, referred to as an inclined angle $\theta$b of the linear magnetization region 60A2) with respect to the imaginary straight line C1. Both the inclined angle $\theta$a of the linear magnetization region 60A1 and the inclined angle $\theta$b of the linear magnetization region 60A2 correspond to the inclined angle $\alpha$ of the servo pattern 58.

It should be noted that the linear magnetization region pair 60B is different from the linear magnetization region pair 60A only in that the four magnetization straight lines 60B1a are provided instead of the five magnetization straight lines 60A1a and the four magnetization straight lines 60B2a are provided instead of the five magnetization straight lines 60A2a. Therefore, the linear magnetization region pair 60B having the geometrical characteristic corresponding to the geometrical characteristic of the imaginary linear region pair (not shown) obtained by aligning the positions of both ends of each of the four straight lines 62A1 and the positions of both ends of each of the four straight lines 62B1 in the width direction WD is recorded in the servo band SB.

Figure 12:
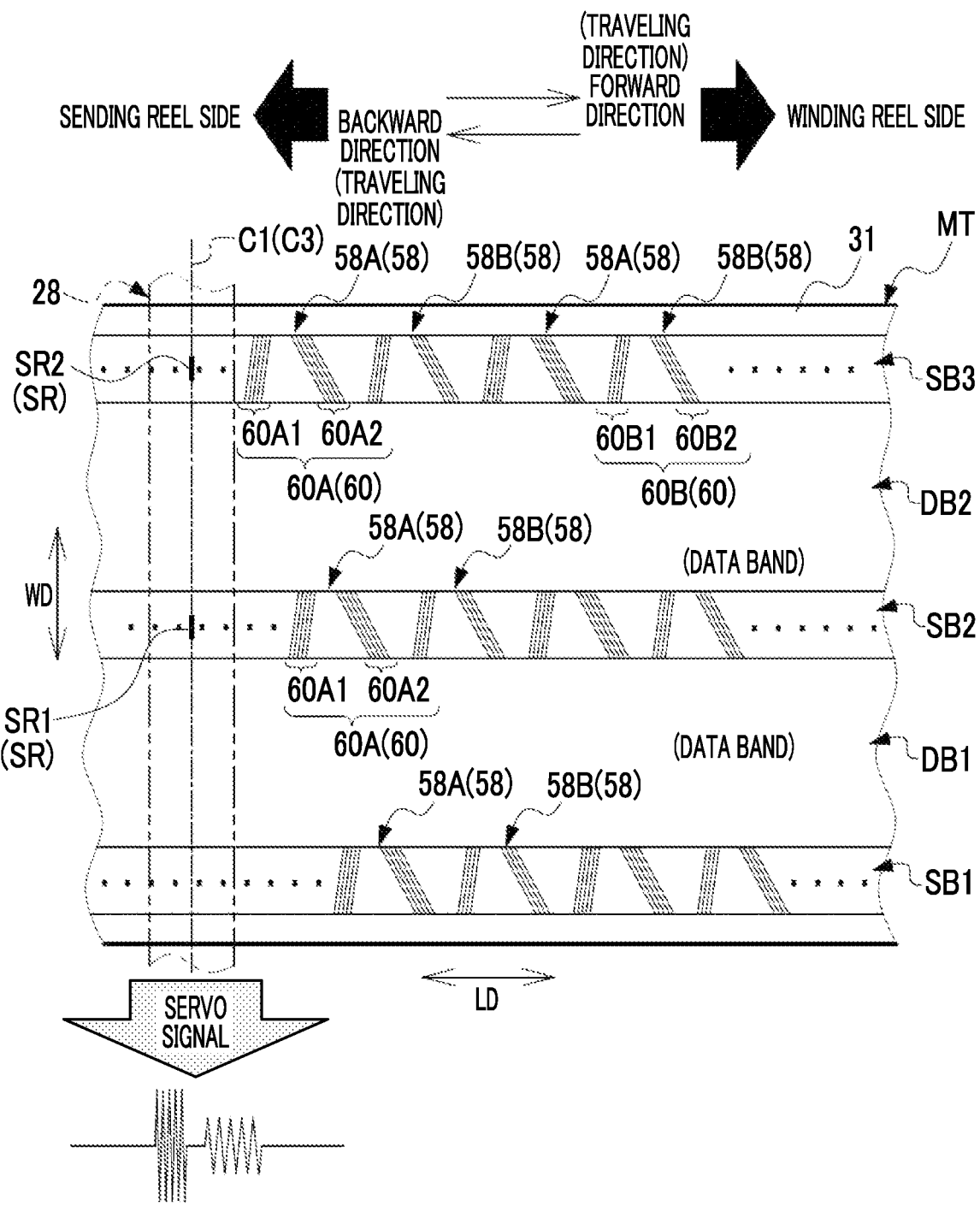
FIG. 12 is a conceptual diagram showing an example of an aspect in which a state in which the servo pattern is read by a servo reading element provided in the magnetic head that is not skewed on the magnetic tape according to the embodiment is observed from the front surface side of the magnetic tape.

As an example, as shown in FIG. 12, in a case in which the servo pattern 58A (that is, the linear magnetization region pair 60A) is read by the servo reading element SR in a state in which the direction of the imaginary straight line C1 and the direction of the imaginary straight line C3 match (that is, a state in which the longitudinal direction of the magnetic head 28 and the width direction WD match), the variation due to the azimuth loss occurs between the servo pattern signal derived from the linear magnetization region 60A1 and the servo pattern signal derived from the linear magnetization region 60A2. In addition, also in a case in which the servo pattern 58B (that is, the linear magnetization region pair 60B) is read by the servo reading element SR in a state in which the direction of the imaginary straight line C1 and the direction of the imaginary straight line C3 match (that is, a state in which the longitudinal direction of the magnetic head 28 and the width direction WD match), a similar phenomenon occurs.

Figure 13:
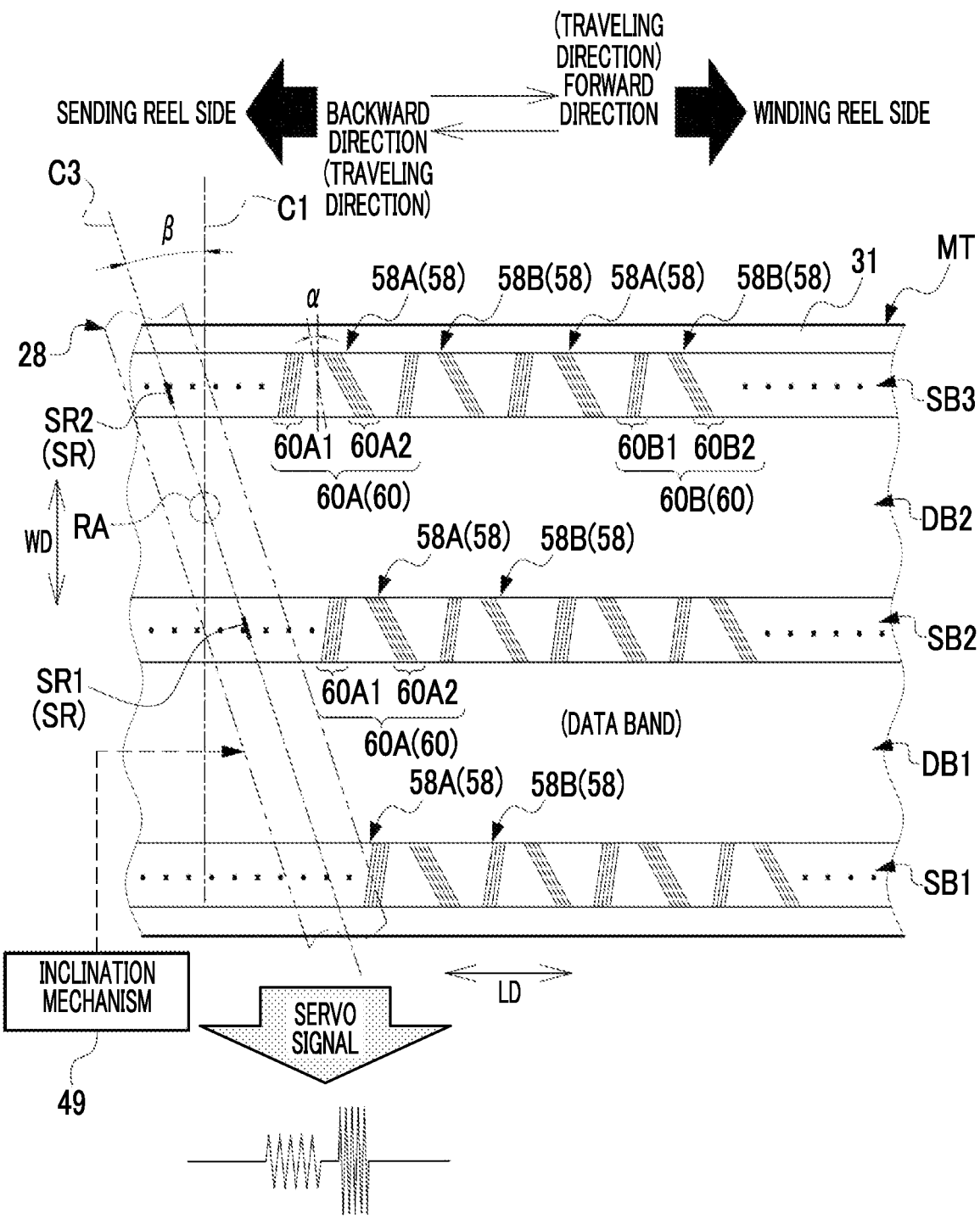
FIG. 13 is a conceptual diagram showing an example of an aspect in which a state in which the servo pattern is read by the servo reading element provided in the magnetic head that is skewed on the magnetic tape according to the embodiment is observed from the front surface side of the magnetic tape.

Here, as an example, as shown in FIG. 13, the inclination mechanism 49 (see FIG. 8) skews the magnetic head 28 on the magnetic tape MT around the rotation axis RA such that the imaginary straight line C3 is inclined with respect to the imaginary straight line C1 to the upstream side in the forward direction at an angle $\beta$ (that is, the angle $\beta$ counterclockwise as viewed from the paper surface side of FIG. 13) (hereinafter, for convenience of description, the angle of the imaginary straight line C3 with respect to the imaginary straight line C1 is referred to as "magnetic head skew angle"). Even in this case, in a case in which there is a large deviation between the inclined angle $\alpha$ of the servo pattern 58 and the magnetic head skew angle (for example, the inclined angle $\alpha$ of the servo pattern 58 is 5 degrees and the magnetic head skew angle is 10 degrees), the variation due to the azimuth loss may occur between the servo pattern signals.

In the example shown in FIG. 13, since the angle formed by the servo reading element SR and the linear magnetization region 60A1 is larger than the angle formed by the servo reading element SR and the linear magnetization region 60A2, the output of the servo pattern signal is small, and the waveform also spreads, so that the variation occurs in the servo pattern signal read by the servo reading element SR across the servo band SB in a state in which the magnetic tape MT travels. In addition, also in a case in which the servo pattern 58B is read by the servo reading element SR, the variation due to the azimuth loss occurs between the servo pattern signal derived from the linear magnetization region 60B1 and the servo pattern signal derived from the linear magnetization region 60B2.

Figure 14:
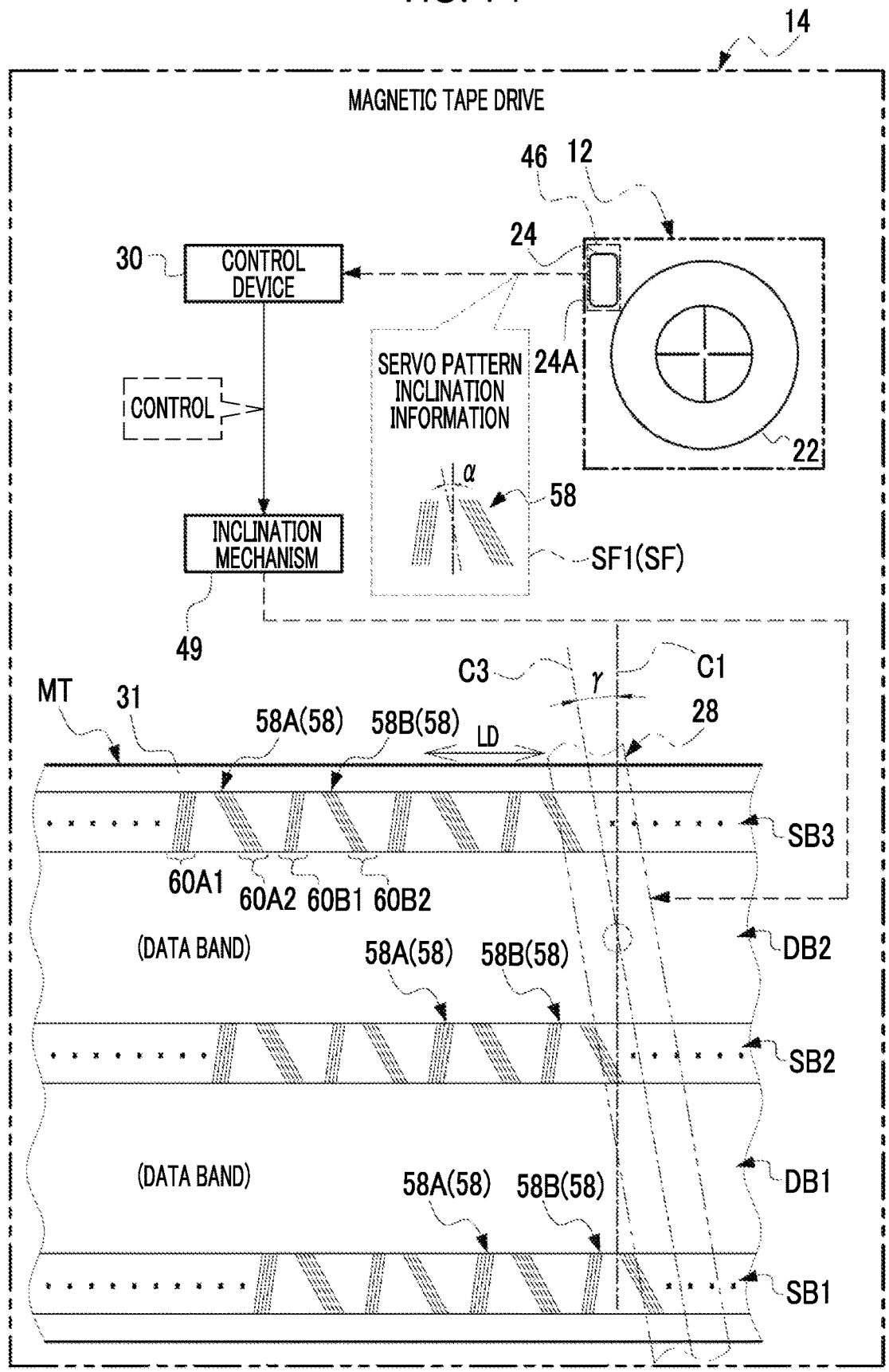
FIG. 14 is a conceptual diagram showing an example of a function of a control device provided in the magnetic tape drive according to the embodiment.

Therefore, as shown in FIG. 14 as an example, the control device 30 performs skew angle control of the magnetic head 28 based on servo format information SF of the magnetic tape MT. The servo format information SF is stored in the cartridge memory 24 provided in the magnetic tape cartridge 12. The control device 30 acquires the servo format information SF from the cartridge memory 24 via the noncontact read/write device 46.

The servo format information SF includes servo pattern inclination information SF1. The servo pattern inclination information SF1 refers to information on the inclination of the servo pattern 58. Examples of the servo pattern inclination information SF1 include information indicating the inclined angle α of the servo pattern 58, but this is merely an example. For example, the servo pattern inclination information SF1 includes information indicating the angle θa (see FIG. 11) of the linear magnetization region 60A1 with respect to the imaginary straight line C1 and the angle θb (see FIG. 11) of the linear magnetization region 60A2 with respect to the imaginary straight line C1. Similarly, the servo pattern inclination information SF1 includes information indicating the angle θa (see FIG. 11) of the linear magnetization region 60B1 with respect to the imaginary straight line C2 and the angle θb (see FIG. 11) of the linear magnetization region 60B2 with respect to the imaginary straight line C2.

The inclined angle α of the servo pattern 58 corresponds to, for example, a skew angle of a servo pattern recording head WH (see FIG. 18) in a case in which the servo pattern 58 is recorded in a manufacturing stage of the magnetic tape MT, and is an angle obtained in the manufacturing stage of the magnetic tape MT, but this is merely an example. For example, the servo pattern inclination information SF1 may be a design value or an actual measurement value of the inclined angle α of the servo pattern 58 in the manufacturing stage of the magnetic tape MT (for example, the inclined angle α itself of the servo pattern 58 actually recorded in the magnetic tape MT), and may be a result obtained from a simulation and/or an experiment related to a change in the inclined angle α of the servo pattern 58 with a change in the width of the magnetic tape MT. In addition, the servo pattern inclination information SF1 may be the inclined angle α of the servo pattern 58 that is reflected as an image in the image obtained by developing the magnetic tape MT. Further, the servo pattern inclination information SF1 may be a result of calculating the inclined angle α of the servo pattern 58 based on a measurement result of an amount in which the width of the magnetic tape MT is changed over the total length of the magnetic tape MT (hereinafter, also referred to as "width change amount measurement result"). In this case, the servo pattern inclination information SF1 may be calculated from a function using a fixed value predetermined as a reference value of the inclined angle α and a variable based on the width change amount measurement result.

The control device 30 operates the inclination mechanism 49 based on the servo format information SF. As a result, the magnetic head skew angle is adjusted. For example, the magnetic head skew angle is adjusted to the same angle as the inclined angle α of the servo pattern 58. In addition, in the present embodiment, the concept of "same" also includes meaning of "same" including an error generally allowed in the technical field to which the technology of the present disclosure belongs, which is the error to the extent that it does not contradict the purpose of the technology of the present disclosure, in addition to the meaning of exactly the same.

In addition, the magnetic head skew angle may be adjusted to an angle at which the azimuth loss falls within an allowable range (hereinafter, also simply referred to as "allowable range"). Here, the allowable range refers to a range in which the accuracy of detection of the servo pattern 58 is equal to or higher than a certain level. In a case in which the magnetic head skew angle falls within the allowable range in this way, for example, the control device 30 need only derive the angle falling within the allowable range as the magnetic head skew angle with reference to the servo format information SF. It should be noted that the angle falling within the allowable range need only be derived from, for example, a table or an arithmetic expression in which the servo format information SF and the magnetic head skew angle are associated with each other.

Figure 15:
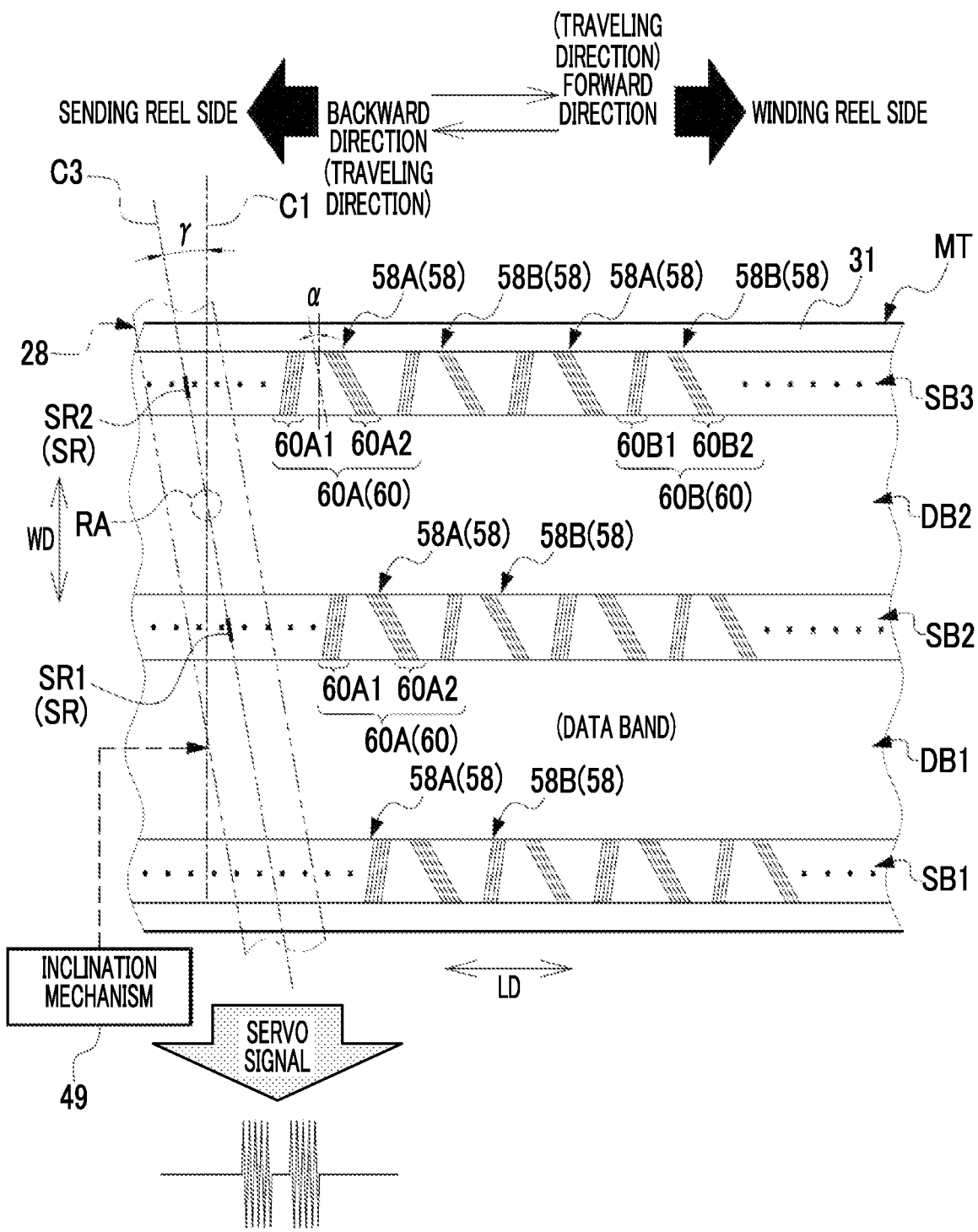
FIG. 15 is a conceptual diagram showing an example of an aspect in which a state in which the servo pattern is read by the servo reading element provided in the magnetic head that is skewed on the magnetic tape according to the embodiment is observed from the front surface side of the magnetic tape.

As an example, as shown in FIG. 15, the inclination mechanism 49 skews the magnetic head 28 on the magnetic tape MT around the rotation axis RA such that the imaginary straight line C3 is inclined with respect to the imaginary straight line C1 to the upstream side in the forward direction at an angle γ (that is, the angle γ counterclockwise as viewed from the paper surface side of FIG. 15). In this way, the magnetic head 28 is inclined at the angle γ to the upstream side in the forward direction on the magnetic tape MT. Here, the angle γ is the same as the inclined angle α of the servo pattern 58. As a result, than in the examples shown in FIGS. 12 and 13, the variation due to the azimuth loss between the servo pattern signal derived from the linear magnetization region 60A1 and the servo pattern signal derived from the linear magnetization region 60A2 is smaller. In addition, also in a case in which the servo pattern 58B (that is, the linear magnetization region pair 60B) is read by the servo reading element SR, similarly, the variation due to the azimuth loss between the servo pattern signal derived from the linear magnetization region 60B1 and the servo pattern signal derived from the linear magnetization region 60B2 is small.

Figure 16:
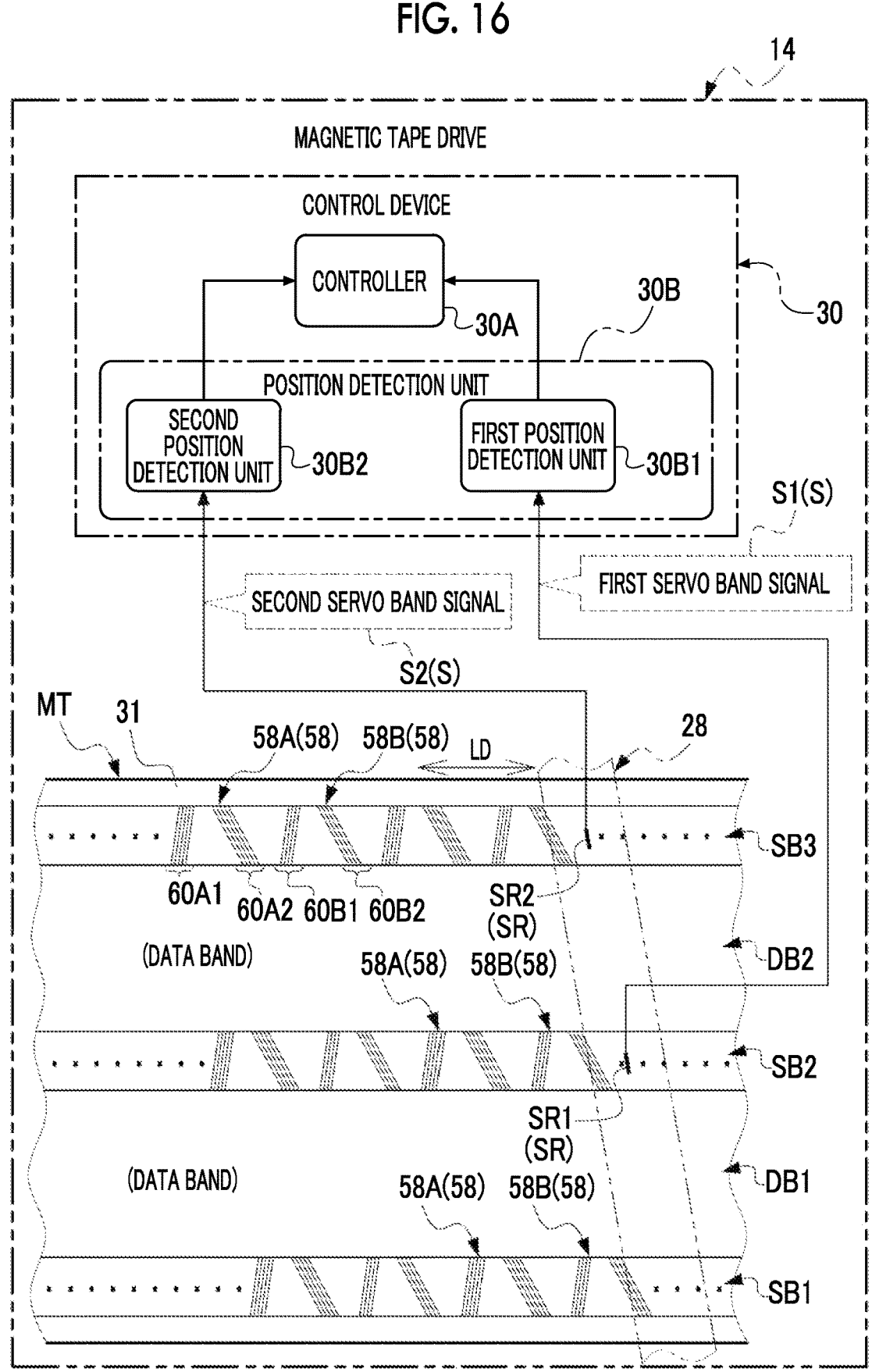
FIG. 16 is a conceptual diagram showing an example of the function of the control device provided in the magnetic tape drive according to the embodiment.

As an example, as shown in FIG. 16, the control device 30 includes a controller 30A and a position detection unit 30B. The position detection unit 30B includes a first position detection unit 30B1 and a second position detection unit 30B2. The position detection unit 30B acquires a servo band signal S that is a result of reading the servo band SB by the servo reading element SR, and detects the position of the magnetic head 28 on the magnetic tape MT based on the acquired servo band signal S. The servo band signal S includes a signal (for example, noise) unnecessary for the servo control in addition to the servo pattern signal which is the result of reading the servo pattern 58. Therefore, in order to realize the control based on the servo pattern signal (for example, servo control) with high accuracy, the control device 30 needs to detect the servo pattern signal from the servo band signal S with high accuracy.

The servo band signal S is classified into a first servo band signal S1 and a second servo band signal S2. The first servo band signal S1 is the servo band signal S which is a result of reading the servo band SB2 by the servo reading element SR1, and the second servo band signal S2 is the servo band signal S which is a result of reading the servo band SB3 by the servo reading element SR2.

The first position detection unit 30B1 acquires the first servo band signal S1, and the second position detection unit 30B2 acquires the second servo band signal S2. In the example shown in FIG. 16, the first position detection unit 30B1 acquires the first servo band signal S1 obtained by reading the servo band SB2 by the servo reading element SR1, and the second position detection unit 30B2 acquires the second servo band signal S2 obtained by reading the servo band SB3 by the servo reading element SR2. The first position detection unit 30B1 detects the position of the servo reading element SR1 with respect to the servo band SB2 based on the first servo band signal S1, and the second position detection unit 30B2 detects the position of the servo reading element SR2 with respect to the servo band SB3 based on the second servo band signal S2.

The controller 30A performs various controls based on a position detection result by the first position detection unit 30B1 (that is, a result of detecting the position by the first position detection unit 30B1) and a position detection result by the second position detection unit 30B2 (that is, a result of detecting the position by the second position detection unit 30B2). Here, the various controls refer to, for example, the servo control, a skew angle control, and/or a tension control. The tension control refers to a control of the tension applied to the magnetic tape MT (for example, the tension for reducing the influence of the TDS).

Figure 17:
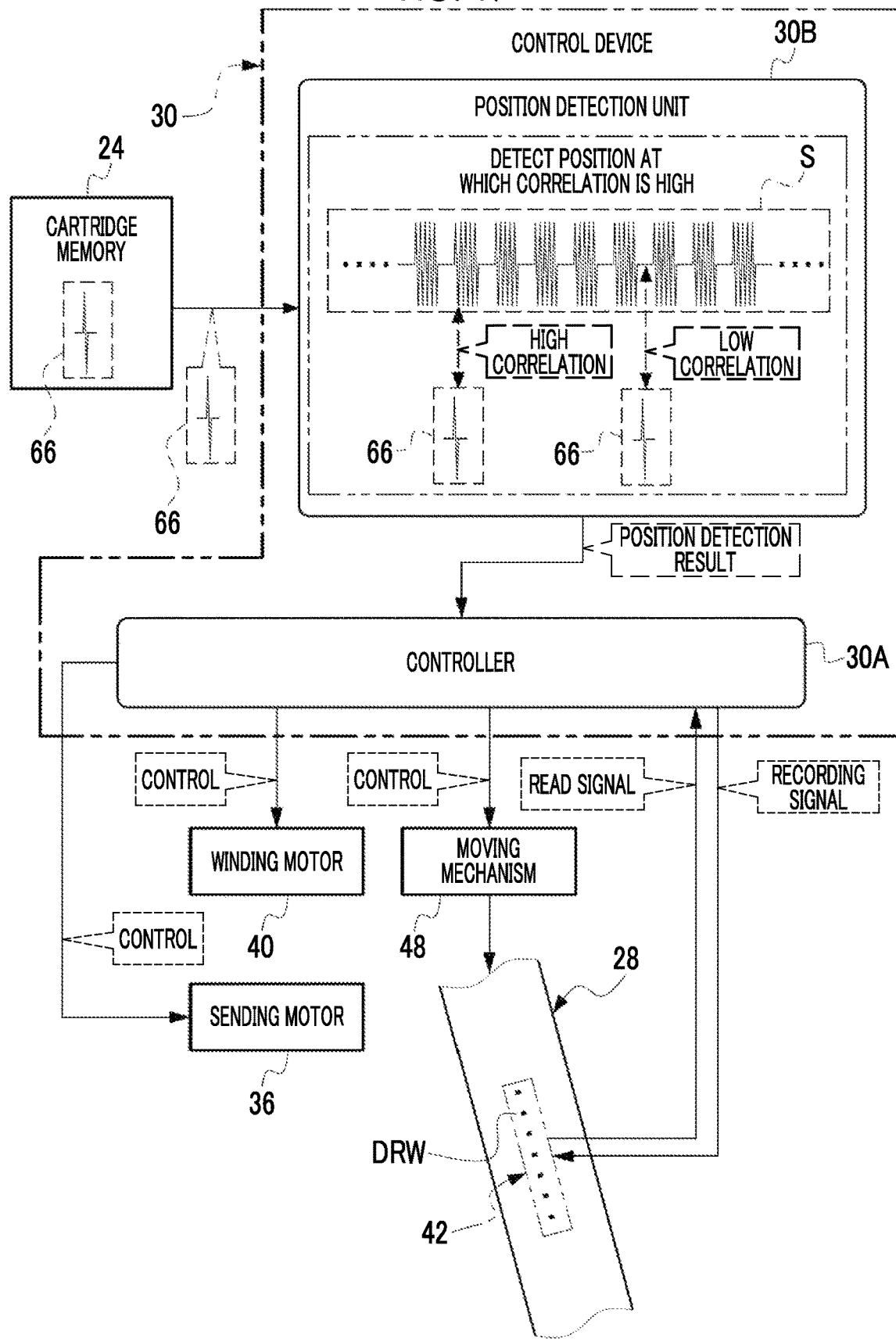
FIG. 17 is a conceptual diagram showing an example of functions of a controller and a position detection unit provided in the control device provided in the magnetic tape drive according to the embodiment.

As an example, as shown in FIG. 17, the position detection unit 30B detects the servo pattern signal, which is the result of reading the servo pattern 58 from the magnetic tape MT by the servo reading element SR, by using an autocorrelation coefficient.

An ideal waveform signal 66 is stored in the cartridge memory 24. That is, the servo format information SF stored in the cartridge memory 24 includes the ideal waveform signal 66. The ideal waveform signal 66 is a signal indicating a single ideal waveform included in the servo band signal S (for example, an ideal signal which is a result of reading one of ideal magnetization straight lines included in the servo pattern 58 by the servo reading element SR). The ideal waveform signal 66 can be said to be a sample signal compared with the servo band signal S. It should be noted that, here, the form example has been described in which the ideal waveform signal 66 is stored in the cartridge memory 24, but this is merely an example. For example, the ideal waveform signal 66 may be stored in the storage 32 together with the cartridge memory 24. In addition, the ideal waveform signal 66 may be recorded in a BOT region MT1 (see FIG. 41) provided at the beginning of the magnetic tape MT and/or in an EOT region MT2 (see FIG. 41) provided at the end of the magnetic tape MT.

The autocorrelation coefficient used by the position detection unit 30B is a coefficient indicating a degree of correlation between the servo band signal S and the ideal waveform signal 66. The position detection unit 30B acquires the ideal waveform signal 66 from the storage 32 to compare the acquired ideal waveform signal 66 with the servo band signal S. Moreover, the position detection unit 30B calculates the autocorrelation coefficient based on the comparison result. The position detection unit 30B detects a position on the servo band SB at which the correlation between the servo band signal S and the ideal waveform signal 66 is high (for example, a position at which the servo band signal S and the ideal waveform signal 66 match) in accordance with the autocorrelation coefficient.

The position of the servo reading element SR with respect to the servo band SB is detected based on, for example, an interval between the servo patterns 58A and 58B in the longitudinal direction LD. For example, the interval between the servo patterns 58A and 58B in the longitudinal direction LD is detected in accordance with the autocorrelation coefficient. In a case in which the servo reading element SR is positioned on the upper side of the servo pattern 58 (that is, the upper side in the front view of the paper in FIG. 16), an interval between the linear magnetization region 60A1 and the linear magnetization region 60A2 is narrowed, and an interval between the linear magnetization region 60B1 and the linear magnetization region 60B2 is also narrowed. On the other hand, in a case in which the servo reading element SR is positioned on the lower side of the servo pattern 58 (that is, the lower side in the front view of the paper in FIG. 16), the interval between the linear magnetization region 60A1 and the linear magnetization region 60A2 is widened, and the interval between the linear magnetization region 60B1 and the linear magnetization region 60B2 is also widened. As described above, the position detection unit 30B detects the position of the servo reading element SR with respect to the servo band SB by using the interval between the linear magnetization region 60A1 and the linear magnetization region 60A2 and the interval between the linear magnetization region 60B1 and the linear magnetization region 60B2 detected in accordance with the autocorrelation coefficient.

The controller 30A adjusts the position of the magnetic head 28 by operating the moving mechanism 48 based on the position detection result of the position detection unit 30B (that is, the result of detecting the position by the position detection unit 30B). In addition, the controller 30A causes the magnetic element unit 42 to perform the magnetic processing on the data band DB of the magnetic tape MT. That is, the controller 30A acquires a read signal (that is, data read from the data band DB of the magnetic tape MT by the magnetic element unit 42) from the magnetic element unit 42, or supplies a recording signal to the magnetic element unit 42 to record the data in response to the recording signal in the data band DB of the magnetic tape MT.

In addition, in order to reduce the influence of the TDS, the controller 30A calculates the servo band pitch from the position detection result of the position detection unit 30B, and performs the tension control in accordance with the calculated servo band pitch, or skews the magnetic head 28 on the magnetic tape MT. The tension control is realized by adjusting the rotation speed, rotation torque, and the like of each of the sending motor 36 and the winding motor 40. The skew of the magnetic head 28 is realized by operating the inclination mechanism 49.

Next, among a plurality of steps included in a manufacturing process of the magnetic tape MT, an example of a servo pattern recording step of recording the servo pattern 58 on the servo band SB of the magnetic tape MT and an example of a winding step of winding the magnetic tape MT will be described.

Figure 18:
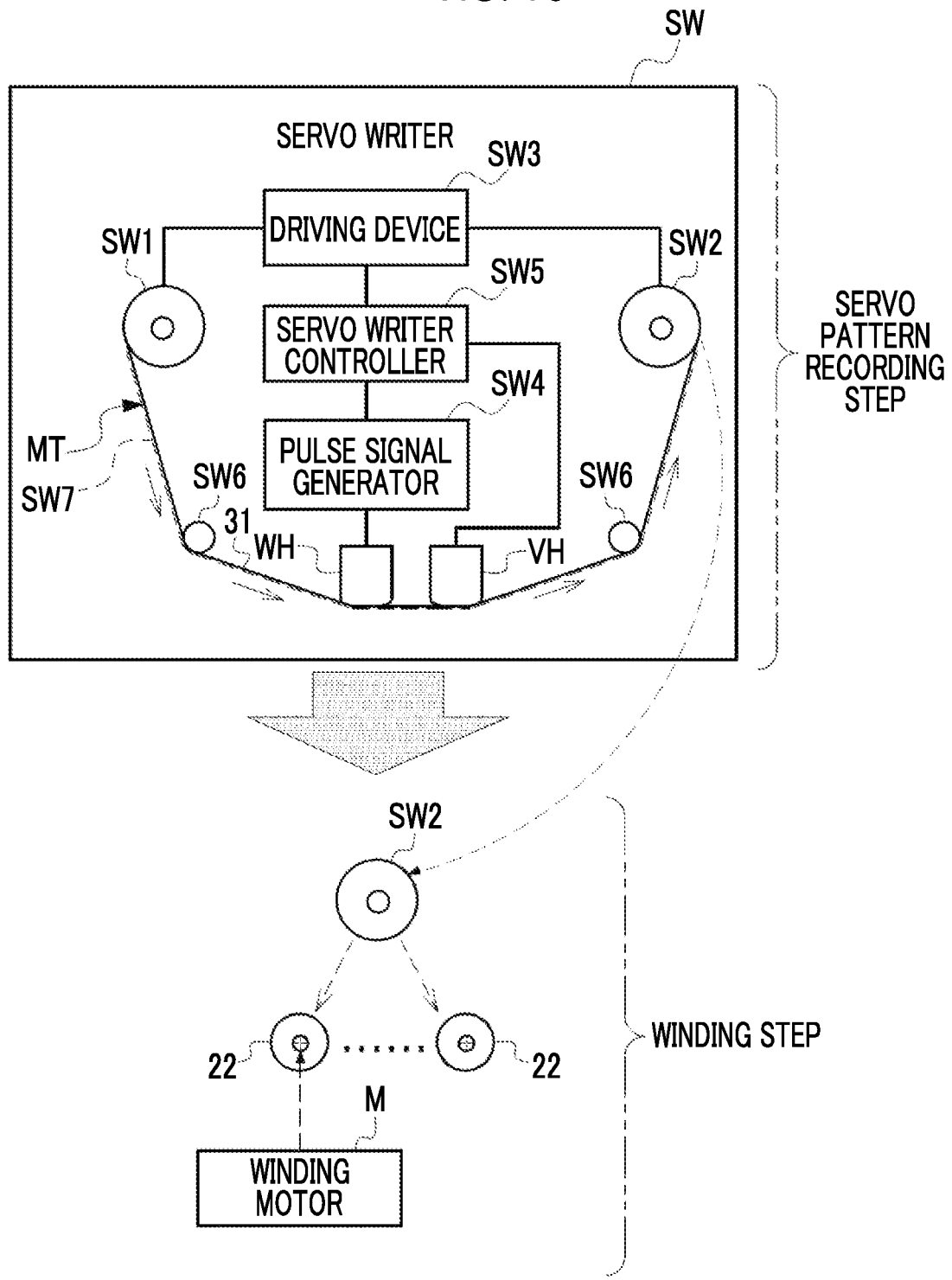
FIG. 18 is a conceptual diagram showing an example of a configuration of a servo writer according to the embodiment.

As an example, as shown in FIG. 18, a servo writer SW is used in the servo pattern recording step. The servo writer SW comprises a sending reel SW1, a winding reel SW2, a driving device SW3, a pulse signal generator SW4, a servo writer controller SW5, a plurality of guides SW6, a transport passage SW7, a servo pattern recording head WH, and a verification head VH.

The servo writer controller SW5 controls the entirety of the servo writer SW. In the present embodiment, although the servo writer controller SW5 is realized by an ASIC, the technology of the present disclosure is not limited to this. For example, the servo writer controller SW5 may be realized by an FPGA and/or a PLC. In addition, the servo writer controller SW5 may be realized by the computer including a CPU, a flash memory (for example, an EEPROM and/or an SSD), and a RAM. In addition, the servo writer controller SW5 may be realized by combining two or more of an ASIC, an FPGA, a PLC, and a computer. That is, the servo writer controller SW5 may be realized by a combination of a hardware configuration and a software configuration.

A pancake is set in the sending reel SW1. The pancake refers to a large-diameter roll in which the magnetic tape MT cut into a product width from a wide web raw material before writing the servo pattern 58 is wound around a hub.

The driving device SW3 has a motor (not shown) and a gear (not shown), and is mechanically connected to the sending reel SW1 and the winding reel SW2. In a case in which the magnetic tape MT is wound by the winding reel SW2, the driving device SW3 generates power in accordance with the command from the servo writer controller SW5, and transmits the generated power to the sending reel SW1 and the winding reel SW2 to rotate the sending reel SW1 and the winding reel SW2. That is, the sending reel SW1 receives the power from the driving device SW3 and is rotated to send the magnetic tape MT to the predetermined transport passage SW7. The winding reel SW2 receives the power from the driving device SW3 and is rotated to wind the magnetic tape MT sent from the sending reel SW1. The rotation speed, the rotation torque, and the like of the sending reel SW1 and the winding reel SW2 are adjusted in accordance with a speed at which the magnetic tape MT is wound around the winding reel SW2.

The plurality of guides SW6 and the servo pattern recording head WH are disposed on the transport passage SW7. The servo pattern recording head WH is disposed on the front surface 31 side of the magnetic tape MT between the plurality of guides SW6. The magnetic tape MT sent from the sending reel SW1 to the transport passage SW7 is guided by the plurality of guides SW6 and is wound by the winding reel SW2 via the servo pattern recording head WH.

The manufacturing process of the magnetic tape MT includes a plurality of steps in addition to the servo pattern recording step. The plurality of steps include the inspection step and the winding step.

For example, the inspection step is a step of inspecting the servo band SB formed on the front surface 31 of the magnetic tape MT by the servo pattern recording head WH. The inspection of the servo band SB refers to, for example, processing of determining the correctness of the servo pattern 58 recorded in the servo band SB. The determination of the correctness of the servo pattern 58 refers to, for example, the determination (that is, verification of the servo pattern 58) whether or not the servo patterns 58A and 58B are recorded in a predetermined portion of the front surface 31 without excess or deficiency of the magnetization straight lines 60A1*a*, 60A2*a*, 60B1*a*, and 60B2*a* and within an allowable error.

The inspection step is performed by using the servo writer controller SW5 and the verification head VH. The verification head VH is disposed on the downstream side of the servo pattern recording head WH in a transport direction of the magnetic tape MT. In addition, the verification head VH includes a plurality of servo reading elements (not shown) similarly to the magnetic head 28, and the plurality of servo bands SB are read by the plurality of servo reading elements. Further, the verification head VH is skewed on the front surface 31 of the magnetic tape MT, similarly to the magnetic head 28. It should be noted that the verification head VH is an example of a "magnetic head" according to the technology of the present disclosure.

The verification head VH is connected to the servo writer controller SW5. The verification head VH is disposed at a position facing the servo band SB as viewed from the front surface 31 side of the magnetic tape MT (that is, the rear surface side of the verification head VH), and reads the servo pattern 58 recorded in the servo band SB, and outputs a reading result (hereinafter, referred to as "servo pattern reading result") to the servo writer controller SW5. The servo writer controller SW5 inspects the servo band SB (for example, determines the correctness of the servo pattern 58) based on the servo pattern reading result (for example, the servo band signal S) input from the verification head VH. For example, the servo writer controller SW5 is operated as the position detection unit 30B shown in FIG. 17 to acquire the position detection result from the servo pattern reading result, and inspects the servo band SB by determining the correctness of the servo pattern 58 by using the position detection result.

The servo writer controller SW5 outputs information indicating the result of inspecting the servo band SB (for example, the result of determining the correctness of the servo pattern 58) to a predetermined output destination (for example, the storage 32 (see FIG. 3), the UI system device 34 (see FIG. 3), and/or the external device 37 (see FIG. 3)).

For example, in a case in which the inspection step is terminated, the winding step is then performed. The winding step is a step of winding the magnetic tape MT around the sending reel 22 (that is, the sending reel 22 (see FIGS. 2 to 4) accommodated in the magnetic tape cartridge 12 (see FIGS. 1 to 4)) used for each of the plurality of magnetic tape cartridges 12 (see FIGS. 1 to 4). In the winding step, a winding motor M is used. The winding motor M is mechanically connected to the sending reel 22 via a gear and the like. The winding motor M rotates the sending reel 22 by applying a rotation force to the sending reel 22 under the control of the control device (not shown). The magnetic tape MT wound around the winding reel SW2 is wound around the sending reel 22 by the rotation of the sending reel 22. In the winding step, a cutting device (not shown) is used. In a case in which a required amount of the magnetic tape MT is wound around the sending reel 22 for each of the plurality of sending reels 22, the magnetic tape MT sent from the winding reel SW2 to the sending reel 22 is cut by the cutting device.

The pulse signal generator SW4 generates the pulse signal under the control of the servo writer controller SW5, and supplies the generated pulse signal to the servo pattern recording head WH. In a state in which the magnetic tape MT travels on the transport passage SW7 at a regular speed, the servo pattern recording head WH records the servo pattern 58 in the servo band SB in response to the pulse signal supplied from the pulse signal generator SW4.

Next, an action of the magnetic tape system 10 will be described.

Figure 19:
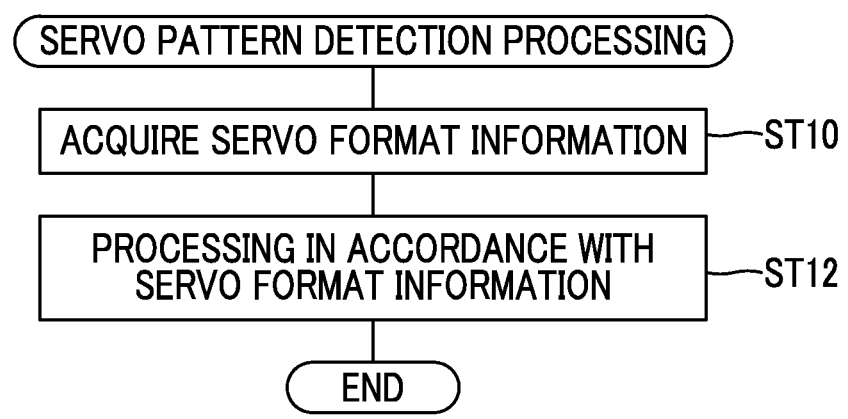
FIG. 19 is a flowchart showing an example of a flow of servo pattern detection processing according to the embodiment.

In the magnetic tape system 10 according to the present embodiment, as shown in FIG. 19 as an example, servo pattern detection processing is performed by the control device 30 (see FIG. 3 and the like). It should be noted that a flow of the servo pattern detection processing shown in FIG. 19 is an example of a "detection method of a servo pattern" according to the technology of the present disclosure.

In the servo pattern detection processing shown in FIG. 19, first, in step ST10, the control device 30 acquires the servo format information SF. For example, the control device 30 acquires the servo format information SF from the cartridge memory 24 via the noncontact read/write device 46. After the processing of step ST10 is executed, the servo pattern detection processing proceeds to step ST12.

In step ST12, the control device 30 executes the processing in accordance with the servo format information SF acquired from the cartridge memory 24 in step ST10. For example, the control device 30 operates the inclination mechanism 49 based on servo pattern inclination information SF1 included in the servo format information SF. After the processing of step ST12 is executed, the servo pattern detection processing is terminated.

As described above, the magnetic tape cartridge 12 is loaded into the magnetic tape drive 14. In the magnetic tape drive 14, in a case in which the magnetic tape MT is subjected to the magnetic processing by the magnetic element unit 42 (see FIGS. 3 and 17), the magnetic tape MT is pulled out from the magnetic tape cartridge 12, and the servo pattern 58 in the servo band SB is read by the servo reading element SR of the magnetic head 28.

The cartridge memory 24 is provided in the magnetic tape cartridge 12 according to the present embodiment. The cartridge memory 24 stores the servo format information SF including the servo pattern inclination information SF1 which is information on the inclination of the servo pattern. The control device 30 operates the inclination mechanism 49 based on the servo format information SF. As a result, the magnetic head skew angle is close to the inclined angle α of the servo pattern 58. Therefore, with the present configuration, the variation in the servo pattern signal is smaller than in a case in which the servo pattern 58 is read without considering the information on the inclination of the servo pattern 58, so that the servo pattern signal having high reliability can be obtained.

As shown in FIGS. 9 and 10, the linear magnetization regions 60A1 and 60A2 included in the servo pattern 58A recorded in the servo band SB of the magnetic tape MT are inclined in opposite directions with respect to the imaginary straight line C1. On the other hand, as shown in FIGS. 14 and 15, the magnetic head 28 is also inclined to the upstream side in the forward direction by the angle γ (that is, the angle γ counterclockwise as viewed from the paper surface side of FIGS. 14 and 15) on the magnetic tape MT. In a case in which the servo pattern 58A is read by the servo reading element SR in this state, since the angle formed by the linear magnetization region 60A1 and the servo reading element SR and the angle formed by the linear magnetization region 60A2 and the servo reading element SR are close to each other, the variation in the servo pattern signal due to the azimuth loss is smaller than the variation generated between the servo pattern signal derived from the linear magnetization region 54A1 included in the known servo pattern 52A in the related art and the servo pattern signal derived from the linear magnetization region 54A2 included in the known servo pattern 52A in the related art.

As a result, the variation between the servo pattern signal derived from the linear magnetization region 60A1 and the servo pattern signal derived from the linear magnetization region 60A2 is smaller than the variation generated between the servo pattern signal derived from the linear magnetization region 54A1 included in the known servo pattern 52A in the related art and the servo pattern signal derived from the linear magnetization region 54A2 included in the known servo pattern 52A in the related art, and the servo pattern signal having higher reliability than the servo pattern signal obtained from the known servo pattern 52A in the related art can be obtained (hereinafter, this effect is also referred to as "first effect"). It should be noted that, as shown in FIGS. 14 and 15, also in a case in which the servo pattern 58B is read by the servo reading element SR in a state in which the magnetic head 28 on the magnetic tape MT is inclined to the upstream side in the forward direction at the angle γ (that is, the angle γ counterclockwise as viewed from the paper surface side of FIGS. 14 and 15), the same effect as the first effect (hereinafter, this effect is also referred to as "second effect") can be obtained.

In addition, the servo pattern inclination information SF1 stored in the cartridge memory 24 of the magnetic tape cartridge 12 according to the present embodiment includes the information on the angle θa of the linear magnetization region 60A1 with respect to the imaginary straight line C1 and the information on the angle θb of the linear magnetization region 60A2 with respect to the imaginary straight line C1. Therefore, with the present configuration, in a case in which only the information of the inclined angle of any of the linear magnetization region 60A1 or the linear magnetization region 60A2 with respect to the imaginary straight line C1 is considered, the servo pattern signal having higher reliability can be obtained than in a case in which only the information of the inclined angle of any of the linear magnetization region 60B1 or the linear magnetization region 60B2 with respect to the imaginary straight line C2 is considered.

By the way, in a case in which the positions of both ends of the linear magnetization region 60A1 and the positions of both ends of the linear magnetization region 60A2 are not aligned in the width direction WD, one end portion of the linear magnetization region 60A1 is read by the servo reading element SR, but one end portion of the linear magnetization region 60A2 are not read, or the other end portion of the linear magnetization region 60A1 is read by the servo reading element SR, but the other end portion of the linear magnetization region 60A2 are not read.

Therefore, in the magnetic tape MT included in the magnetic tape cartridge 12 according to the present embodiment, in the servo band SB, the positions of both ends of the linear magnetization region 60A1 (that is, the positions of both ends of each of the five magnetization straight lines 60A1a) and the positions of both ends of the linear magnetization region 60A2 (that is, the positions of both ends of each of the five magnetization straight lines 60A2a) are aligned in the width direction WD. Therefore, in a case in which the servo pattern 58A is read by the servo reading element SR, as compared with a case in which the positions of both ends of the linear magnetization region 60A1 and the positions of both ends of the linear magnetization region 60A2 are not aligned in the width direction WD, the linear magnetization regions 60A1 and 60A2 can be read by the servo reading element SR without excess or deficiency. As a result, as compared with a case in which the positions of both ends of the linear magnetization region 60A1 and the positions of both ends of the linear magnetization region 60A2 are not aligned in the width direction WD, the servo pattern signal having high reliability can be obtained (hereinafter, this effect is referred to as "third effect"). It should be noted that, in a case in which the servo pattern 58B is read by the servo reading element SR, the same effect as the third effect (hereinafter, this effect is also referred to as "fourth effect") can be obtained.

As shown in FIGS. 9 and 10, although the gradient of the linear magnetization region 60A1 with respect to the imaginary straight line C1 is steeper than the gradient of the linear magnetization region 60A2 with respect to the imaginary straight line C1, in a case in which the total length of the linear magnetization region 60A1 is longer than the total length of the linear magnetization region 60A2, a part read by the servo reading element SR and a part that is not read are generated between the linear magnetization region 60A1 and the linear magnetization region 60A2. In addition, even in a case in which the total length of the linear magnetization region 60B1 is longer than the total length of the linear magnetization region 60B2, the part read by the servo reading element SR and the part that is not read are generated between the linear magnetization region 60B1 and the linear magnetization region 60B2. Therefore, in the magnetic tape MT according to the present embodiment, the total length of the linear magnetization region 60A1 is shorter than the total length of the linear magnetization region 60A2, and the total length of the linear magnetization region 60B1 is longer than the total length of the linear magnetization region 60B2. As a result, the linear magnetization regions 60A1 and 60A2 can be read by the servo reading element SR and the linear magnetization regions 60B1 and 60B2 can be read by the servo reading element SR without excess or deficiency (hereinafter, this effect is referred to as "fifth effect").

In addition, in the magnetic tape MT included in the magnetic tape cartridge 12 according to the present embodiment, the linear magnetization region 60A1 is a set of five magnetization straight lines 60A1a, and the linear magnetization region 60A2 is a set of five magnetization straight lines 60A2a. In addition, the linear magnetization region 60B1 is a set of four magnetization straight lines 60B1a, and the linear magnetization region 60B2 is a set of four magnetization straight lines 60B2a. Therefore, an amount of information obtained from the servo pattern 58 can be increased as compared with a case in which each linear magnetization region consists of one magnetization straight line, and as a result, highly accurate servo control can be realized (hereinafter, this effect is referred to as "sixth effect").

In addition, in the magnetic tape MT included in the magnetic tape cartridge 12 according to the present embodiment, the geometrical characteristic of the linear magnetization region pair 60A on the magnetic tape MT corresponds to the geometrical characteristic in which the positions of both ends of the imaginary linear region 62A and the positions of both ends of the imaginary linear region 62B are aligned in the width direction WD in a case in which the entirety of the imaginary linear region pair 62 is inclined with respect to the imaginary straight line C1 by inclining the symmetry axis SA1 of the imaginary linear region pair 62 with respect to the imaginary straight line C1. Therefore, the variation between the servo pattern signal derived from the linear magnetization region 60A1 and the servo pattern signal derived from the linear magnetization region 60A2 can be made smaller than in a case in which the servo pattern 52A having the known geometrical characteristic in the related art is read by the servo reading element SR. As a result, it is possible to obtain the servo pattern signal having higher reliability than the servo pattern signal obtained from the servo pattern 52A having the known geometrical characteristic in the related art (hereinafter, this effect is referred to as "seventh effect").

It should be noted that the linear magnetization region pair 60B is different from the linear magnetization region pair 60A only in that the linear magnetization region 60B1 is provided instead of the linear magnetization region 60A1, and the linear magnetization region 60B2 is provided instead of the linear magnetization region 60A2. The linear magnetization region pair 60B configured as described above is also read by the servo reading element SR in the same manner as the linear magnetization region pair 60A. Therefore, with the present configuration, the variation in the servo pattern signal is smaller than in a case in which the servo pattern 58 is read without considering the information on the inclination of the servo pattern 58, and as a result, the servo pattern signal having high reliability can be obtained.

In addition, the linear magnetization region pair 60B is different from the linear magnetization region pair 60A only in that the linear magnetization region 60B1 is provided instead of the linear magnetization region 60A1, and the linear magnetization region 60B2 is provided instead of the linear magnetization region 60A2. The linear magnetization region pair 60B configured as described above is also read by the servo reading element SR in the same manner as the linear magnetization region pair 60A. Therefore, the variation between the servo pattern signal derived from the linear magnetization region 60B1 and the servo pattern signal derived from the linear magnetization region 60B2 can be made smaller than in a case in which the servo pattern 52B having the known geometrical characteristic in the related art is read by the servo reading element SR. As a result, it is possible to obtain the servo pattern signal having higher reliability than the servo pattern signal obtained from the servo pattern 52B having the known geometrical characteristic in the related art (hereinafter, this effect is referred to as "eighth effect").

In addition, the linear magnetization region pair 60B is read by the servo reading element SR in the same manner as the linear magnetization region pair 60A. Therefore, the variation between the servo pattern signal derived from the linear magnetization region 60B1 and the servo pattern signal derived from the linear magnetization region 60B2 can be made smaller than in a case in which the servo pattern 52B having the known geometrical characteristic in the related art is read by the servo reading element SR. As a result, it is possible to obtain the servo pattern signal having higher reliability than the servo pattern signal obtained from the servo pattern 52B having the known geometrical characteristic in the related art.

In the present embodiment, the servo pattern signal, which is the result of reading the servo pattern 58 by the servo reading element SR, is detected by using the autocorrelation coefficient (see FIG. 17). As a result, the servo pattern signal can be detected with higher accuracy than in a case in which the servo pattern signal is detected by using only a method of determining whether or not the signal level exceeds a threshold value (hereinafter, this effect is referred to as "ninth effect").

The magnetic tape cartridge 12 according to the present embodiment includes the cartridge memory 24. The servo format information SF is stored in the cartridge memory 24. Therefore, with the present configuration, the magnetic tape cartridge 12 can have a simpler configuration than in a case in which the magnetic tape cartridge 12 includes a separate unit that stores the servo format information SF.

First Modification Example

In the first embodiment, the form example has been described in which the controller 30A performs various controls, such as the servo control, the skew angle control, and/or the tension control based on the position detection result of the servo reading element SR by the position detection unit 30B. However, the technology of the present disclosure is not limited to this. In a first modification example, a PES calculation unit 30C calculates the PES from the servo band signal S instead of the position detection of the servo reading element SR by the position detection unit 30B. Moreover, the controller 30A performs various controls based on the calculation result of the PES by the PES calculation unit 30C.

Figure 20:
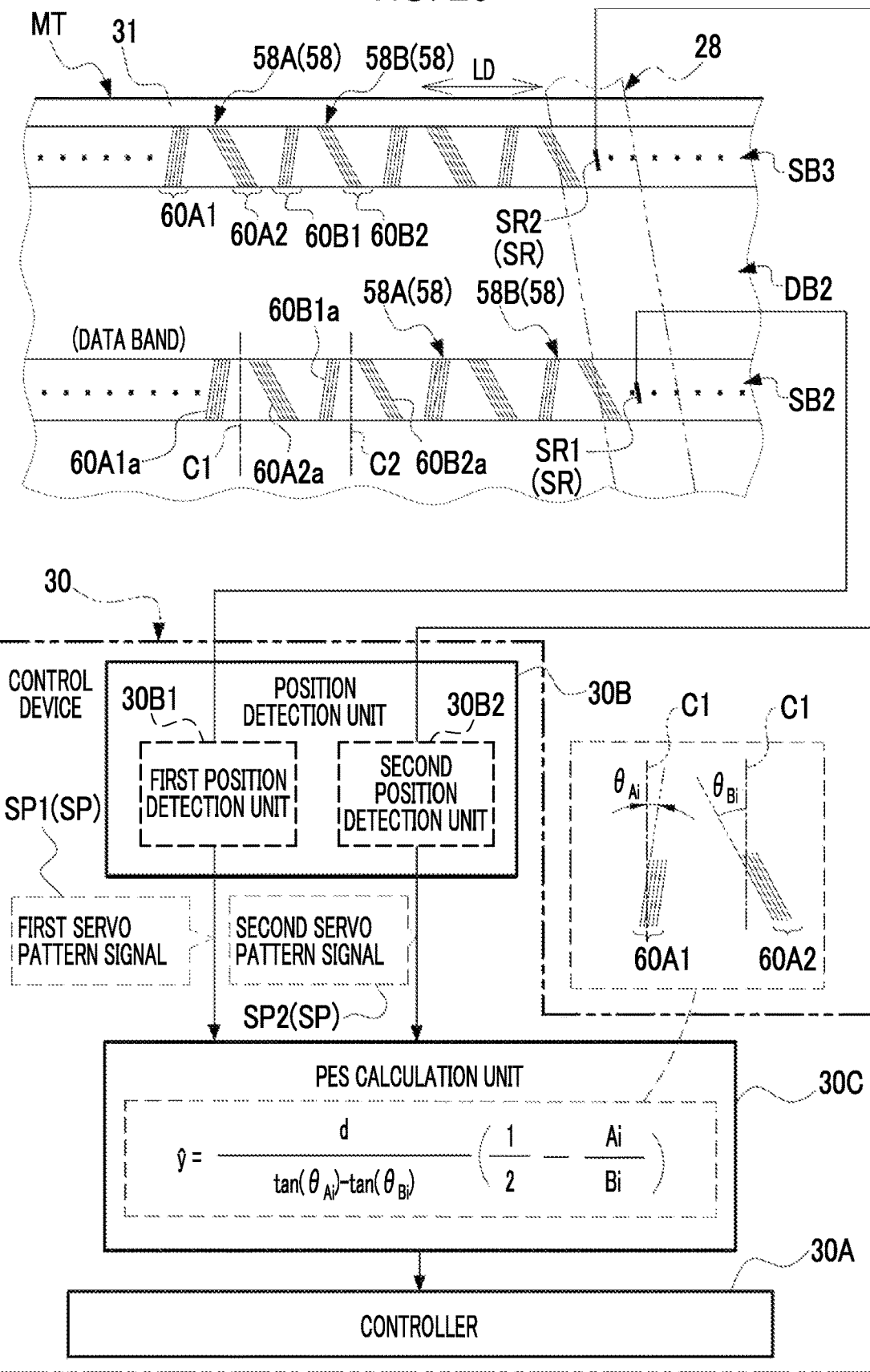
FIG. 20 is a conceptual diagram showing a first modification example, and is a conceptual diagram showing an example of functions of the controller and a PES calculation unit provided in the control device provided in the magnetic tape drive according to the embodiment.

First, as described above, the position detection unit 30B detects a servo pattern signal SP from the servo band signal S by using the autocorrelation coefficient. Moreover, as shown in FIG. 20 as an example, the position detection unit 30B outputs the servo pattern signal SP to the PES calculation unit 30C. Here, the servo pattern signal SP includes a first servo pattern signal SP1 detected by the first position detection unit 30B1 (see FIG. 16) and a second servo pattern signal SP2 detected by the second position detection unit 30B2 (see FIG. 16).

The control device 30 includes the PES calculation unit 30C. The PES calculation unit 30C calculates the PES based on the servo pattern signal SP acquired from the position detection unit 30B. For example, the PES calculation unit 30C calculates a first PES based on the first servo pattern signal SP1 input from the first position detection unit 30B1. In addition, the PES calculation unit 30C calculates a second PES based on the second servo pattern signal SP2 input from the second position detection unit 30B2.

The first PES refers to a PES which is a signal indicating an amount of deviation of the servo reading element SR1 from the original position on the servo band SB2 along the width direction WD. The second PES refers to a PES which is a signal indicating an amount of deviation of the servo reading element SR2 from the original position on the servo band SB3 along the width direction WD. For convenience of description, in a case in which the distinction is not needed, the first PES and the second PES are referred to as "PES".

PES is calculated using Expression (1).

$$\hat{y} = \frac{d}{\tan(\theta_{Ai}) - \tan(\theta_{Bi})} \left( \frac{1}{2} - \frac{A_i}{B_i} \right) \quad (1)$$

$\hat{y}$: PES $d$: Picth width of servo pattern in traveling direction $A_i$: Second distance $B_i$: First distance $\theta_{Ai}$ shown in Expression (1) is an angle of the linear magnetization region 60A1 with respect to the imaginary straight line C1. In addition, $\theta_{Bi}$ is an angle of the linear magnetization region 60A2 with respect to the imaginary straight line C1 as described above. Here, $\theta_{Ai}$ corresponds to θa shown in FIG. 11, and $\theta_{Bi}$ corresponds to θb shown in FIG. 11.

In Expression (1), a second distance Ai is, for example, a distance calculated from results of reading the magnetization straight line 60A1a on the most downstream side of the linear magnetization region 60A1 in one servo pattern 58A and the magnetization straight line 60A2a on the most downstream side in the linear magnetization region 60A2 by the servo reading element SR. A first distance Bi is, for example, a distance calculated from results of reading the magnetization straight line 60A1a on the most downstream side in one servo pattern 58A of the servo patterns 58 and the magnetization straight line 60B1a on the most downstream side in the adjacent servo pattern 58B by the servo reading element SR.

The controller 30A detects the position of the servo reading element SR with respect to the servo band SB based on the PES calculated by the PES calculation unit 30C. The controller 30A detects the position of the servo reading element SR1 with respect to the servo band SB2 based on the first PES. In addition, the controller 30A detects the position of the servo reading element SR2 with respect to the servo band SB3 based on the second PES. Further, the controller 30A performs various controls, such as the servo control, the skew angle control, and/or the tension control based on the position detection result of the servo reading element SR with respect to the servo band SB (see FIG. 17).

As described above, according to the first modification example, the controller 30A detects the position of the servo reading element SR with respect to the servo band SB by using the PES calculated by the PES calculation unit 30C. Further, the controller 30A performs various controls, such as the servo control, the skew angle control, and/or the tension control based on the position detection result of the servo reading element SR. As a result, the position of the servo reading element SR on the servo band SB is adjusted. Therefore, with the present configuration, the position of the servo reading element SR with respect to the servo pattern 58 is held at the predetermined position determined by design.

In addition, according to the first modification example, the PES is calculated based on Expression (1). Expression (1) is an expression in consideration of the inclination of the servo pattern 58. Therefore, by using Expression (1), it is possible to calculate the PES in consideration of the inclination of the servo pattern 58. As a result, various controls are performed based on the result of calculating the PES using the expression in consideration of the inclination of the servo pattern 58. Therefore, with the present configuration, the position of the servo reading element SR with respect to the servo pattern 58 is held at the predetermined position determined by design.

Second Modification Example

In the first embodiment, the form example has been described in which the servo format information SF includes the servo pattern inclination information SF1, but the technology of the present disclosure is not limited to this. In a second modification example, the servo format information SF includes information on the width of the magnetic tape MT (hereinafter, also referred to as magnetic tape width change information SF2) and information on the geometrical characteristic of the servo pattern 58 (hereinafter, also referred to as servo pattern geometrical characteristic information SF3). The magnetic tape width change information SF2 is, for example, information indicating a width change in the total length direction of the magnetic tape MT (that is, a degree of temporal width change). The servo pattern geometrical characteristic information SF3 is, for example, information indicating the length, the shape, the orientation, and the position of the servo pattern 58. The magnetic tape width change information SF2 is an example of "information on the width of the magnetic tape" according to the technology of the present disclosure, and the servo pattern geometrical characteristic information SF3 is an example of "information on the geometrical characteristic of the magnetic tape" according to the technology of the present disclosure.

Figure 21:
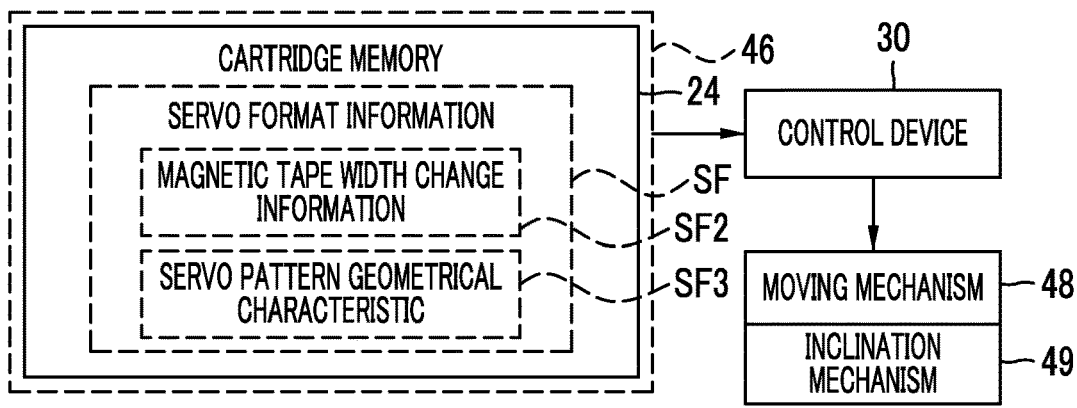
FIG. 21 is a conceptual diagram showing a second modification example, and is a conceptual diagram showing an example of an aspect in which servo format information is stored in a cartridge memory.

As an example, as shown in FIG. 21, the magnetic tape width change information SF2 and the servo pattern geometrical characteristic information SF3 are stored in the cartridge memory 24. The control device 30 acquires the magnetic tape width change information SF2 and the servo pattern geometrical characteristic information SF3 from the cartridge memory 24 via the noncontact read/write device 46. The control device 30 operates the inclination mechanism 49 based on the magnetic tape width change information SF2. As a result, the magnetic head skew angle is adjusted. For example, the inclination mechanism 49 makes the magnetic head skew angle larger than the inclined angle α of the servo pattern 58 indicated by the servo pattern inclination information SF1 in a region in which the width of the magnetic tape MT is narrowed in the total length direction of the magnetic tape MT. On the other hand, the inclination mechanism 49 makes the magnetic head skew angle smaller than the inclined angle α of the servo pattern 58 indicated by the servo pattern inclination information SF1 in a region in which the width of the magnetic tape MT is widened.

In addition, the control device 30 operates the inclination mechanism 49 based on the servo pattern geometrical characteristic information SF3. As a result, the magnetic head skew angle is adjusted. For example, the inclination mechanism 49 adjusts the magnetic head skew angle in accordance with partial misregistration of the servo pattern 58 indicated by the servo pattern geometrical characteristic information SF3 in the total length direction of the magnetic tape MT (for example, misregistration in the width direction WD) or the change in the orientation.

As described above, according to the second modification example, the servo format information SF includes the magnetic tape width change information SF2 and the servo pattern geometrical characteristic information SF3. Moreover, the control device 30 acquires the magnetic tape width change information SF2 and the servo pattern geometrical characteristic information SF3 from the cartridge memory 24. The control device 30 controls the operation of the inclination mechanism 49 based on the magnetic tape width change information SF2 and the servo pattern geometrical characteristic information SF3. As a result, the magnetic head skew angle is adjusted. Therefore, with the present configuration, the servo pattern signal having higher reliability can be obtained than in a case in which the magnetic tape width change information SF2 and the servo pattern geometrical characteristic information SF3 are not taken into consideration.

It should be noted that, as the second modification example, the example has been described in which the servo format information SF includes the magnetic tape width change information SF2 and the servo pattern geometrical characteristic information SF3, but this is merely an example. A form may be adopted in which the servo format information SF includes any one of the magnetic tape width change information SF2 or the servo pattern geometrical characteristic information SF3.

In addition, as the second modification example, the example has been described in which the servo pattern geometrical characteristic information SF3 includes the information indicating the length, the shape, the orientation, and the position of the servo pattern 58, but this is merely an example. Any one or two or more of the information indicating the length, the shape, the orientation, or the position of the servo pattern 58 may be used as the servo pattern geometrical characteristic information SF3.

Third Modification Example

Figure 22:
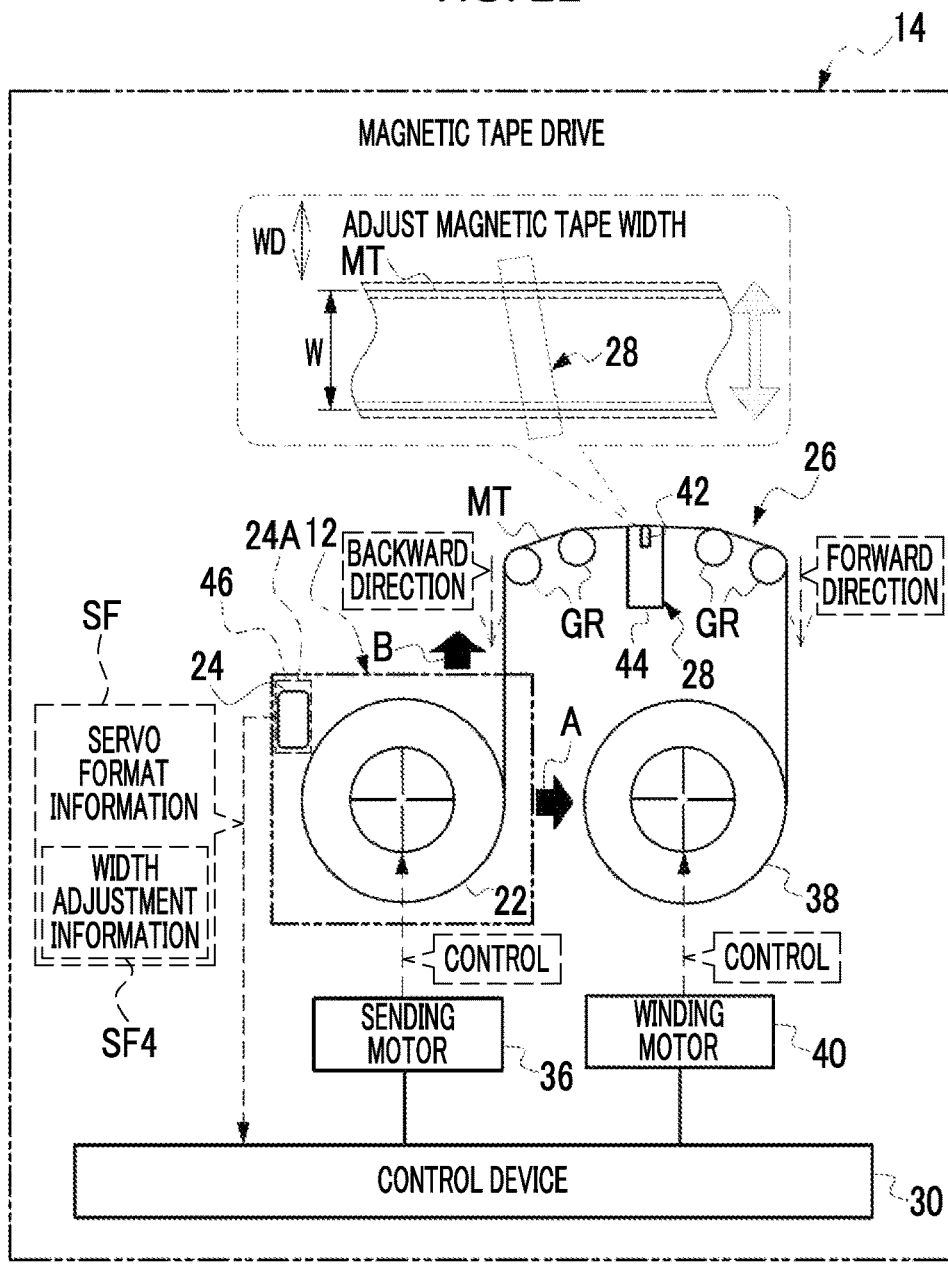
FIG. 22 is a conceptual diagram showing a third modification example, and is a conceptual diagram showing an example of the function of the control device provided in the magnetic tape drive according to the embodiment.

In the first embodiment, the form has been described in which the servo format information SF includes the servo pattern inclination information SF1 which is the information on the inclination of the servo pattern 58, but the technology of the present disclosure is not limited to this. In a third modification example, as shown in FIG. 22 as an example, the servo format information SF includes information SF4 for adjusting the width of the magnetic tape (hereinafter, also referred to as "width adjustment information SF4"). The width adjustment information SF4 is information for adjusting a width W of the magnetic tape MT (that is, a distance of the magnetic tape MT along the width direction WD, hereinafter, also simply referred to as "tape width W") (that is, information used to adjust the tape width W). It should be noted that the width adjustment information SF4 is an example of "width adjustment information" according to the technology of the present disclosure.

As described above, the magnetic tape MT expands and contracts in the width direction WD due to the pressure, temperature, humidity, temporal deterioration, and the like of being wound around the cartridge reel (not shown). As a result, the inclined angle α of the servo pattern 58 may also be changed. Therefore, even in a case in which the magnetic head skew angle is adjusted based on the servo pattern inclination information SF1 included in the servo format information SF, the inclined angle α of the servo pattern 58 and the magnetic head skew angle may not close to each other (that is, the magnetic head skew angle is outside the allowable range). As a result, there is a risk that the reliability of the servo pattern signal is reduced.

Figure 23:
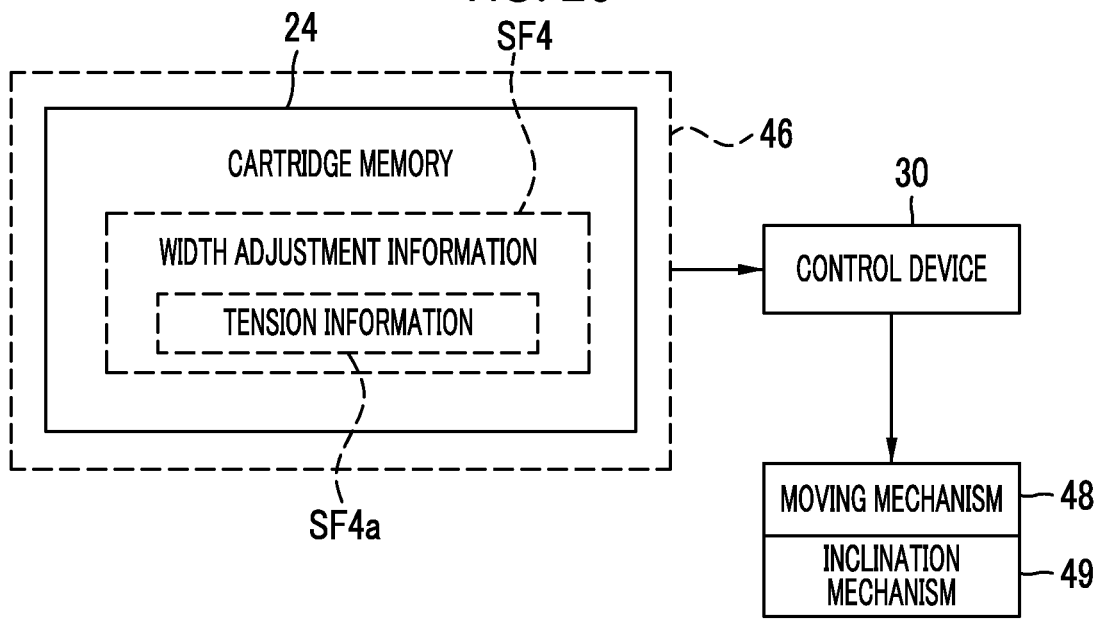
FIG. 23 is a conceptual diagram showing the third modification example, and is a conceptual diagram showing an example of the aspect in which the servo format information is stored in the cartridge memory.

Therefore, the servo format information SF according to the third modification example includes the width adjustment information SF4. The width adjustment information SF4 is stored in the cartridge memory 24. The width adjustment information SF4 includes tension information SF4a, for example, as shown in FIG. 23. The tension information SF4a refers to information on the tension in the total length direction of the magnetic tape MT. Examples of the tension information SF4a include information indicating the tension generated in the magnetic tape MT at a stage in which the servo pattern 58 is recorded in the magnetic tape MT, but this is merely an example. The tension information SF4a may be information indicating, for example, the tension generated in the magnetic tape MT in a case in which the magnetic tape MT has been used in the past (for example, at a time designated from the use history of the magnetic tape MT). The tension information SF4a is an example of "information on the tension in the total length direction of the magnetic tape" according to the technology of the present disclosure.

As an example, as shown in FIG. 22, the control device 30 acquires the width adjustment information SF4 from the cartridge memory 24 via the noncontact read/write device 46. The control device 30 performs the tension control based on the width adjustment information SF4. The tension control is realized by adjusting the rotation speed, and/or rotation torque of each of the sending motor 36 and the winding motor 40. For example, the control device 30 increases the tension applied to the magnetic tape MT in a case in which the magnetic tape MT expands in the width direction WD. In addition, the control device 30 weakens the tension applied to the magnetic tape MT in a case in which the magnetic tape MT contracts in the width direction WD. As a result, the width W of the magnetic tape MT is adjusted.

As described above, according to the third modification example, the servo format information SF includes the width adjustment information SF4 which is the information for adjusting the tape width W. The width adjustment information SF4 is stored in the cartridge memory 24. The control device 30 acquires the width adjustment information SF4 from the cartridge memory 24. Moreover, the control device 30 performs the tension control based on the width adjustment information SF4 acquired from the cartridge memory 24. As a result, the width W of the magnetic tape MT is adjusted, so that even in a case in which the width W of the magnetic tape MT expands and contracts, the inclined angle α of the servo pattern 58 and the magnetic head skew angle are close to each other.

It should be noted that, in the third modification example, the form example has been described in which the information on the tension generated in the magnetic tape MT at the stage in which the servo pattern 58 has been recorded in the magnetic tape MT and at the stage in which the magnetic tape MT has been used in the past is used as the tension information SF4$a$, but the technology of the present disclosure is not limited to this. For example, the tension information SF4$a$ is determined based on various factors that influence the tension of the magnetic tape MT.

Figure 24:
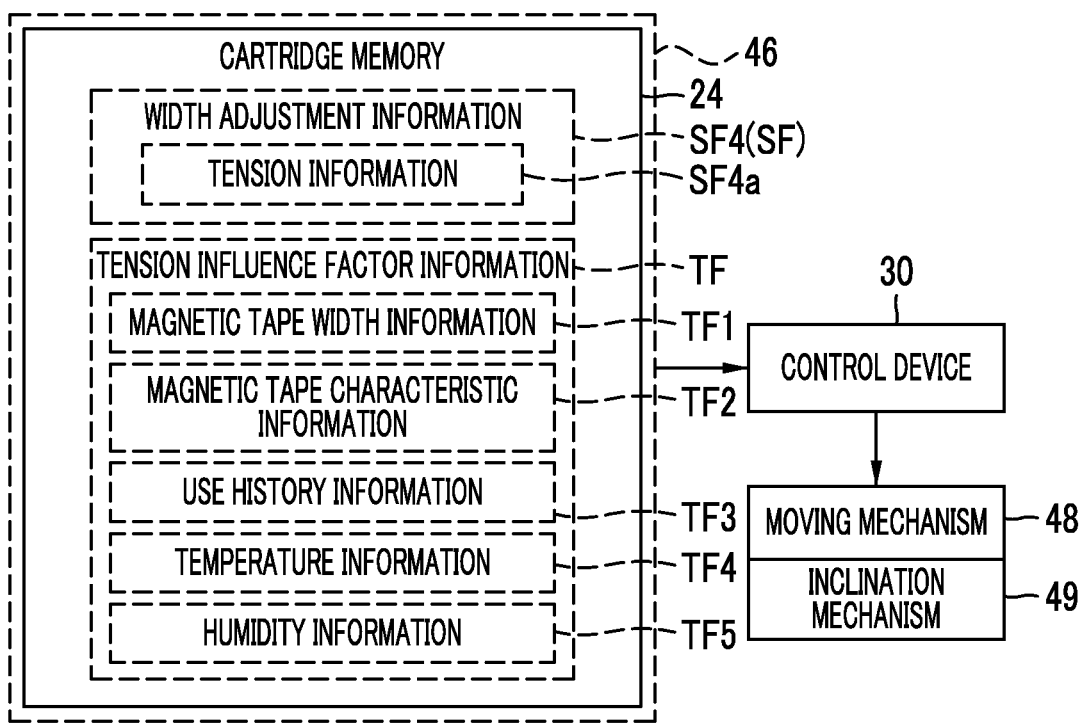
FIG. 24 is a conceptual diagram showing the third modification example, and is a conceptual diagram showing an example of the aspect in which the servo format information is stored in the cartridge memory.

As shown in FIG. 24 as an example, tension influence factor information TF is stored in the cartridge memory 24. The tension influence factor information TF refers to information indicating a factor that influences the tension generated in the magnetic tape MT. The tension influence factor information TF includes magnetic tape width information TF1, magnetic tape characteristic information TF2, use history information TF3, temperature information TF4, and humidity information TF5. The magnetic tape width information TF1 refers to information indicating the width W of the magnetic tape MT. The magnetic tape characteristic information TF2 refers to information indicating the characteristic (for example, expansion coefficient and/or material) of the magnetic tape MT itself. The use history information TF3 refers to information indicating the use history (for example, a use time and/or the number of times of use) of the magnetic tape MT. The temperature information TF4 refers to information indicating the temperature given to the magnetic tape MT (for example, an average temperature in the case 16 in a case in which the magnetic tape cartridge 12 is stored). The humidity information TF5 refers to information indicating the humidity given to the magnetic tape MT (for example, average humidity in the case 16 in a case in which the magnetic tape cartridge 12 is stored).

The control device 30 acquires the tension influence factor information TF from the cartridge memory 24 via the noncontact read/write device 46. The control device 30 determines the tension information SF4$a$ in the total length direction of the magnetic tape MT based on the tension influence factor information TF. For example, the control device 30 may calculate the tension using a tension arithmetic expression or a tension table. The tension arithmetic expression refers to, for example, an arithmetic expression in which the magnetic tape width information TF1, the magnetic tape characteristic information TF2, the use history information TF3, the temperature information TF4, and the humidity information TF5 are used as dependent variables, and the information indicating the tension in the total length direction of the magnetic tape MT is used as an independent variable. In addition, the tension table refers to a table in which the magnetic tape width information TF1, the magnetic tape characteristic information TF2, the use history information TF3, the temperature information TF4, and the humidity information TF5 are used as input values, and the information indicating the tension in the total length direction of the magnetic tape MT is used as an output value. The control device 30 performs the tension control based on the tension information SF4$a$.

As described above, in the third modification example, the control device 30 determines the tension information SF4$a$ based on the tension influence factor information TF acquired from the cartridge memory 24. Moreover, the control device 30 performs the tension control based on the tension information SF4$a$. As a result, the width W of the magnetic tape MT is adjusted, so that even in a case in which the width W of the magnetic tape MT expands and contracts, the inclined angle α of the servo pattern 58 and the magnetic head skew angle can be close to each other.

It should be noted that the example has been described in which the magnetic tape width information TF1, the magnetic tape characteristic information TF2, the use history information TF3, the temperature information TF4, and the humidity information TF5 are used as the tension influence factor information TF, but this is merely an example. For example, any one or two or more of the magnetic tape width information TF1, the magnetic tape characteristic information TF2, the use history information TF3, the temperature information TF4, or the humidity information TF5 may be combined and used as the tension influence factor information TF.

Fourth Modification Example

Figure 25:
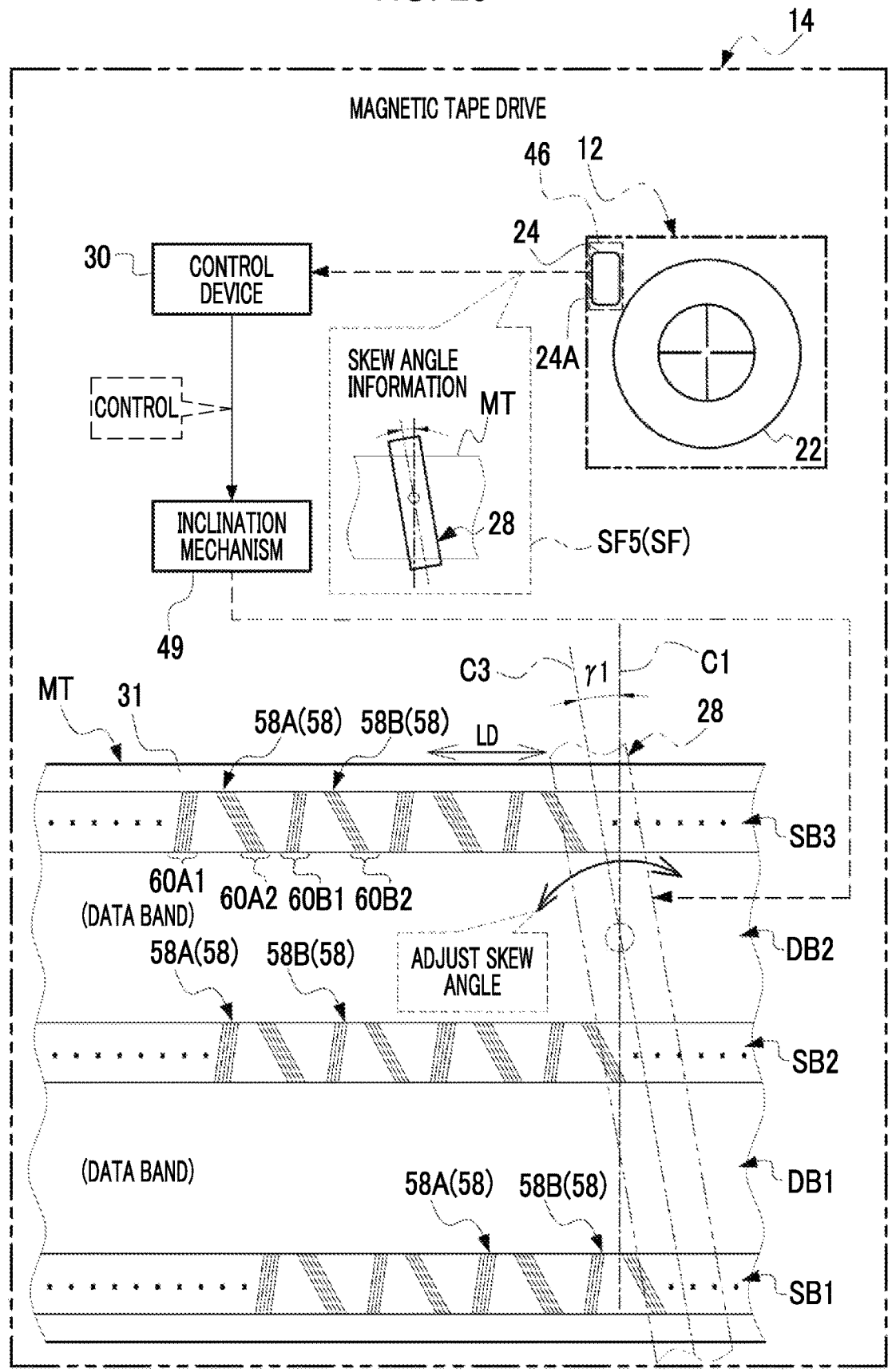
FIG. 25 is a conceptual diagram showing a fourth modification example, and is a conceptual diagram showing an example of the function of the control device provided in the magnetic tape drive according to the embodiment.

In the first embodiment, the form has been described in which the servo format information SF includes the servo pattern inclination information SF1 which is the information on the inclination of the servo pattern 58, but the technology of the present disclosure is not limited to this. In a fourth modification example, as shown in FIG. 25 as an example, the servo format information SF includes skew angle information SF5. The skew angle information SF5 refers to information on the skew angle of the magnetic head 28. The skew angle information SF5 is an example of "information on the skew angle" according to the technology of the present disclosure.

By the way, even in a case in which the magnetic tape MT has the same manufacturing conditions, the inclined angle α of the servo pattern 58 may differ due to individual differences in the servo pattern recording head WH. In addition, as described above, the inclined angle α of the servo pattern 58 may be changed due to the expansion and contraction of the magnetic tape MT in the width direction. Therefore, even in a case in which the magnetic head skew angle is adjusted based on the servo pattern inclination information SF1 included in the servo format information SF, the inclined angle α of the servo pattern 58 and the magnetic head skew angle may not close to each other. As a result, there is a risk that the reliability of the servo pattern signal is reduced.

Therefore, the servo format information SF according to the fourth modification example includes the skew angle information SF5. The skew angle information SF5 is stored in the cartridge memory 24. The skew angle information SF5 is information indicating an angle difference (hereinafter, also simply referred to as "skew angle difference") the inclined angle α of the servo pattern 58 determined based on the servo pattern inclination information SF1 and the inclined angle α of the servo pattern 58 changed due to various influences. Examples of the skew angle information SF5 include the information indicating the skew angle difference in accordance with the individual number of the servo pattern recording head WH, but this is merely an example. For example, the skew angle information SF5 may be the information indicating the skew angle difference in accordance with a degree of expansion and contraction of the magnetic tape MT in the width direction.

The control device 30 acquires the skew angle information SF5 from the cartridge memory 24 via the noncontact read/write device 46. The control device 30 performs the skew angle control based on the skew angle information SF5. For example, the inclination mechanism 49 changes the magnetic head skew angle by the angle difference obtained based on the skew angle information SF5. That is, the inclination mechanism 49 adjusts the angle formed by the imaginary straight line C1 and the imaginary straight line C3 from the angle γ (see FIG. 15) to an adjusted angle γ1. As a result, the inclined angle α of the servo pattern 58 and the magnetic head skew angle are close to each other.

As described above, according to the fourth modification example, the servo format information SF includes the skew angle information SF5. The control device 30 acquires the skew angle information SF5 from the cartridge memory 24. Moreover, the control device 30 controls the skew angle of the magnetic head 28 based on the skew angle information SF5 acquired from the cartridge memory 24. As a result, the inclined angle α of the servo pattern 58 and the magnetic head skew angle are close to each other.

Figure 26:
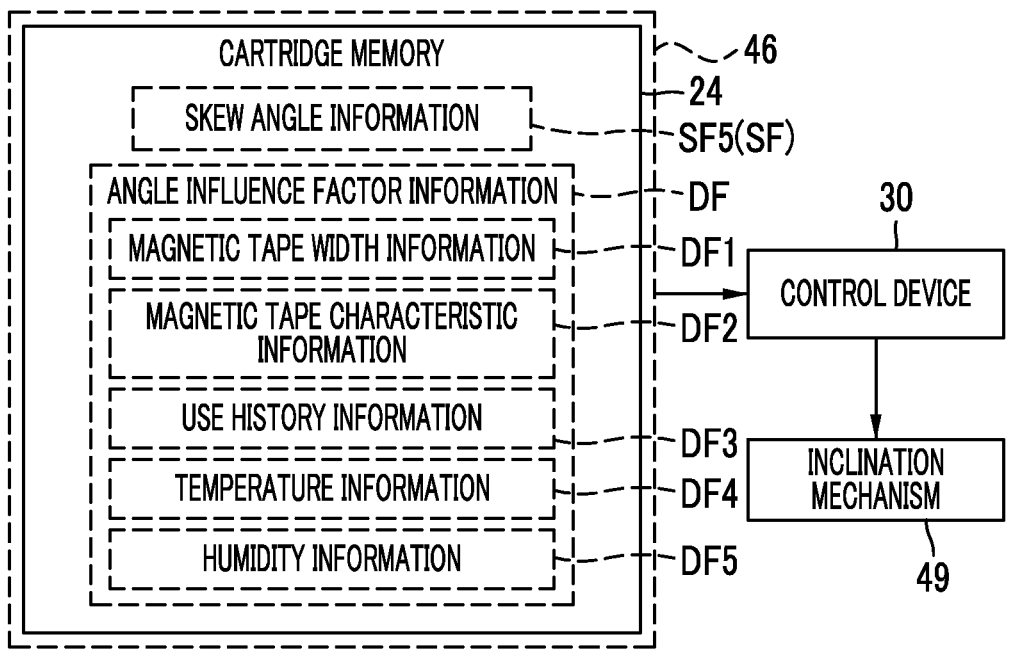
FIG. 26 is a conceptual diagram showing the fourth modification example, and is a conceptual diagram showing an example of the aspect in which the servo format information is stored in the cartridge memory.

It should be noted that, in the fourth modification example, the form example has been described in which the information indicating the skew angle difference in accordance with the individual number of the servo pattern recording head WH is used as the skew angle information SF5, but the technology of the present disclosure is not limited to this. For example, the skew angle information SF5 is determined based on various factors that influence the inclined angle α of the servo pattern 58. In the example shown in FIG. 26, information on the factor that influences the inclined angle α of the servo pattern 58 (hereinafter, also simply referred to as "angle influence factor information DF") is stored in the cartridge memory 24.

The angle influence factor information DF includes magnetic tape width information DF1, magnetic tape characteristic information DF2, use history information DF3, temperature information DF4, and humidity information DF5. The magnetic tape width information DF1 refers to the information indicating the width W (see FIG. 22) of the magnetic tape MT. The magnetic tape characteristic information DF2 refers to the information indicating the characteristic (for example, expansion coefficient and/or material) of the magnetic tape MT itself. The use history information DF3 refers to the information indicating the use history (for example, the use time and/or the number of times of use) of the magnetic tape MT. The temperature information DF4 refers to the information indicating the temperature given to the magnetic tape MT (for example, the average temperature in the case 16 in a case in which the magnetic tape cartridge 12 is stored). The humidity information DF5 refers to the information indicating the humidity given to the magnetic tape MT (for example, the average humidity in the case 16 in a case in which the magnetic tape cartridge 12 is stored).

The control device 30 acquires the angle influence factor information DF from the cartridge memory 24 via the noncontact read/write device 46. The control device 30 determines the skew angle information SF5 in accordance with the angle influence factor information DF. For example, the control device 30 may derive the angle difference by using an angle difference arithmetic expression or an angle difference table. The angle difference arithmetic expression is, for example, an arithmetic expression in which the magnetic tape width information DF1, the magnetic tape characteristic information DF2, the use history information DF3, the temperature information DF4, and the humidity information DF5 are used as dependent variables, and the skew angle information SF5 is used as an independent variable. The tension table refers to a table in which the magnetic tape width information DF1, the magnetic tape characteristic information DF2, the use history information DF3, the temperature information DF4, and the humidity information DF5 are input values, and the skew angle information SF5 is an output value. The control device 30 determines the skew angle information SF5 in accordance with the angle influence factor information DF. The control device 30 controls the skew angle of the magnetic head 28 based on the skew angle information SF5.

As described above, in the fourth modification example, the control device 30 determines the skew angle information SF5 in accordance with the angle influence factor information DF acquired from the cartridge memory 24. Moreover, the control device 30 performs the skew angle control based on the skew angle information SF5. As a result, the inclined angle α of the servo pattern 58 and the magnetic head skew angle are close to each other.

It should be noted that the example has been described in which the magnetic tape width information DF1, the magnetic tape characteristic information DF2, the use history information DF3, the temperature information DF4, and the humidity information DF5 are used as the angle influence factor information DF, but this is merely an example. For example, any one or two or more of the magnetic tape width information DF1, the magnetic tape characteristic information DF2, the use history information DF3, the temperature information DF4, and the humidity information DF5 may be combined and used as the angle influence factor information DF.

Fifth Modification Example

In the embodiment described above, the servo format information SF includes the servo pattern inclination information SF1, but the technology of the present disclosure is not limited to this. In a fifth modification example, the servo format information SF includes an ideal waveform signal 67 indicating the ideal waveform of the servo pattern signal which is the result of reading the servo pattern 58 by the servo reading element SR.

As described above, in a case in which there is a large deviation between the inclined angle α of the servo pattern 58 and the magnetic head skew angle (for example, the inclined angle α of the servo pattern 58 is 5 degrees and the magnetic head skew angle is 10 degrees), the variation due to the azimuth loss may occur between the servo pattern signals (see FIG. 13). Such a variation in the servo pattern signal can contribute to a decrease in the accuracy of the servo control.

Here, as described above, the variation in the servo pattern signal due to the azimuth loss (for example, the variation in the signal level and the waveform distortion) is due to the difference between the inclined angle α of the servo pattern 58 and the magnetic head skew angle. Stated another way, the variation in the servo pattern signal reflects the difference between the inclined angle α and the magnetic head skew angle of the servo pattern 58.

Therefore, in the fifth modification example, the servo format information SF includes the ideal waveform signal 67 indicating the ideal waveform of the servo pattern signal in accordance with the inclined angle α of the servo pattern 58. In addition, the controller 30A calculates the inclined angle α of the servo pattern 58.

Figure 27:
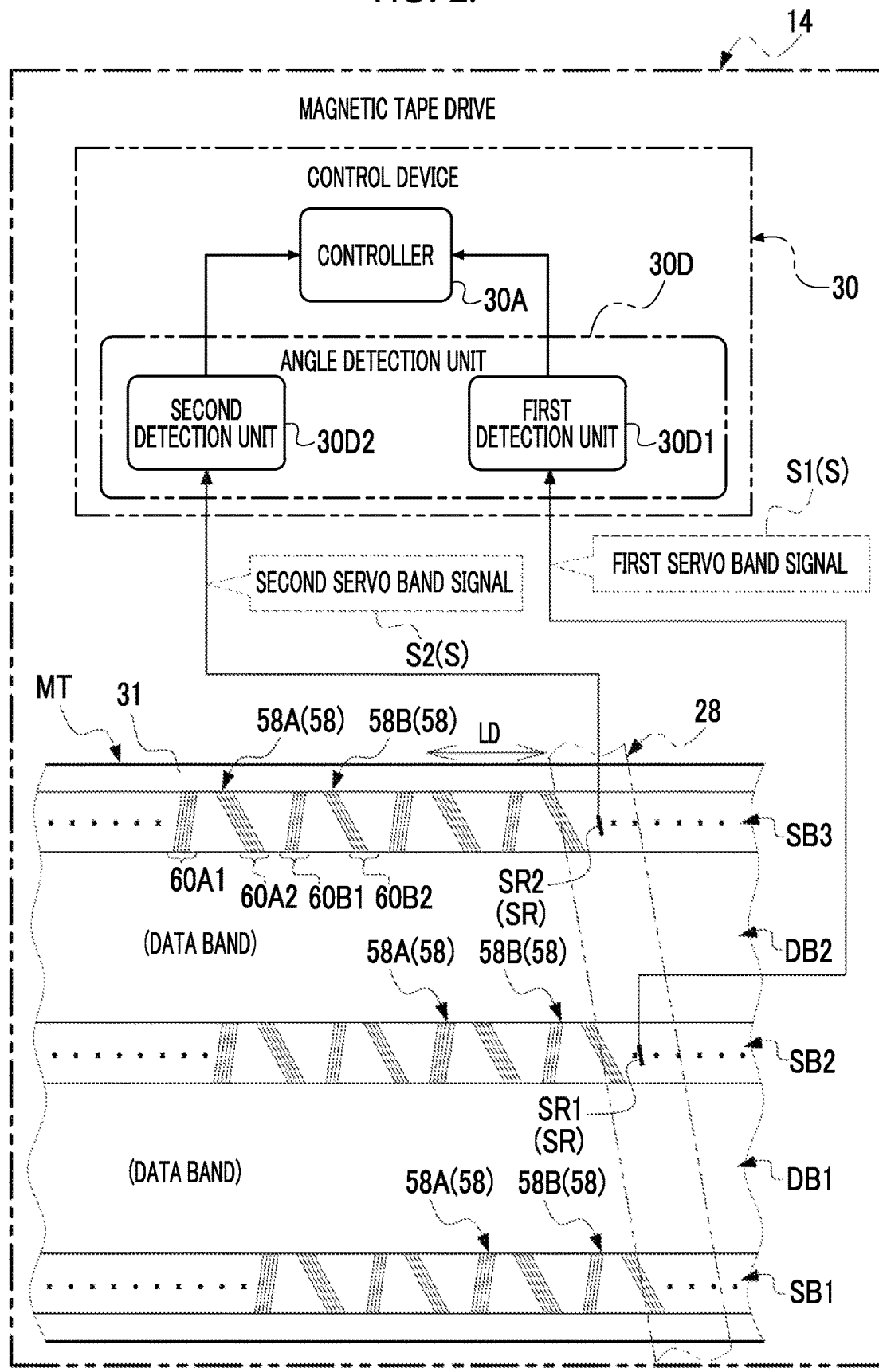
FIG. 27 is a conceptual diagram showing a fifth modification example, and is a conceptual diagram showing an example of functions of the controller and an angle detection unit provided in the control device provided in the magnetic tape drive according to the embodiment.

As an example, as shown in FIG. 27, the control device 30 includes an angle detection unit 30D. The angle detection unit 30D acquires the servo band signal S, which is the result of reading the servo band SB by the servo reading element SR, and detects the angle of the servo reading element SR with respect to the servo band SB on the magnetic tape MT based on the acquired servo band signal S. The angle detection unit 30D includes a first angle detection unit 30D1 and a second angle detection unit 30D2.

The first angle detection unit 30D1 acquires the first servo band signal S1, and the second angle detection unit 30D2 acquires the second servo band signal S2. In the example shown in FIG. 27, the first angle detection unit 30D1 acquires the first servo band signal S1 obtained by reading the servo pattern 58 in the servo band SB2 by the servo reading element SR1. The second angle detection unit 30D2 acquires the second servo band signal S2 obtained by reading the servo pattern 58 in the servo band SB3 by the servo reading element SR2. The first angle detection unit 30D1 detects the angle of the servo reading element SR1 with respect to the servo band SB2 based on the first servo band signal S1, and the second angle detection unit 30D2 detects the angle of the servo reading element SR2 with respect to the servo band SB3 based on the second servo band signal S2.

Figure 28:
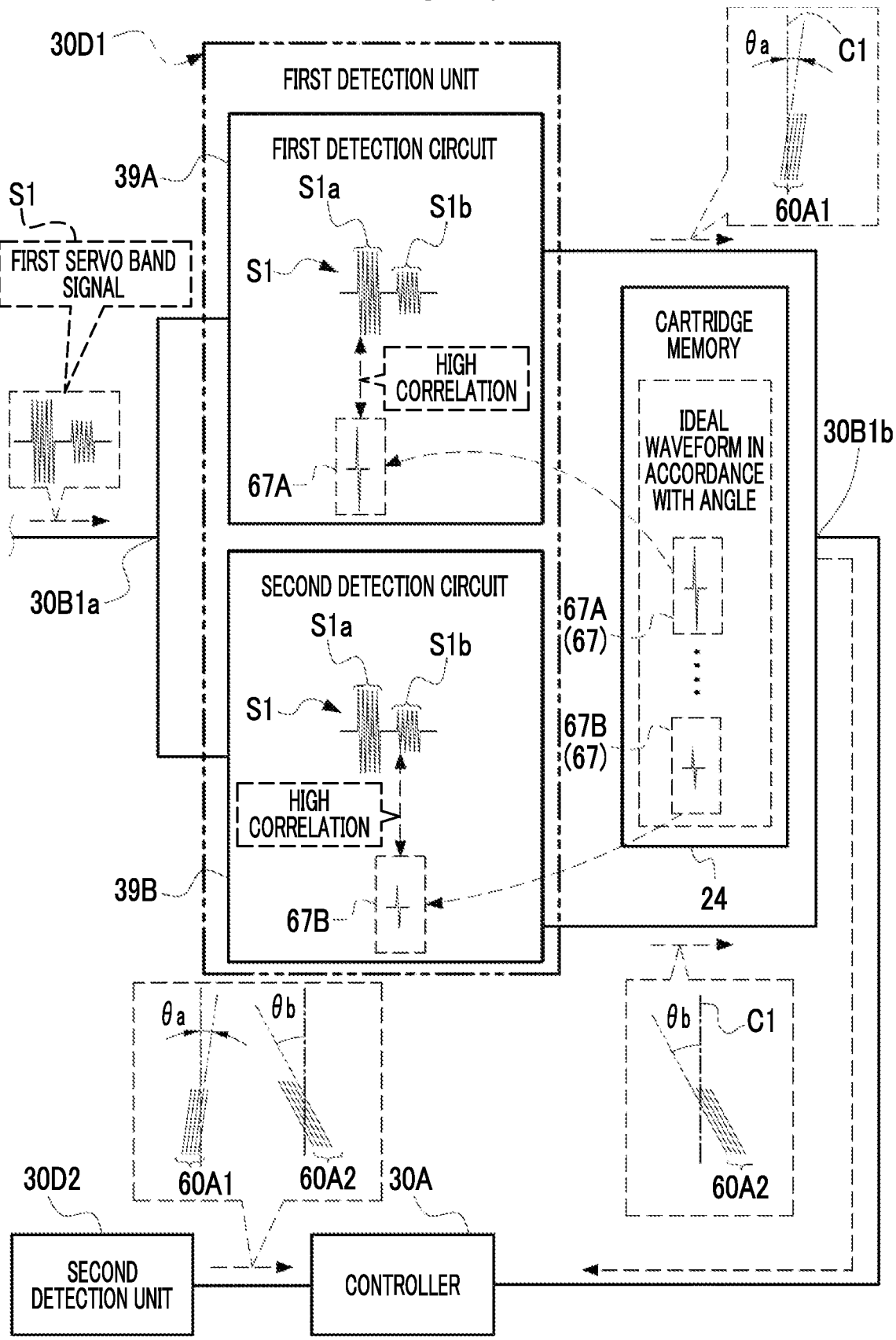
FIG. 28 is a conceptual diagram showing the fifth modification example, and is a conceptual diagram showing an example of the function of the angle detection unit provided in the control device provided in the magnetic tape drive according to the embodiment.

As an example, as shown in FIG. 28, the angle detection unit 30D calculates the inclined angle α of the servo pattern 58 by using the ideal waveform signal and the autocorrelation coefficient from the servo pattern signal which is the result of reading the servo pattern 58 by the servo reading element SR from the magnetic tape MT.

Next, a specific configuration example of the first angle detection unit 30D1 will be described. It should be noted that since a configuration of the second angle detection unit 30D2 is the same as a configuration of the first angle detection unit 30D1, the description of a specific configuration example of the second angle detection unit 30D2 will be omitted. In addition, in the following, for convenience of description, the servo pattern signal derived from the linear magnetization region 60A1 or 60B1 (see FIGS. 9 and 10) is also referred to as a "first linear magnetization region signal", and the servo pattern signal derived from the linear magnetization region 60A2 or 60B2 (see FIGS. 9 and 10) is also referred to as a "second linear magnetization region signal".

As an example, as shown in FIG. 28, the first angle detection unit 30D1 includes a first detection circuit 39A and a second detection circuit 39B. The first detection circuit 39A and the second detection circuit 39B are connected in parallel and comprise an input terminal 30B1$a$ and an output terminal 30B1$b$ common to each other. In the example shown in FIG. 28, an aspect example is shown in which the first servo band signal S1 is input to the input terminal 30B1$a$. The first servo band signal S1 includes a first linear magnetization region signal S1$a$ and a second linear magnetization region signal S1$b$. The first linear magnetization region signal S1$a$ and the second linear magnetization region signal S1$b$ are the servo pattern signals (that is, analog servo pattern signals) which are the results of being read by the servo reading element SR1 (see FIG. 27). That is, the servo pattern signal includes the first linear magnetization region signal S1$a$ and the second linear magnetization region signal S1$b$.

The cartridge memory 24 stores the ideal waveform signal 67 in accordance with the inclined angle α of the servo pattern 58. That is, the servo format information SF stored in the cartridge memory 24 includes the ideal waveform signal 67. The ideal waveform signal 67 is a signal indicating a single ideal waveform included in the servo band signal S in accordance with the inclined angle α of the servo pattern 58 (for example, ideal signal which is a result of reading one ideal magnetization straight line included in the servo pattern 58 inclined with respect to the imaginary straight line C1 at a predetermined angle by the servo reading element SR). The ideal waveform signal 67 can be said to be a sample signal in accordance with the inclined angle α of the servo pattern 58 to be compared with the servo band signal S. It should be noted that the ideal waveform signal 67 is an example of an "ideal waveform signal" according to the technology of the present disclosure.

An ideal waveform indicated by a first ideal waveform signal 67A is a waveform determined in accordance with the orientation of the magnetic head 28 on the magnetic tape MT. A relative positional relationship between the holder 44 (see FIG. 8) of the magnetic head 28 and the servo reading element SR is fixed. Therefore, the ideal waveform indicated by the first ideal waveform signal 67A can be said to be a waveform determined in accordance with the orientation of the servo reading element SR on the magnetic tape MT. Stated another way, the ideal waveform indicated by the first ideal waveform signal 67A is a waveform in accordance with the inclined angle α of the servo pattern 58. For example, the ideal waveform indicated by the first ideal waveform signal 67A is a waveform determined in accordance with the inclined angle θa of the linear magnetization region 60A1 of the servo pattern 58.

As described above, since the relative positional relationship between the holder 44 (see FIG. 8) of the magnetic head 28 and the servo reading element SR is fixed, the ideal waveform indicated by the first ideal waveform signal 67A can be said to be a waveform determined in accordance with the geometrical characteristic of the linear magnetization region pair 60A of the servo pattern 58 (for example, geometrical characteristic of the magnetization straight line 60A1$a$) and the orientation of the servo reading element SR on the magnetic tape MT. Here, the orientation of the magnetic head 28 on the magnetic tape MT refers to, for example, an angle formed by the linear magnetization region 60A1 and the magnetic head 28 on the magnetic tape MT. In addition, the orientation of the servo reading element SR on the magnetic tape MT refers to, for example, an angle formed by the linear magnetization region 60A1 and the servo reading element SR on the magnetic tape MT.

Similarly to the ideal waveform indicated by the first ideal waveform signal 67A, an ideal waveform indicated by a second ideal waveform signal 67B is also a waveform determined in accordance with the orientation of the magnetic head 28 on the magnetic tape MT, that is, a waveform determined in accordance with the orientation of the servo reading element SR on the magnetic tape MT. Stated another way, the ideal waveform indicated by the second ideal waveform signal 67B is a waveform in accordance with the inclined angle α of the servo pattern 58. For example, the ideal waveform indicated by the second ideal waveform signal 67B is a waveform determined in accordance with the inclined angle θb of the linear magnetization region 60A2 of the servo pattern 58.

For example, the ideal waveform indicated by the second ideal waveform signal 67B is a waveform determined in accordance with the geometrical characteristic of the linear magnetization region 60A2 of the servo pattern 58A (for example, geometrical characteristic of the magnetization straight line 60A2a) and the orientation of the magnetic head 28 on the magnetic tape MT, that is, a waveform determined in accordance with the geometrical characteristic of the linear magnetization region 60A2 of the servo pattern 58A (for example, geometrical characteristic of the magnetization straight line 60A2a) and the orientation of the servo reading element SR on the magnetic tape MT. Here, the orientation of the magnetic head 28 on the magnetic tape MT refers to, for example, an angle formed by the linear magnetization region 60A2 and the magnetic head 28 on the magnetic tape MT. In addition, the orientation of the servo reading element SR on the magnetic tape MT refers to, for example, an angle formed by the linear magnetization region 60A2 and the servo reading element SR on the magnetic tape MT.

The first angle detection unit 30D1 calculates an angle formed by the linear magnetization region 60A1 in the servo band SB3 and the servo reading element SR by comparing the first servo band signal S1 with the ideal waveform signal 67. In the example shown in FIG. 28, the first angle detection unit 30D1 detects the inclined angle α of the servo pattern 58 by using the first detection circuit 39A and the second detection circuit 39B.

The first servo band signal S1 is input to the first detection circuit 39A via the input terminal 30B1a. The first detection circuit 39A detects the inclined angle θa of the linear magnetization region 60A1 in the servo pattern 58 of the servo band SB3 from the input first servo band signal S1 by using the autocorrelation coefficient.

The autocorrelation coefficient used by the first detection circuit 39A is a coefficient indicating a degree of correlation between the first servo band signal S1 and the first ideal waveform signal 67A. The first detection circuit 39A acquires the first ideal waveform signal 67A from the cartridge memory 24 to compare the acquired first ideal waveform signal 67A with the first servo band signal S1. Moreover, the first detection circuit 39A calculates the autocorrelation coefficient based on the comparison result. The first detection circuit 39A detects an ideal waveform signal having the highest correlation with the first servo band signal S1 on the servo band SB2 in accordance with the autocorrelation coefficient. The first detection circuit 39A outputs the inclined angle θa of the linear magnetization region 60A1 corresponding to the detected ideal waveform signal.

On the other hand, the first servo band signal S1 is also input to the second detection circuit 39B via the input terminal 30B1a. The second detection circuit 39B detects the inclined angle θb of the linear magnetization region 60A2 in the servo pattern 58 of the servo band SB2 from the input first servo band signal S1 by using the autocorrelation coefficient.

The autocorrelation coefficient used by the second detection circuit 39B is a coefficient indicating a degree of correlation between the first servo band signal S1 and the second ideal waveform signal 67B. The second detection circuit 39B acquires the second ideal waveform signal 67B from the storage 32 to compare the acquired second ideal waveform signal 67B with the first servo band signal S1. Moreover, the second detection circuit 39B calculates the autocorrelation coefficient based on the comparison result. The second detection circuit 39B detects an ideal waveform signal having the highest correlation with the first servo band signal S1 on the servo band SB2 in accordance with the autocorrelation coefficient. The second detection circuit 39B outputs the inclined angle θb of the linear magnetization region 60A2 corresponding to the detected ideal waveform signal.

As an example, as shown in FIG. 29, the first angle detection unit 30D1 detects the inclined angle θa of the linear magnetization region 60A1 and the inclined angle θb of the linear magnetization region 60A2 based on the detection result by the first detection circuit 39A and the detection result by the second detection circuit 39B.

The inclined angle α of the servo pattern 58 is output from the output terminal 30B1b to the controller 30A. In addition, the control device 30 includes the PES calculation unit 30C. The PES calculation unit 30C calculates the PES by using the inclined angle θa of the linear magnetization region 60A1 and the inclined angle θb of the linear magnetization region 60A2 acquired from the angle detection unit 30D, and Expression (1). That is, in Expression (1), the inclined angle θa of the linear magnetization region 60A1 is used as $\theta_{Ai}$, and the inclined angle θb of the linear magnetization region 60A2 is used as $\theta_{Bi}$.

As an example, as shown in FIG. 29, the controller 30A adjusts the skew angle of the magnetic head 28 by operating the inclination mechanism 49 (see FIG. 14) based on the calculation result of the PES by the PES calculation unit 30C. In addition, the controller 30A causes the magnetic element unit 42 (see FIG. 17) to perform the magnetic processing on the data band DB of the magnetic tape MT. That is, the controller 30A acquires a read signal (that is, data read from the data band DB of the magnetic tape MT by the magnetic element unit 42) from the magnetic element unit 42, or supplies a recording signal to the magnetic element unit 42 to record the data in response to the recording signal in the data band DB of the magnetic tape MT.

In addition, in order to reduce the influence of the TDS, the controller 30A performs the tension control or skews the magnetic head 28 (see FIG. 14) on the magnetic tape MT in accordance with the angle detection result of the angle detection unit 30D. The tension control is realized by adjusting the rotation speed, rotation torque, and the like of each of the sending motor 36 (see FIG. 3) and the winding motor 40 (see FIG. 3). The skew of the magnetic head 28 is realized by operating the inclination mechanism 49 (see FIG. 14).

As described above, in the fifth modification example, as the ideal waveform indicated by the ideal waveform signal 67, a waveform determined in accordance with the orientation of the magnetic head 28 on the magnetic tape MT, that is, the orientation of the inclination mechanism 49 on the magnetic tape MT is used. Therefore, with the present configuration, it is possible to detect the servo pattern signal from the servo band signal S with higher accuracy than in a case in which the ideal waveform is determined regardless of the orientation of the magnetic head 28 on the magnetic tape MT, that is, the orientation of the servo reading element SR on the magnetic tape MT.

In the fifth modification example, as the ideal waveform indicated by the ideal waveform signal 67, the waveform determined in accordance with the geometrical characteristic of the servo pattern 58 and the orientation of the magnetic head 28 on the magnetic tape MT, that is, the geometrical characteristic of the servo pattern 58 and the orientation of the servo reading element SR on the magnetic tape MT is used. Therefore, with the present configuration, it is possible to detect the servo pattern signal from the servo band signal S with higher accuracy than in a case in which the ideal waveform is determined regardless of the geometrical characteristic of the servo pattern 58 and the orientation of the magnetic head 28 on the magnetic tape MT, that is, the geometrical characteristic of the servo pattern 58 and the orientation of the servo reading element SR on the magnetic tape MT.

In addition, in the fifth modification example, the linear magnetization regions 60A1 and 60A2 inclined in opposite directions with respect to the imaginary straight line C1 are read by the servo reading element SR. In this case, as described above, there is the variation due to the azimuth loss between the first linear magnetization region signal S1a (see FIG. 28) and the second linear magnetization region signal S1b (see FIG. 28). In the fifth modification example, the ideal waveform signal 67 is stored in the cartridge memory 24, and the inclined angle α of the servo pattern 58 is detected by comparing the servo pattern signal with the ideal waveform signal 67. Therefore, with the present configuration, even in a case in which the linear magnetization regions 60A1 and 60A2 inclined in opposite directions with respect to the imaginary straight line C1 are read by the servo reading element SR, it is possible to detect the inclined angle α of the servo pattern 58 with higher accuracy than in a case in which the inclined angle α of the servo pattern 58 is detected by using only the method of determining whether or not the signal level exceeds the threshold value.

In addition, in the fifth modification example, the first detection circuit 39A and the second detection circuit 39B are connected in parallel, and the common servo band signal S is incorporated into the first detection circuit 39A and the second detection circuit 39B. Moreover, the inclined angle θa of the linear magnetization region 60A1 is detected by comparing the servo band signal S with the first ideal waveform signal 67A by the first detection circuit 39A, and the inclined angle θb of the linear magnetization region 60A2 is detected by comparing the servo band signal S with the second ideal waveform signal 67B by the second detection circuit 39B. For example, the first position detection unit 30B1 detects the inclined angle θa of the linear magnetization region 60A1 detected by the first detection circuit 39A and the inclined angle θb of the linear magnetization region 60A2 detected by the second detection circuit 39B. In addition, the second position detection unit 30B2 detects the inclined angle θa of the linear magnetization region 60A1 detected by the first detection circuit 39A and the inclined angle θb of the linear magnetization region 60A2 detected by the second detection circuit 39B. Therefore, with the present configuration, it is possible to detect the inclined angle α of the servo pattern 58 more quickly than in a case in which the inclined angle θa of the linear magnetization region 60A1 and the inclined angle θb of the linear magnetization region 60A2 are detected in order by sequentially comparing different ideal waveform signals with respect to one servo band signal S.

Sixth Modification Example

Figure 30:
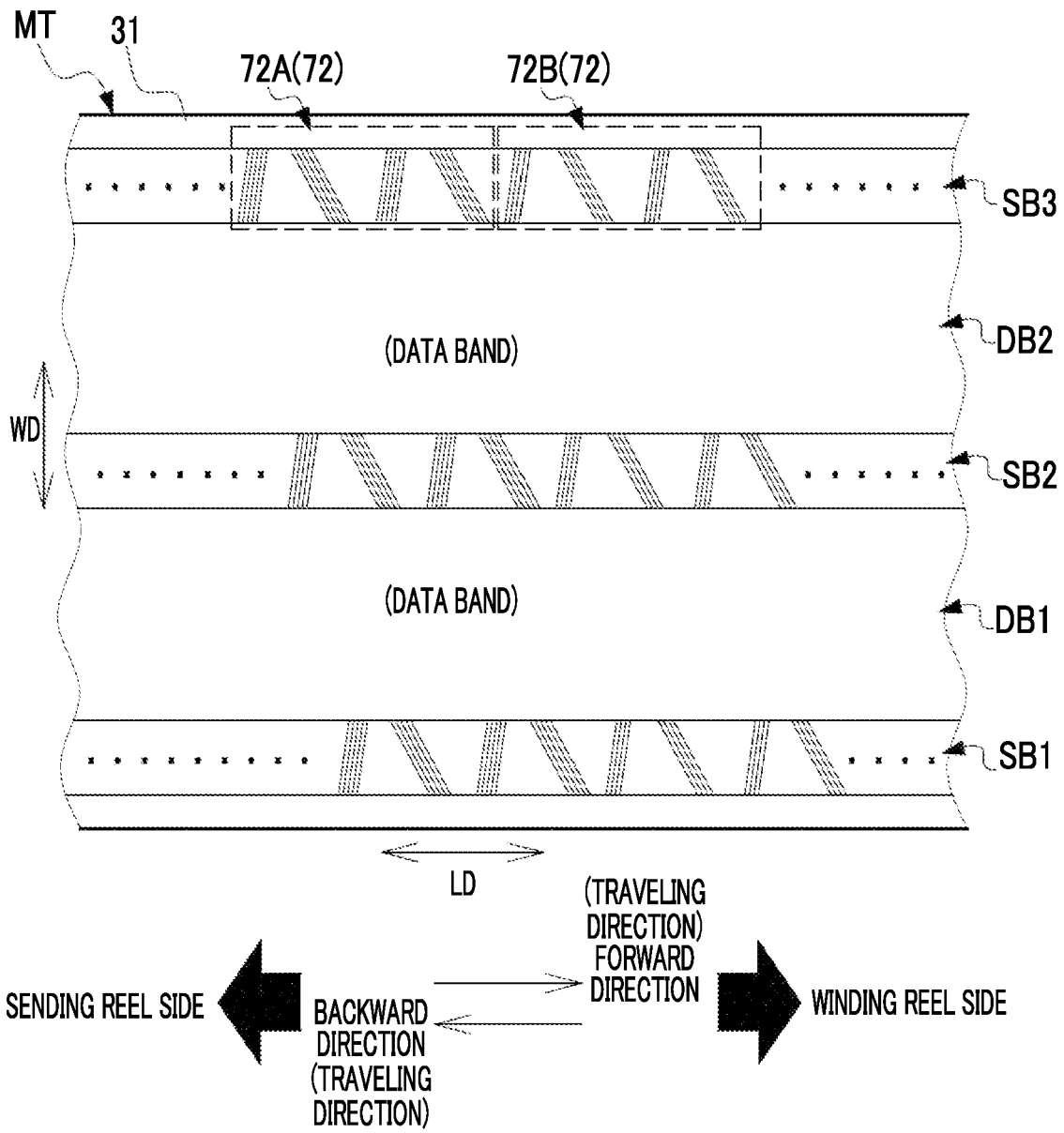
FIG. 30 is a conceptual diagram showing a sixth modification example, and is a conceptual diagram showing a modification example of the magnetic tape according to the embodiment (conceptual diagram showing an example of an aspect in which the magnetic tape is observed from the front surface side of the magnetic tape).

In the embodiment described above, the form example has been described in which the plurality of V-shaped servo patterns 58 are recorded in the servo band SB along the longitudinal direction LD of the magnetic tape MT, but the technology of the present disclosure is not limited to this. For example, as shown in FIG. 30, a servo pattern 72 may be an M-shaped magnetized servo pattern. A plurality of servo patterns 72 are recorded in the servo band SB along the longitudinal direction LD of the magnetic tape MT. The plurality of servo patterns 72 are disposed at regular intervals along the longitudinal direction LD of the magnetic tape MT, similarly to the plurality of servo patterns 58.

In the example shown in FIG. 30, servo patterns 72A and 72B are shown as an example of the set of servo patterns 72. Each of the servo patterns 72A and 72B is an M-shaped magnetized servo pattern. The servo patterns 72A and 72B are adjacent to each other along the longitudinal direction LD of the magnetic tape MT. The servo pattern 72A is positioned on the upstream side in the forward direction, and the servo pattern 72B is positioned on the downstream side in the forward direction.

Figure 31:
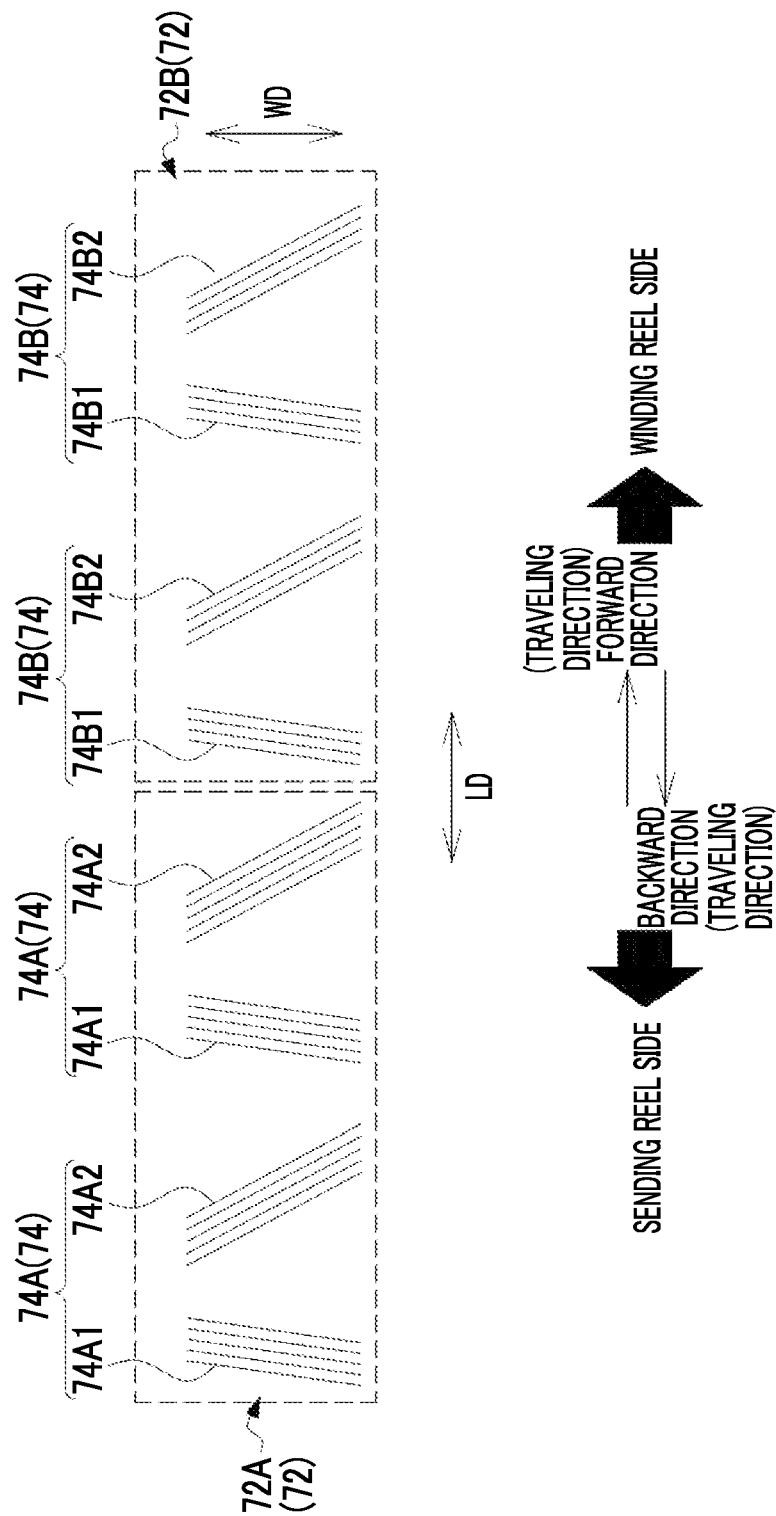
FIG. 31 is a conceptual diagram showing the sixth modification example, and is a conceptual diagram showing an example of an aspect of the servo pattern included in the magnetic tape.

As an example, as shown in FIG. 31, the servo pattern 72 consists of a linear magnetization region pair 74. The linear magnetization region pair 74 is classified into a linear magnetization region pair 74A and a linear magnetization region pair 74B. The servo pattern 72A consists of a set of linear magnetization region pairs 74A. The set of linear magnetization region pairs 74A are disposed in a state of being adjacent to each other along the longitudinal direction LD of the magnetic tape MT.

In the example shown in FIG. 31, linear magnetization regions 74A1 and 74A2 are shown as an example of the linear magnetization region pair 74A. The linear magnetization region pair 74A is configured in the same manner as the linear magnetization region pair 60A described in the above embodiment, and has the same geometrical characteristic as the linear magnetization region pair 60A. That is, the linear magnetization region 74A1 is configured in the same manner as the linear magnetization region 60A1 described in the above embodiment, and has the same geometrical characteristic as the linear magnetization region 60A1, and the linear magnetization region 74A2 is configured in the same manner as the linear magnetization region 60A2 described in the above embodiment, and has the same geometrical characteristic as the linear magnetization region 60A2.

In the example shown in FIG. 31, the linear magnetization region pair 74A is an example of a "linear magnetization region pair" according to the technology of the present disclosure, the linear magnetization region 74A1 is an example of a "first linear magnetization region" according to the technology of the present disclosure, and the linear magnetization region 74A2 is an example of a "second linear magnetization region" according to the technology of the present disclosure.

The servo pattern 72B consists of a set of linear magnetization region pairs 74B. The set of linear magnetization region pairs 74B are disposed in a state of being adjacent to each other along the longitudinal direction LD of the magnetic tape MT.

In the example shown in FIG. 31, linear magnetization regions 74B1 and 74B2 are shown as an example of the linear magnetization region pair 74B. The linear magnetization region pair 74B is configured in the same manner as the linear magnetization region pair 60B described in the above embodiment, and has the same geometrical characteristic as the linear magnetization region pair 60B. That is, the linear magnetization region 74B1 is configured in the same manner as the linear magnetization region 60B1 described in the above embodiment, and has the same geometrical characteristic as the linear magnetization region 60B1, and the linear magnetization region 74B2 is configured in the same manner as the linear magnetization region 60B2 described in the above embodiment, and has the same geometrical characteristic as the linear magnetization region 60B2.

In the example shown in FIG. 31, the linear magnetization region pair 74B is an example of a "linear magnetization region pair" according to the technology of the present disclosure, the linear magnetization region 74B1 is an example of a "first linear magnetization region" according to the technology of the present disclosure, and the linear magnetization region 74B2 is an example of a "second linear magnetization region" according to the technology of the present disclosure.

Seventh Modification Example

Figure 32:
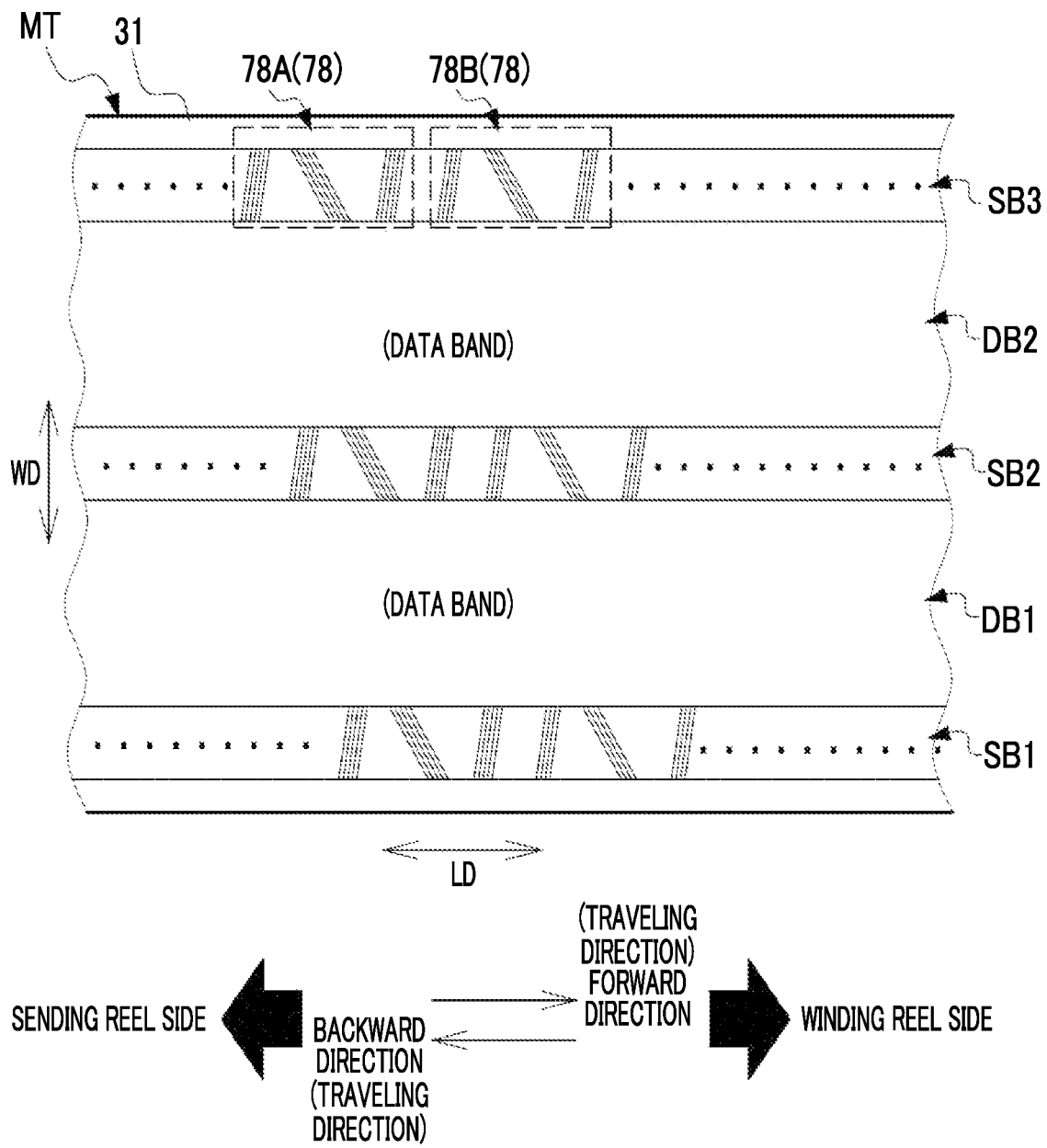
FIG. 32 is a conceptual diagram showing a seventh modification example, and is a conceptual diagram showing a modification example of the magnetic tape according to the embodiment (conceptual diagram showing an example of an aspect in which the magnetic tape is observed from the front surface side of the magnetic tape).
Figure 33:
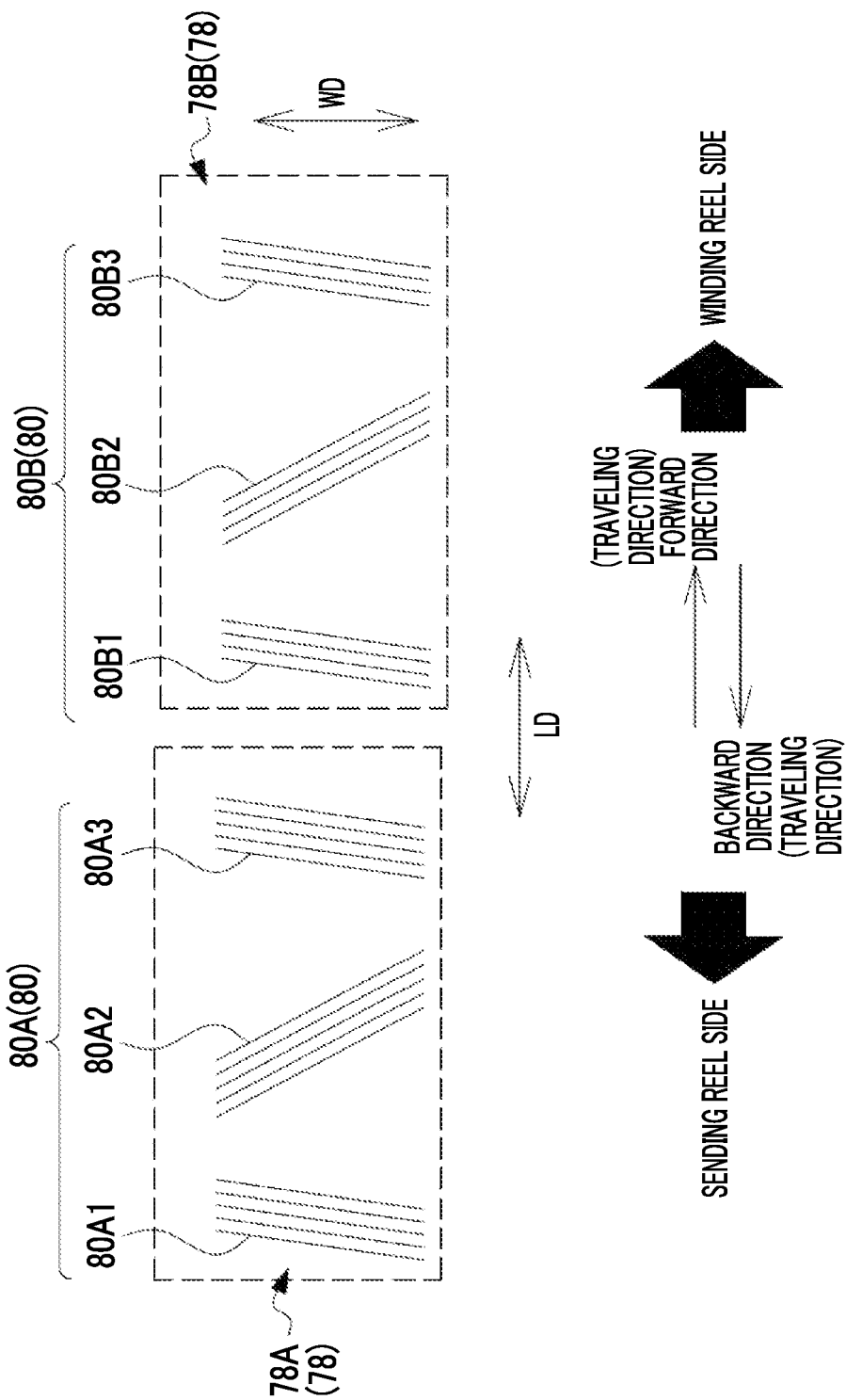
FIG. 33 is a conceptual diagram showing the seventh modification example, and is a conceptual diagram showing an example of an aspect of the servo pattern included in the magnetic tape.

In the example shown in FIG. 32, the form example has been described in which the plurality of M-shaped servo patterns 58 are recorded in the servo band SB along the longitudinal direction LD of the magnetic tape MT, but the technology of the present disclosure is not limited to this. For example, as shown in FIG. 33, the servo pattern 72 may be an N-shaped magnetized servo pattern. A plurality of servo patterns 78 are recorded in the servo band SB along the longitudinal direction LD of the magnetic tape MT. Similarly to the plurality of servo patterns 72 (see FIG. 30), the plurality of servo patterns 78 are disposed at regular intervals along the longitudinal direction LD of the magnetic tape MT.

In the example shown in FIG. 32, servo patterns 78A and 78B are shown as an example of the set of servo patterns 78. Each of the servo patterns 78A and 78B is an N-shaped magnetized servo pattern. The servo patterns 78A and 78B are adjacent to each other along the longitudinal direction LD of the magnetic tape MT. The servo pattern 78A is positioned on the upstream side in the forward direction, and the servo pattern 78B is positioned on the downstream side in the forward direction.

As an example, as shown in FIG. 33, the servo pattern 78 consists of a linear magnetization region group 80. The linear magnetization region group 80 is classified into a linear magnetization region group 80A and a linear magnetization region group 80B.

The servo pattern 78A consists of the linear magnetization region group 80A. The linear magnetization region group 80A consists of linear magnetization regions 80A1, 80A2, and 80A3. The linear magnetization regions 80A1, 80A2, and 80A3 are disposed in a state of being adjacent to each other along the longitudinal direction LD of the magnetic tape MT. The linear magnetization regions 80A1, 80A2, and 80A3 are disposed in the order of the linear magnetization regions 80A1, 80A2, and 80A3 from the upstream side in the forward direction.

The linear magnetization regions 80A1 and 80A2 are configured in the same manner as the linear magnetization region pair 74A shown in FIG. 31, and have the same geometrical characteristics as the linear magnetization region pair 74A. That is, the linear magnetization region 80A1 is configured in the same manner as the linear magnetization region 74A1 shown in FIG. 31, and has the same geometrical characteristic as the linear magnetization region 74A1, and the linear magnetization region 80A2 is configured in the same manner as the linear magnetization region 74A2 shown in FIG. 31, and has the same geometrical characteristic as the linear magnetization region 74A2. In addition, the linear magnetization region 80A3 is configured in the same manner as the linear magnetization region 80A1, and has the same geometrical characteristic as the linear magnetization region 80A1.

In the example shown in FIG. 33, the linear magnetization regions 80A1 and 80A2 are examples of a "linear magnetization region pair" according to the technology of the present disclosure, and in this case, the linear magnetization region 80A1 is an example of a "first linear magnetization region" according to the technology of the present disclosure, and the linear magnetization region 80A2 is an example of a "second linear magnetization region" according to the technology of the present disclosure. In addition, the linear magnetization regions 80A2 and 80A3 are also examples of a "linear magnetization region pair" according to the technology of the present disclosure, and in this case, the linear magnetization region 80A3 is an example of a "first linear magnetization region" according to the technology of the present disclosure, and the linear magnetization region 80A2 is an example of a "second linear magnetization region" according to the technology of the present disclosure.

The servo pattern 78B consists of the linear magnetization region group 80B. The linear magnetization region group 80B consists of linear magnetization regions 80B1, 80B2, and 80B3. The linear magnetization regions 80B1, 80B2, and 80B3 are disposed in a state of being adjacent to each other along the longitudinal direction LD of the magnetic tape MT. The linear magnetization regions 80B1, 80B2, and 80B3 are disposed in the order of the linear magnetization regions 80B1, 80B2, and 80B3 from the upstream side in the forward direction.

The linear magnetization regions 80B1 and 80B2 are configured in the same manner as the linear magnetization region pair 74B shown in FIG. 31, and have the same geometrical characteristics as the linear magnetization region pair 74B. That is, the linear magnetization region 80B1 is configured in the same manner as the linear magnetization region 74B1 shown in FIG. 31, and has the same geometrical characteristic as the linear magnetization region 74B1, and the linear magnetization region 80B2 is configured in the same manner as the linear magnetization region 74B2 shown in FIG. 31, and has the same geometrical characteristic as the linear magnetization region 74B2. In addition, the linear magnetization region 80B3 is configured in the same manner as the linear magnetization region 80B1, and has the same geometrical characteristic as the linear magnetization region 80B1.

In the example shown in FIG. 33, the linear magnetization regions 80B1 and 80B2 are examples of a "linear magnetization region pair" according to the technology of the present disclosure, and in this case, the linear magnetization region 80B1 is an example of a "first linear magnetization region" according to the technology of the present disclosure, and the linear magnetization region 80B2 is an example of a "second linear magnetization region" according to the technology of the present disclosure. In addition, the linear magnetization regions 80B2 and 80B3 are also examples of a "linear magnetization region pair" according to the technology of the present disclosure, and in this case, the linear magnetization region 80B3 is an example of a "first linear magnetization region" according to the technology of the present disclosure, and the linear magnetization region 80B2 is an example of a "second linear magnetization region" according to the technology of the present disclosure.

Eighth Modification Example

In the embodiment described above, the form example has been described in which, in the servo pattern 58, the positions of both ends of each of the four magnetization straight lines 60B1a and the positions of both ends of each of the four magnetization straight lines 60B2a are aligned, but the technology of the present disclosure is not limited to this. For example, as shown in FIG. 34, in a servo pattern 84, an overall position of the linear magnetization region 86A1 and an overall position of the linear magnetization region 86A2 may deviate from each other in the width direction WD.

Figure 34:
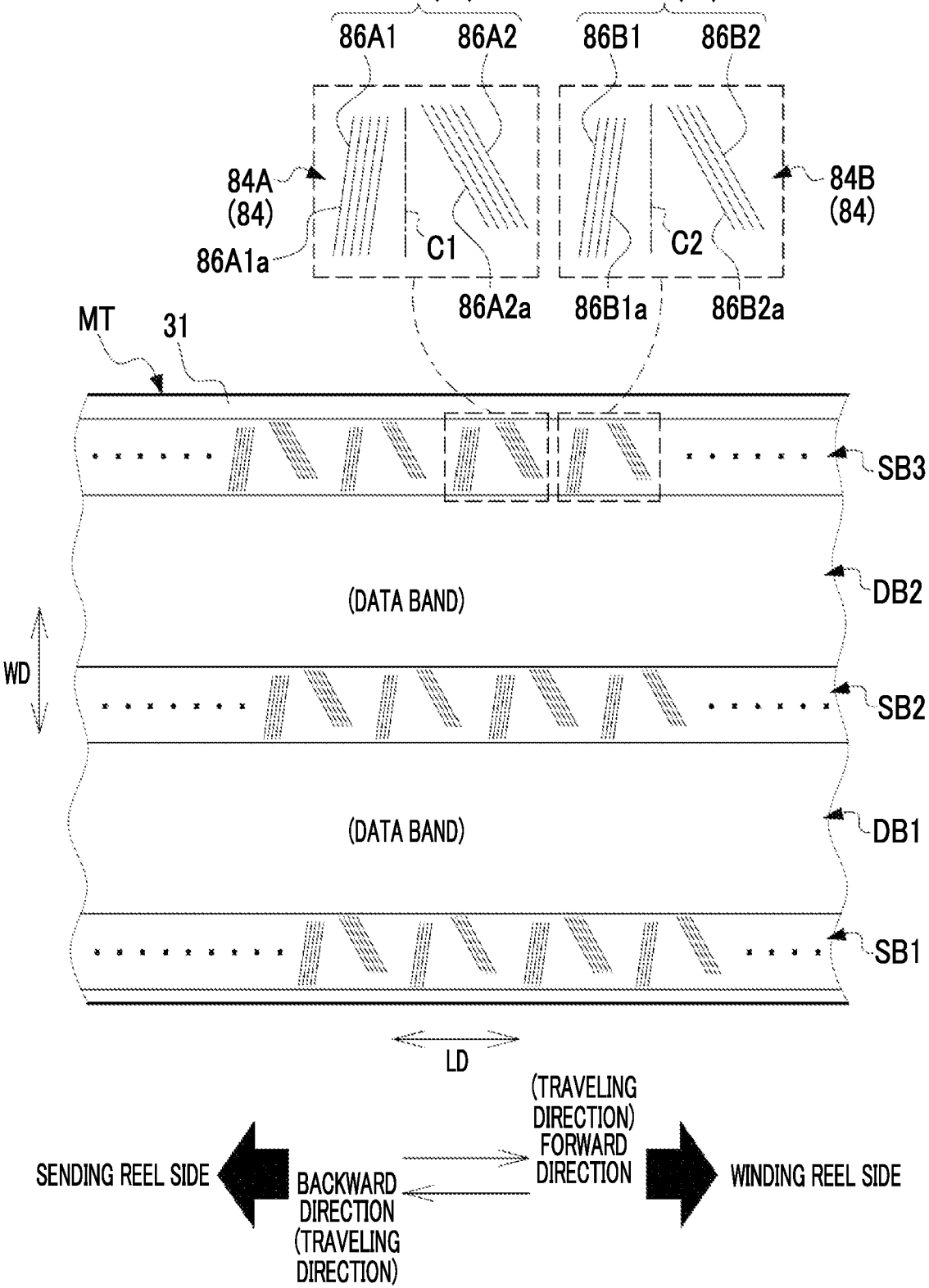
FIG. 34 is a conceptual diagram showing an eighth modification example, and is a conceptual diagram showing a modification example of the magnetic tape according to the embodiment (conceptual diagram showing an example of an aspect in which the magnetic tape is observed from the front surface side of the magnetic tape).

In the example shown in FIG. 34, a plurality of servo patterns 84 are recorded in the servo band SB along the longitudinal direction LD of the magnetic tape MT. The plurality of servo patterns 84 are disposed at regular intervals along the longitudinal direction LD of the magnetic tape MT, similarly to the plurality of servo patterns 52 (see FIG. 6) recorded in the magnetic tape MT0 (see FIG. 6).

In the example shown in FIG. 34, servo patterns 84A and 84B are shown as an example of the set of servo patterns 84. The servo patterns 84A and 84B are adjacent to each other along the longitudinal direction LD of the magnetic tape MT. The servo pattern 84A is positioned on the upstream side in the forward direction, and the servo pattern 84B is positioned on the downstream side in the forward direction.

The servo pattern 84 consists of a linear magnetization region pair 86. The linear magnetization region pair 86 is classified into a linear magnetization region pair 86A and a linear magnetization region pair 86B. In the eighth modification example, the linear magnetization region pair 86 is an example of a "linear magnetization region pair" according to the technology of the present disclosure.

The servo pattern 84A consists of the linear magnetization region pair 86A. In the example shown in FIG. 34, linear magnetization regions 86A1 and 86A2 are shown as an example of the linear magnetization region pair 86A. Each of the linear magnetization regions 86A1 and 86A2 is a linearly magnetized region.

In the eighth modification example, the linear magnetization region 86A1 is an example of a "first linear magnetization region" according to the technology of the present disclosure, and the linear magnetization region 86A2 is a "second linear magnetization region" according to the technology of the present disclosure.

The linear magnetization regions 86A1 and 86A2 are inclined in opposite directions with respect to the imaginary straight line C1. The linear magnetization regions 86A1 and 86A2 are not parallel to each other and are inclined at different angles with respect to the imaginary straight line C1. The linear magnetization region 86A1 has a steeper inclined angle with respect to the imaginary straight line C1 than the linear magnetization region 86A2. Here, "steep" means that, for example, an angle of the linear magnetization region 86A1 with respect to the imaginary straight line C1 is smaller than an angle of the linear magnetization region 86A2 with respect to the imaginary straight line C1.

In addition, the overall position of the linear magnetization region 86A1 and the overall position of the linear magnetization region 86A2 deviate from each other in the width direction WD. That is, the position of one end of the linear magnetization region 86A1 and the position of one end of the linear magnetization region 86A2 are not uniform in the width direction WD, and the position of the other end of the linear magnetization region 86A1 and the position of the other end of the linear magnetization region 86A2 are not uniform in the width direction WD.

In the servo pattern 84A, a plurality of magnetization straight lines 86A1a are included in the linear magnetization region 86A1, and a plurality of magnetization straight lines 86A2a are included in the linear magnetization region 86A2. The number of the magnetization straight lines 86A1a included in the linear magnetization region 86A1 is the same as the number of the magnetization straight lines 86A2a included in the linear magnetization region 86A2.

The linear magnetization region 86A1 is a set of magnetization straight lines 86A1a, which are five magnetized straight lines, and the linear magnetization region 86A2 is a set of magnetization straight lines 86A2a, which are five magnetized straight lines.

In the servo band SB, the position of one end of each of all the magnetization straight lines 86A1a included in the linear magnetization region 86A1 in the width direction WD is aligned, and the position of the other end of each of all the magnetization straight lines 86A1a included in the linear magnetization region 86A1 in the width direction WD is also aligned. In addition, in the servo band SB, the position of one end of each of all the magnetization straight lines 86A2a included in the linear magnetization region 86A2 in the width direction WD is aligned, and the position of the other end of each of all the magnetization straight lines 86A2a included in the linear magnetization region 86A2 in the width direction WD is also aligned.

The servo pattern 84B consists of the linear magnetization region pair 86B. In the example shown in FIG. 34, linear magnetization regions 86B1 and 86B2 are shown as an example of the linear magnetization region pair 86B. Each of the linear magnetization regions 86B1 and 86B2 is a linearly magnetized region.

In the eighth modification example, the linear magnetization region 86B1 is an example of a "first linear magnetization region" according to the technology of the present disclosure, and the linear magnetization region 86B2 is a "second linear magnetization region" according to the technology of the present disclosure.

The linear magnetization regions 86B1 and 86B2 are inclined in opposite directions with respect to the imaginary straight line C2. The linear magnetization regions 86B1 and 86B2 are not parallel to each other and are inclined at different angles with respect to the imaginary straight line C2. The linear magnetization region 86B1 has a steeper inclined angle with respect to the imaginary straight line C2 than the linear magnetization region 86B2. Here, "steep" means that, for example, an angle of the linear magnetization region 86B1 with respect to the imaginary straight line C2 is smaller than an angle of the linear magnetization region 86B2 with respect to the imaginary straight line C2.

In addition, the overall position of the linear magnetization region 86B1 and the overall position of the linear magnetization region 86B2 deviate from each other in the width direction WD. That is, the position of one end of the linear magnetization region 86B1 and the position of one end of the linear magnetization region 86B2 are not uniform in the width direction WD, and the position of the other end of the linear magnetization region 86B1 and the position of the other end of the linear magnetization region 86B2 are not uniform in the width direction WD.

In the servo pattern 84B, a plurality of magnetization straight lines 86B1a are included in the linear magnetization region 86B1, and a plurality of magnetization straight lines 86B2a are included in the linear magnetization region 86B2. The number of the magnetization straight lines 86B1a included in the linear magnetization region 86B1 is the same as the number of the magnetization straight lines 86B2*a* included in the linear magnetization region 86B2.

The total number of the magnetization straight lines 86B1*a* and 86B2*a* included in the servo pattern 84B is different from the total number of the magnetization straight lines 86A1*a* and 86A2*a* included in the servo pattern 84A. In the example shown in FIG. 34, the total number of the magnetization straight lines 86A1*a* and 86A2*a* included in the servo pattern 84A is ten, whereas the total number of the magnetization straight lines 86B1*a* and 86B2*a* included in the servo pattern 84B is eight.

The linear magnetization region 86B1 is a set of magnetization straight lines 86B1*a*, which are four magnetized straight lines, and the linear magnetization region 86B2 is a set of magnetization straight lines 86B2*a*, which are four magnetized straight lines.

In the servo band SB, the position of one end of each of all the magnetization straight lines 86B1*a* included in the linear magnetization region 86B1 in the width direction WD is aligned, and the position of the other end of each of all the magnetization straight lines 86B1*a* included in the linear magnetization region 86B1 in the width direction WD is also aligned. In addition, in the servo band SB, the position of one end of each of all the magnetization straight lines 86B2*a* included in the linear magnetization region 86B2 in the width direction WD is aligned, and the position of the other end of each of all the magnetization straight lines 86B2*a* included in the linear magnetization region 86B2 in the width direction WD is also aligned.

It should be noted that, here, the set of magnetization straight lines 86A1*a*, which are five magnetized straight lines, is described as an example of the linear magnetization region 86A1, the set of magnetization straight lines 86A2*a*, which are five magnetized straight lines, is described as an example of the linear magnetization region 86A2, the set of magnetization straight lines 86B1*a*, which are four magnetized straight lines, is described as an example of the linear magnetization region 86B1, and the set of magnetization straight lines 86B2*a*, which are four magnetized straight lines, is described as an example of the linear magnetization region 86B2, but the technology of the present disclosure is not limited thereto. For example, the linear magnetization region 86A1 need only have the number of the magnetization straight lines 86A1*a* that contribute to specifying the position of the magnetic head 28 on the magnetic tape MT, the linear magnetization region 86A2 need only have the number of the magnetization straight lines 86A2*a* that contribute to specifying the position of the magnetic head 28 on the magnetic tape MT, the linear magnetization region 86B1 need only have the number of the magnetization straight lines 86B1*a* that contribute to specifying the position of the magnetic head 28 on the magnetic tape MT, and the linear magnetization region 86B2 need only have the number of the magnetization straight lines 86B2*a* that contribute to specifying the position of the magnetic head 28 on the magnetic tape MT.

Here, the geometrical characteristic of the linear magnetization region pair 86A on the magnetic tape MT will be described with reference to FIG. 35.

Figure 35:
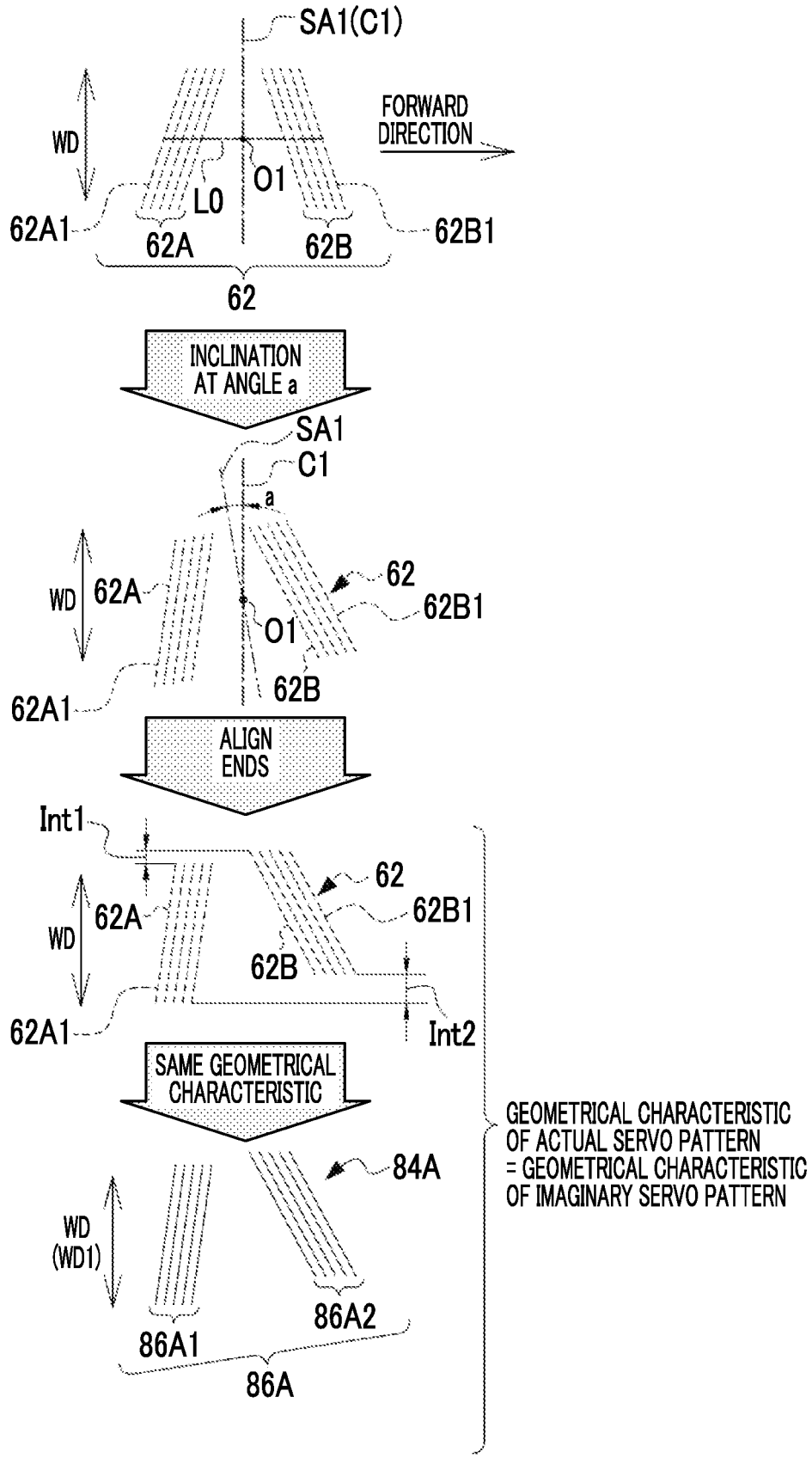
FIG. 35 is a conceptual diagram showing the eighth modification example, and is a conceptual diagram showing a relationship between the geometrical characteristic of the actual servo pattern and the geometrical characteristic of the imaginary servo pattern.

As an example, as shown in FIG. 35, the geometrical characteristic of the linear magnetization region pair 86A on the magnetic tape MT can be expressed by using an imaginary linear region pair 62. Here, the entirety of the imaginary linear region pair 62 is inclined with respect to the imaginary straight line C1 by inclining the symmetry axis SA1 of the imaginary linear regions 62A and 62B at an angle $\alpha$ (for example, 10 degrees) with respect to the imaginary straight line C1 with the center O1 as the rotation axis. Moreover, the position of one end of each of all the straight lines 62A1 included in the imaginary linear region 62A of the imaginary linear region pair 62 in this state in the width direction WD is aligned, and the position of the other end of each of all the straight lines 62A1 included in the imaginary linear region 62A in the width direction WD is also aligned. In addition, similarly, the position of one end of each of all the straight lines 62B1 included in the imaginary linear region 62B of the imaginary linear region pair 62 in the width direction WD is aligned, and the position of the other end of each of all the straight lines 62B1 included in the imaginary linear region 62B in the width direction WD is also aligned. As a result, the imaginary linear region 62A and the imaginary linear region 62B deviate from each other in the width direction WD.

That is, one end of the imaginary linear region 62A and one end of the imaginary linear region 62B deviate from each other in the width direction WD at a regular interval Int1, and the other end of the imaginary linear region 62A and the other end of the imaginary linear region 62B deviate from each other in the width direction WD at a regular interval Int2.

The geometrical characteristic of the imaginary linear region pair 62 (that is, the geometrical characteristic of the imaginary servo pattern) obtained as described above corresponds to the geometrical characteristic of the actual servo pattern 84A. That is, the geometrical characteristic of the linear magnetization region pair 86A on the magnetic tape MT corresponds to the geometrical characteristic based on the imaginary linear region pair 62 inclined line-symmetrically with respect to the imaginary straight line C1 in a case in which the entirety of the imaginary linear region pair 62 is inclined with respect to the imaginary straight line C1 by inclining a symmetry axis SA1 of the imaginary linear region 62A and the imaginary linear region 62B with respect to the imaginary straight line C1.

The imaginary linear region 62A corresponds to the linear magnetization region 86A1 of the servo pattern 84A, and the imaginary linear region 62B corresponds to the linear magnetization region 86A2 of the servo pattern 84A. Therefore, in the servo band SB, the servo pattern 84A consisting of the linear magnetization region pair 86A in which one end of the linear magnetization region 86A1 and one end of the linear magnetization region 86A2 deviate from each other in the width direction WD at the regular interval Int1, and the other end of the linear magnetization region 86A1 and the other end of the linear magnetization region 86A2 deviate from each other in the width direction WD at the regular interval Int2 is recorded (see FIG. 35).

It should be noted that the linear magnetization region pair 86B is different from the linear magnetization region pair 86A only in that the four magnetization straight lines 86B1*a* are provided instead of the five magnetization straight lines 86A1*a* and the four magnetization straight lines 86B2*a* are provided instead of the five magnetization straight lines 86A2*a* (see FIG. 35). Therefore, in the servo band SB, the servo pattern 84B consisting of the linear magnetization region pair 86B in which one end of the linear magnetization region 86B1 and one end of the linear magnetization region 86B2 deviate from each other in the width direction WD at the regular interval Int1, and the other end of the linear magnetization region 86B1 and the other end of the linear magnetization region 86B2 deviate from each other in the width direction WD at the regular interval Int2 is recorded (see FIG. 35).

Figure 36:
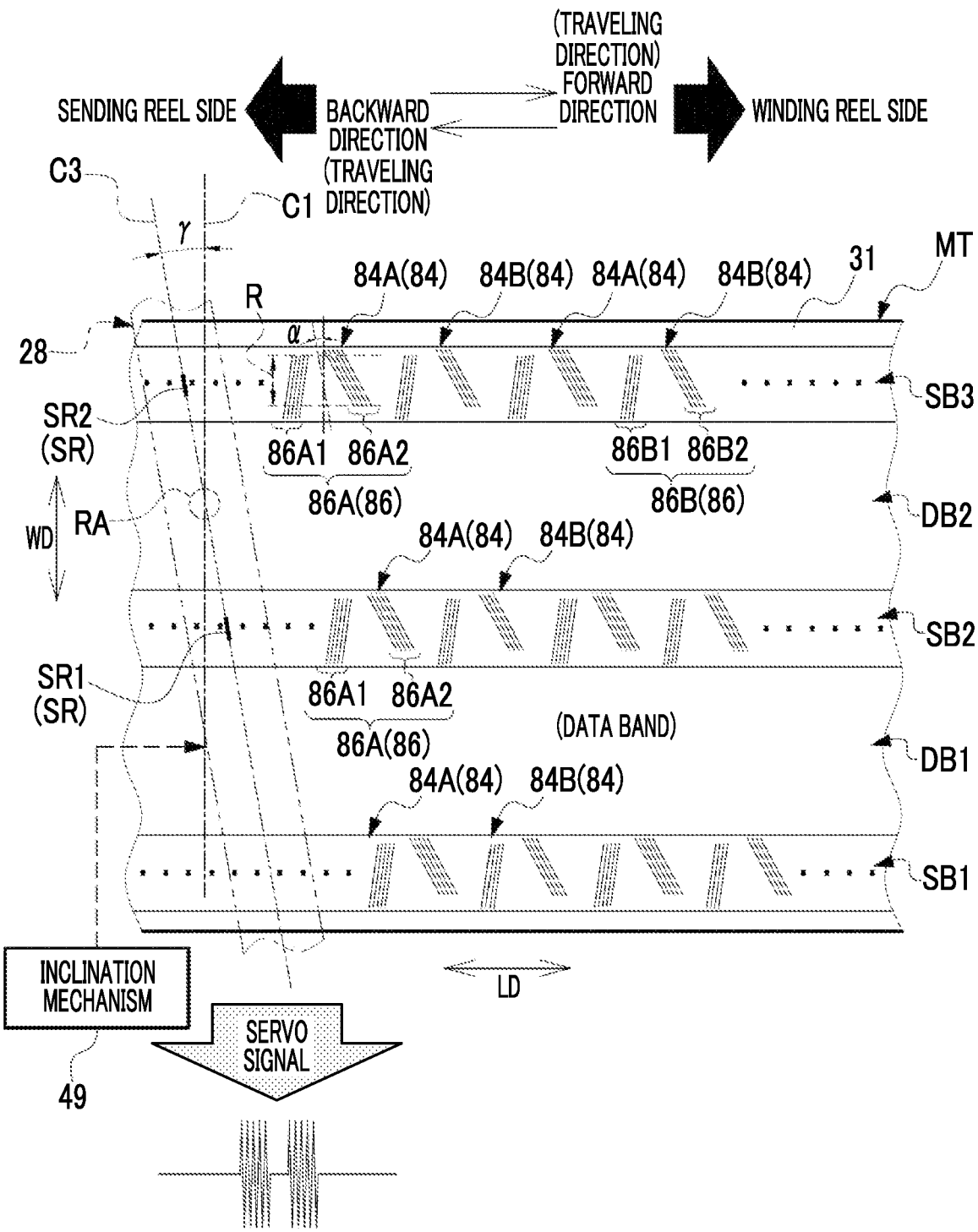
FIG. 36 is a conceptual diagram showing the eighth modification example, and is a conceptual diagram showing an example of an aspect in which a state in which the servo pattern is read by the servo reading element provided in the magnetic head that is skewed on the magnetic tape according to the embodiment is observed from the front surface side of the magnetic tape.

In the eighth modification example, similarly to the embodiment described above, as an example, as shown in FIG. 35, the inclination mechanism 49 skews the magnetic head 28 on the magnetic tape MT around the rotation axis RA such that the imaginary straight line C3 is inclined with respect to the imaginary straight line C1 to the upstream side in the forward direction at an angle γ (that is, the angle γ counterclockwise as viewed from the paper surface side of FIG. 36). That is, the magnetic head 28 is inclined at the angle γ to the upstream side in the forward direction on the magnetic tape MT. The angle γ is close to the inclined angle of the servo pattern 86. In this state, in a case in which the servo pattern 84A is read by the servo reading element SR along the longitudinal direction LD within a range R in which the linear magnetization regions 86A1 and 86A2 overlap with each other in the width direction WD, the variation due to the azimuth loss between the servo pattern signal derived from the linear magnetization region 86A1 and the servo pattern signal derived from the linear magnetization region 86A2 is smaller than in the examples shown in FIGS. 12 and 13. In addition, also in a case in which the servo pattern 84B (that is, the linear magnetization region pair 86B) is read by the servo reading element SR, similarly, the variation due to the azimuth loss between the servo pattern signal derived from the linear magnetization region 86B1 and the servo pattern signal derived from the linear magnetization region 86B2 is small.

Next, an action of the magnetic tape system 10 according to the eighth modification example will be described focusing on the parts different from the embodiment described above.

In the magnetic tape drive 14 according to the eighth modification example, in a case in which the magnetic tape MT is subjected to the magnetic processing by the magnetic element unit 42 (see FIGS. 3 and 17), the magnetic tape MT is pulled out from the magnetic tape cartridge 12, and the servo pattern 84 in the servo band SB is read by the servo reading element SR of the magnetic head 28.

As shown in FIGS. 34 and 35, the linear magnetization regions 86A1 and 86A2 included in the servo pattern 84A recorded in the servo band SB of the magnetic tape MT are inclined in opposite directions with respect to the imaginary straight line C1. On the other hand, as shown in FIG. 36, the magnetic head 28 is also inclined to the upstream side in the forward direction by the angle γ (that is, the angle γ counterclockwise as viewed from the paper surface side of FIG. 36) on the magnetic tape MT. In a case in which the servo pattern 84A is read by the servo reading element SR along the longitudinal direction LD within a range R (see FIG. 36) in this state, since the angle formed by the linear magnetization region 86A1 and the servo reading element SR and the angle formed by the linear magnetization region 86A2 and the servo reading element SR are close to each other, the variation in the servo pattern signal due to the azimuth loss is smaller than the variation generated between the servo pattern signal derived from the linear magnetization region 54A1 included in the known servo pattern 52A in the related art and the servo pattern signal derived from the linear magnetization region 54A2 included in the known servo pattern 52A in the related art.

As a result, the variation between the servo pattern signal derived from the linear magnetization region 86A1 and the servo pattern signal derived from the linear magnetization region 86A2 is smaller than the variation generated between the servo pattern signal derived from the linear magnetization region 54A1 included in the known servo pattern 52A in the related art and the servo pattern signal derived from the linear magnetization region 54A2 included in the known servo pattern 52A in the related art, and the servo pattern signal having higher reliability than the servo pattern signal obtained from the known servo pattern 52A in the related art can be obtained. That is, the same effect as the first effect described in the embodiment described above can be obtained. It should be noted that, as shown in FIG. 36, also in a case in which the servo pattern 84B is read by the servo reading element SR in a state in which the magnetic head 28 on the magnetic tape MT is inclined to the upstream side in the forward direction at the angle γ (that is, the angle γ counterclockwise as viewed from the paper surface side of FIG. 36), the same effect as the second effect described in the embodiment described above can be obtained.

In addition, in the magnetic tape MT according to the eighth modification example, the linear magnetization region 86A1 is a set of five magnetization straight lines 86A1a, and the linear magnetization region 86A2 is a set of five magnetization straight lines 86A2a. In addition, the linear magnetization region 86B1 is a set of four magnetization straight lines 86B1a, and the linear magnetization region 86B2 is a set of four magnetization straight lines 86B2a. Therefore, an amount of information obtained from the servo pattern 84 can be increased as compared with a case in which each linear magnetization region consists of one magnetization straight line, and as a result, highly accurate servo control can be realized. That is, the same effect as the sixth effect described in the embodiment described above can be obtained.

In addition, in the magnetic tape MT according to the eighth modification example, the geometrical characteristic of the linear magnetization region pair 86A on the magnetic tape MT corresponds to the geometrical characteristic of the imaginary linear region pair 62 in a case in which the entirety of the imaginary linear region pair 62 is inclined with respect to the imaginary straight line C1 by inclining the symmetry axis SA1 of the imaginary linear region pair 62 with respect to the imaginary straight line C1. Therefore, the variation between the servo pattern signal derived from the linear magnetization region 86A1 and the servo pattern signal derived from the linear magnetization region 86A2 can be made smaller than in a case in which the servo pattern 52A having the known geometrical characteristic in the related art is read by the servo reading element SR. As a result, it is possible to obtain the servo pattern signal having higher reliability than the servo pattern signal obtained from the servo pattern 52A having the known geometrical characteristic in the related art. That is, the same effect as the seventh effect described in the embodiment described above can be obtained.

It should be noted that the linear magnetization region pair 86B is different from the linear magnetization region pair 86A only in that the linear magnetization region 86B1 is provided instead of the linear magnetization region 86A1, and the linear magnetization region 86B2 is provided instead of the linear magnetization region 86A2. The linear magnetization region pair 86B configured as described above is also read by the servo reading element SR within the range R (see FIG. 36) along the longitudinal direction LD, similarly to the linear magnetization region pair 86A. Therefore, the variation between the servo pattern signal derived from the linear magnetization region 86B1 and the servo pattern signal derived from the linear magnetization region 86B2 can be made smaller than in a case in which the servo pattern 52B having the known geometrical characteristic in the related art is read by the servo reading element SR. As a result, it is possible to obtain the servo pattern signal having higher reliability than the servo pattern signal obtained from the servo pattern 52B having the known geometrical characteristic in the related art. That is, the same effect as the eighth effect described in the embodiment described above can be obtained.

Ninth Modification Example

Figure 37:
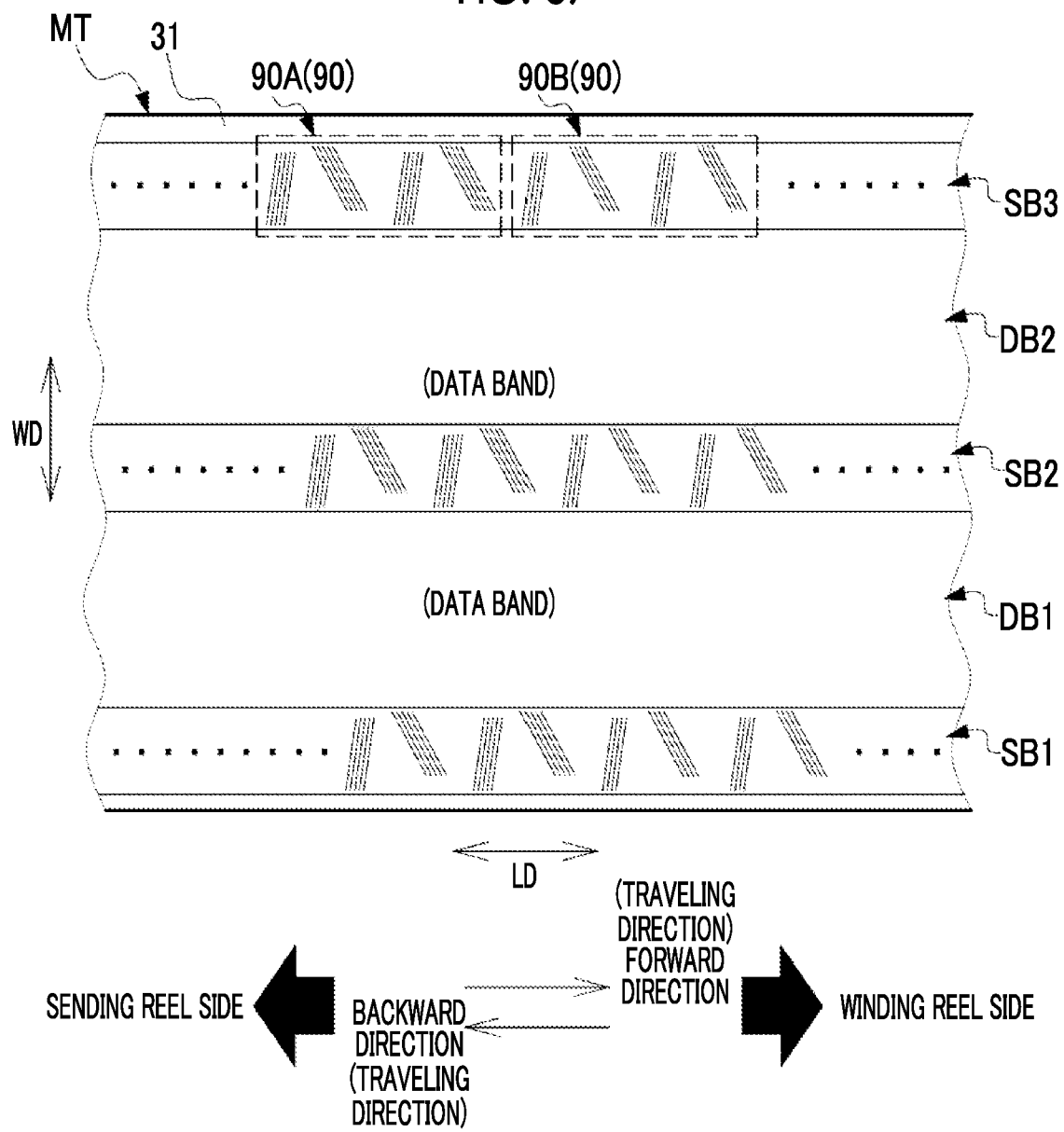
FIG. 37 is a conceptual diagram showing a ninth modification example, and is a conceptual diagram showing a modification example of the magnetic tape according to the embodiment (conceptual diagram showing an example of an aspect in which the magnetic tape is observed from the front surface side of the magnetic tape).

In the eighth modification example, the form example has been described in which the plurality of V-shaped servo patterns 84 are recorded in the servo band SB along the longitudinal direction LD of the magnetic tape MT, but the technology of the present disclosure is not limited to this. For example, as shown in FIG. 37, a servo pattern 90 may be an M-shaped magnetized servo pattern. A plurality of servo patterns 90 are recorded in the servo band SB along the longitudinal direction LD of the magnetic tape MT. The plurality of servo patterns 72 are disposed at regular intervals along the longitudinal direction LD of the magnetic tape MT, similarly to the plurality of servo patterns 84.

In the example shown in FIG. 37, servo patterns 90A and 90B are shown as an example of the set of servo patterns 90. Each of the servo patterns 90A and 90B is an M-shaped magnetized servo pattern. The servo patterns 90A and 90B are adjacent to each other along the longitudinal direction LD of the magnetic tape MT. The servo pattern 90A is positioned on the upstream side in the forward direction, and the servo pattern 90B is positioned on the downstream side in the forward direction.

Figure 38:
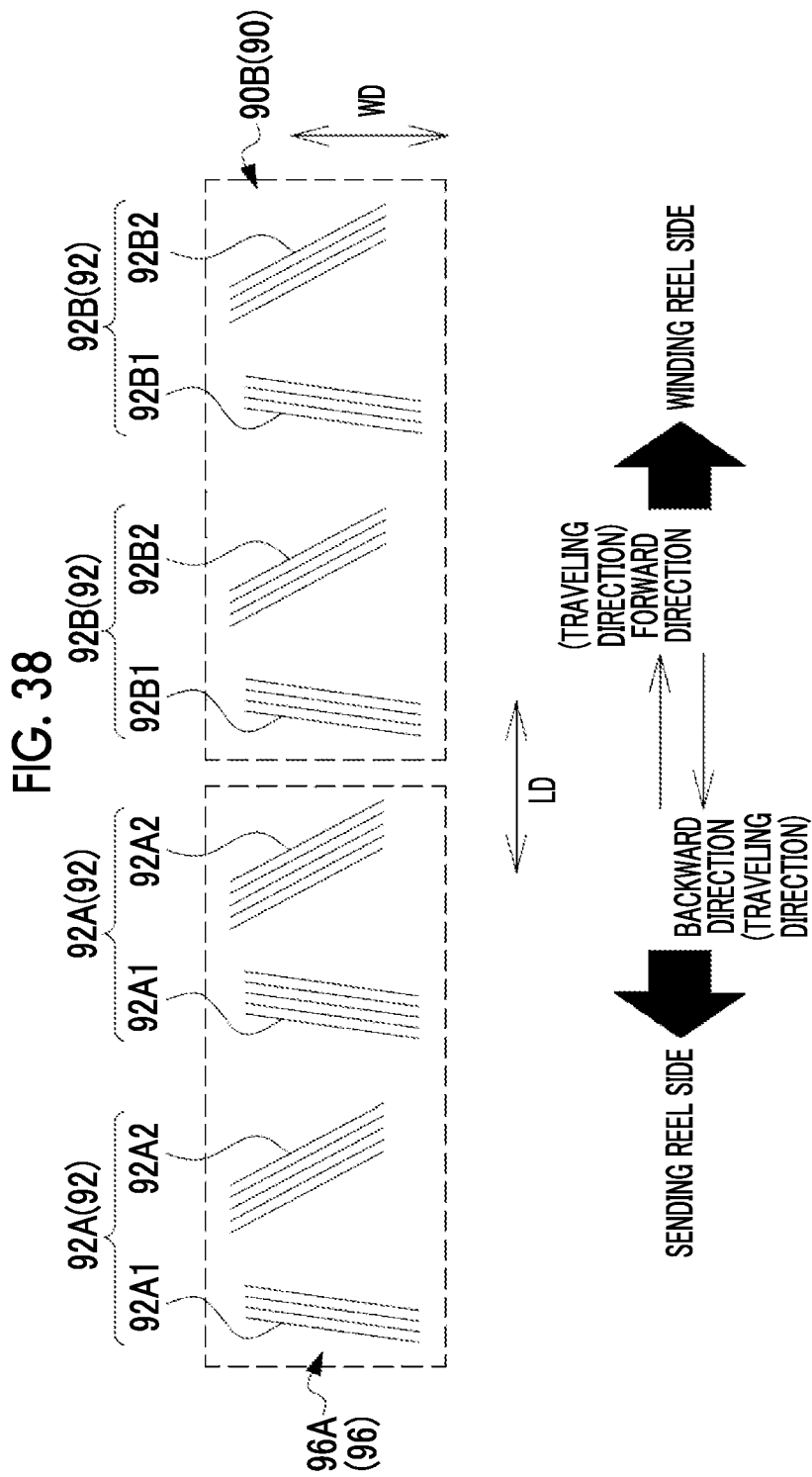
FIG. 38 is a conceptual diagram showing the ninth modification example, and is a conceptual diagram showing an example of an aspect of the servo pattern included in the magnetic tape.

As an example, as shown in FIG. 38, the servo pattern 90 consists of a linear magnetization region pair 92. The linear magnetization region pair 92 is classified into a linear magnetization region pair 92A and a linear magnetization region pair 92B. The servo pattern 90A consists of a set of linear magnetization region pairs 92A. The set of linear magnetization region pairs 92A are disposed in a state of being adjacent to each other along the longitudinal direction LD of the magnetic tape MT.

In the example shown in FIG. 38, linear magnetization regions 92A1 and 92A2 are shown as an example of the linear magnetization region pair 92A. The linear magnetization region pair 92A is configured in the same manner as the linear magnetization region pair 86A (see FIG. 34) described in the eighth modification example, and has the same geometrical characteristic as the linear magnetization region pair 86A. That is, the linear magnetization region 92A1 is configured in the same manner as the linear magnetization region 86A1 (see FIG. 34) described in the eighth modification example and has the same geometrical characteristic as the linear magnetization region 86A1, and the linear magnetization region 92A2 is configured in the same manner as the linear magnetization region 86A2 (see FIG. 34) described in the eighth modification example and has the same geometrical characteristic as the linear magnetization region 86A2.

In the example shown in FIG. 38, the linear magnetization region pair 92A is an example of a "linear magnetization region pair" according to the technology of the present disclosure, the linear magnetization region 92A1 is an example of a "first linear magnetization region" according to the technology of the present disclosure, and the linear magnetization region 92A2 is an example of a "second linear magnetization region" according to the technology of the present disclosure.

The servo pattern 90B consists of a set of linear magnetization region pairs 92B. The set of linear magnetization region pairs 92B are disposed in a state of being adjacent to each other along the longitudinal direction LD of the magnetic tape MT.

In the example shown in FIG. 38, linear magnetization regions 92B1 and 92B2 are shown as an example of the linear magnetization region pair 92B. The linear magnetization region pair 92B is configured in the same manner as the linear magnetization region pair 86B (see FIG. 34) described in the eighth modification example, and has the same geometrical characteristic as the linear magnetization region pair 86B. That is, the linear magnetization region 92B1 is configured in the same manner as the linear magnetization region 86B1 (see FIG. 34) described in the eighth modification example and has the same geometrical characteristic as the linear magnetization region 86B1, and the linear magnetization region 92B2 is configured in the same manner as the linear magnetization region 86B2 (see FIG. 34) described in the eighth modification example and has the same geometrical characteristic as the linear magnetization region 86B2.

In the example shown in FIG. 38, the linear magnetization region pair 92B is an example of a "linear magnetization region pair" according to the technology of the present disclosure, the linear magnetization region 92B1 is an example of a "first linear magnetization region" according to the technology of the present disclosure, and the linear magnetization region 92B2 is an example of a "second linear magnetization region" according to the technology of the present disclosure.

Tenth Modification Example

Figure 39:
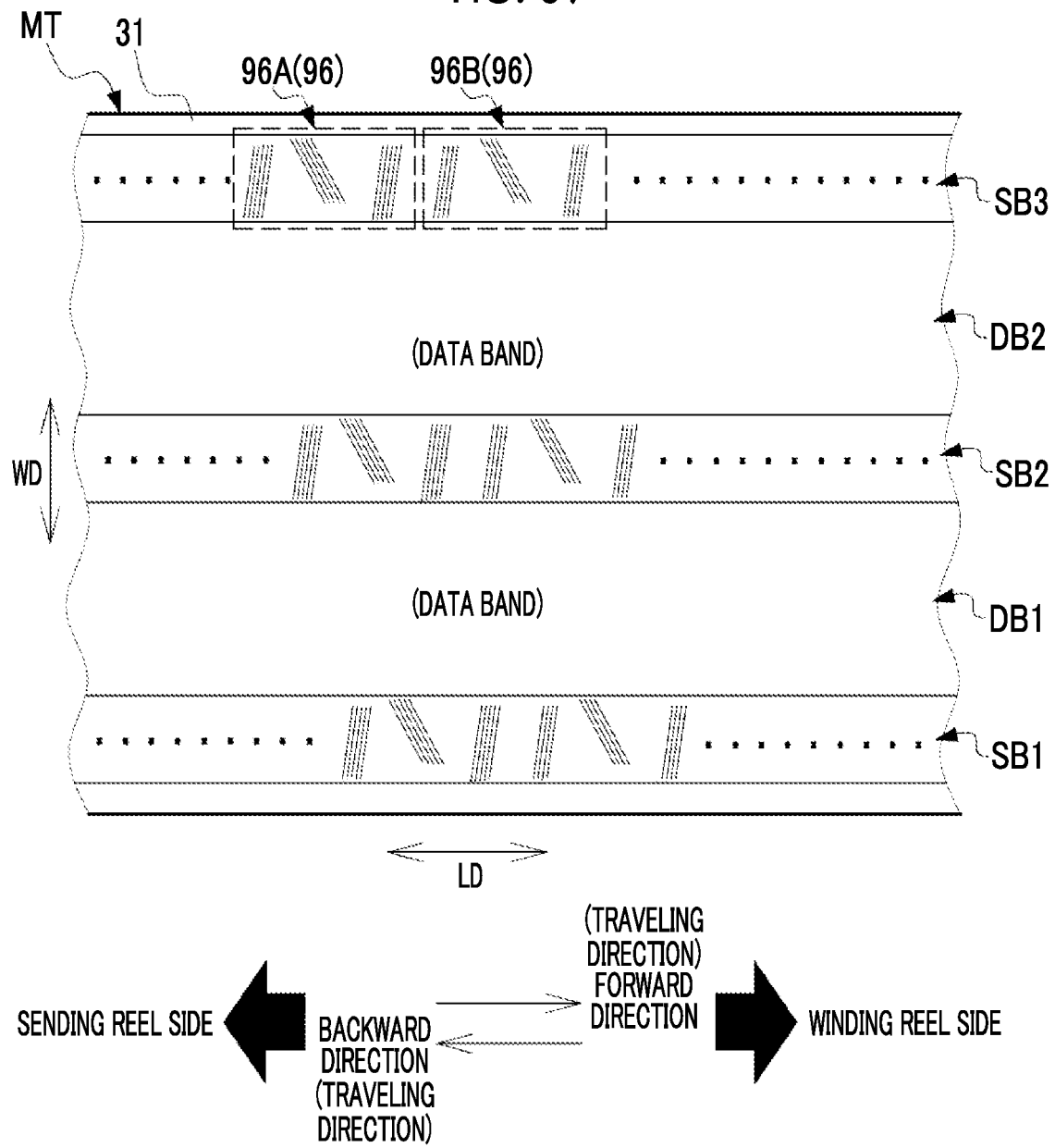
FIG. 39 is a conceptual diagram showing a tenth modification example, and is a conceptual diagram showing a modification example of the magnetic tape according to the embodiment (conceptual diagram showing an example of an aspect in which the magnetic tape is observed from the front surface side of the magnetic tape).

In the example shown in FIG. 37, the form example has been described in which the plurality of M-shaped servo patterns 90 are recorded in the servo band SB along the longitudinal direction LD of the magnetic tape MT, but the technology of the present disclosure is not limited to this. For example, as shown in FIG. 39, a servo pattern 96 may be an N-shaped magnetized servo pattern. A plurality of servo patterns 96 are recorded in the servo band SB along the longitudinal direction LD of the magnetic tape MT. Similarly to the plurality of servo patterns 90 (see FIG. 37), the plurality of servo patterns 96 are disposed at regular intervals along the longitudinal direction LD of the magnetic tape MT.

In the example shown in FIG. 39, servo patterns 96A and 96B are shown as an example of the set of servo patterns 96. Each of the servo patterns 96A and 96B is an N-shaped magnetized servo pattern. The servo patterns 96A and 96B are adjacent to each other along the longitudinal direction LD of the magnetic tape MT. The servo pattern 96A is positioned on the upstream side in the forward direction, and the servo pattern 96B is positioned on the downstream side in the forward direction.

Figure 40:
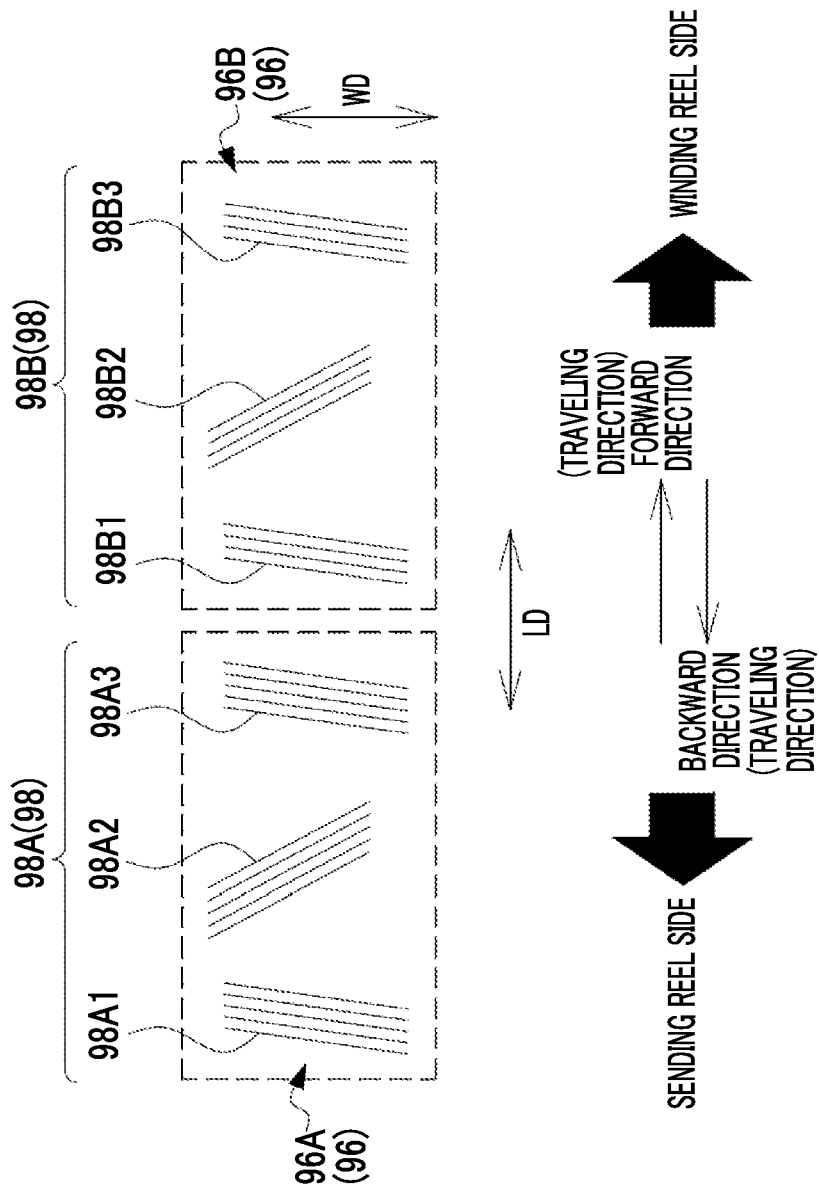
FIG. 40 is a conceptual diagram showing the tenth modification example, and is a conceptual diagram showing an example of an aspect of the servo pattern included in the magnetic tape.

As an example, as shown in FIG. 40, the servo pattern 96 consists of a linear magnetization region group 98. The linear magnetization region group 98 is classified into a linear magnetization region group 98A and a linear magnetization region group 98B.

The servo pattern 96A consists of the linear magnetization region group 98A. The linear magnetization region group 98A consists of linear magnetization regions 98A1, 98A2, and 98A3. The linear magnetization regions 98A1, 98A2, and 98A3 are disposed in a state of being adjacent to each other along the longitudinal direction LD of the magnetic tape MT. The linear magnetization regions 98A1, 98A2, and 98A3 are disposed in the order of the linear magnetization regions 98A1, 98A2, and 98A3 from the upstream side in the forward direction.

The linear magnetization regions 98A1 and 98A2 are configured in the same manner as the linear magnetization region pair 92A shown in FIG. 38, and have the same geometrical characteristics as the linear magnetization region pair 92A. That is, the linear magnetization region 98A1 is configured in the same manner as the linear magnetization region 92A1 shown in FIG. 38, and has the same geometrical characteristic as the linear magnetization region 92A1, and the linear magnetization region 98A2 is configured in the same manner as the linear magnetization region 92A2 shown in FIG. 38, and has the same geometrical characteristic as the linear magnetization region 92A2. In addition, the linear magnetization region 98A3 is configured in the same manner as the linear magnetization region 92A1, and has the same geometrical characteristic as the linear magnetization region 92A1.

In the example shown in FIG. 40, the linear magnetization regions 98A1 and 98A2 are examples of a "linear magnetization region pair" according to the technology of the present disclosure, and in this case, the linear magnetization region 98A1 is an example of a "first linear magnetization region" according to the technology of the present disclosure, and the linear magnetization region 98A2 is an example of a "second linear magnetization region" according to the technology of the present disclosure. In addition, the linear magnetization regions 98A2 and 98A3 are also examples of a "linear magnetization region pair" according to the technology of the present disclosure, and in this case, the linear magnetization region 98A3 is an example of a "first linear magnetization region" according to the technology of the present disclosure, and the linear magnetization region 98A2 is an example of a "second linear magnetization region" according to the technology of the present disclosure.

The servo pattern 96B consists of the linear magnetization region group 98B. The linear magnetization region group 98B consists of linear magnetization regions 98B1, 98B2, and 98B3. The linear magnetization regions 98B1, 98B2, and 98B3 are disposed in a state of being adjacent to each other along the longitudinal direction LD of the magnetic tape MT. The linear magnetization regions 98B1, 98B2, and 98B3 are disposed in the order of the linear magnetization regions 98B1, 98B2, and 98B3 from the upstream side in the forward direction.

The linear magnetization regions 98B1 and 98B2 are configured in the same manner as the linear magnetization region pair 92B shown in FIG. 38, and have the same geometrical characteristics as the linear magnetization region pair 92B. That is, the linear magnetization region 98B1 is configured in the same manner as the linear magnetization region 92B1 shown in FIG. 38, and has the same geometrical characteristic as the linear magnetization region 92B1, and the linear magnetization region 98B2 is configured in the same manner as the linear magnetization region 92B2 shown in FIG. 38, and has the same geometrical characteristic as the linear magnetization region 92B2. In addition, the linear magnetization region 98B3 is configured in the same manner as the linear magnetization region 92B1, and has the same geometrical characteristic as the linear magnetization region 92B1.

In the example shown in FIG. 40, the linear magnetization regions 98B1 and 98B2 are examples of a "linear magnetization region pair" according to the technology of the present disclosure, and in this case, the linear magnetization region 98B1 is an example of a "first linear magnetization region" according to the technology of the present disclosure, and the linear magnetization region 98B2 is an example of a "second linear magnetization region" according to the technology of the present disclosure. In addition, the linear magnetization regions 98B2 and 98B3 are also examples of a "linear magnetization region pair" according to the technology of the present disclosure, and in this case, the linear magnetization region 98B3 is an example of a "first linear magnetization region" according to the technology of the present disclosure, and the linear magnetization region 98B2 is an example of a "second linear magnetization region" according to the technology of the present disclosure.

Eleventh Modification Example

In the embodiment described above, the form example has been described in which the servo format information SF is stored in the cartridge memory 24, but the technology of the present disclosure is not limited to this. In an eleventh modification example, the servo format information SF is stored in the magnetic tape MT. The magnetic tape MT is an example of a "storage medium" according to the technology of the present disclosure.

Figure 41:
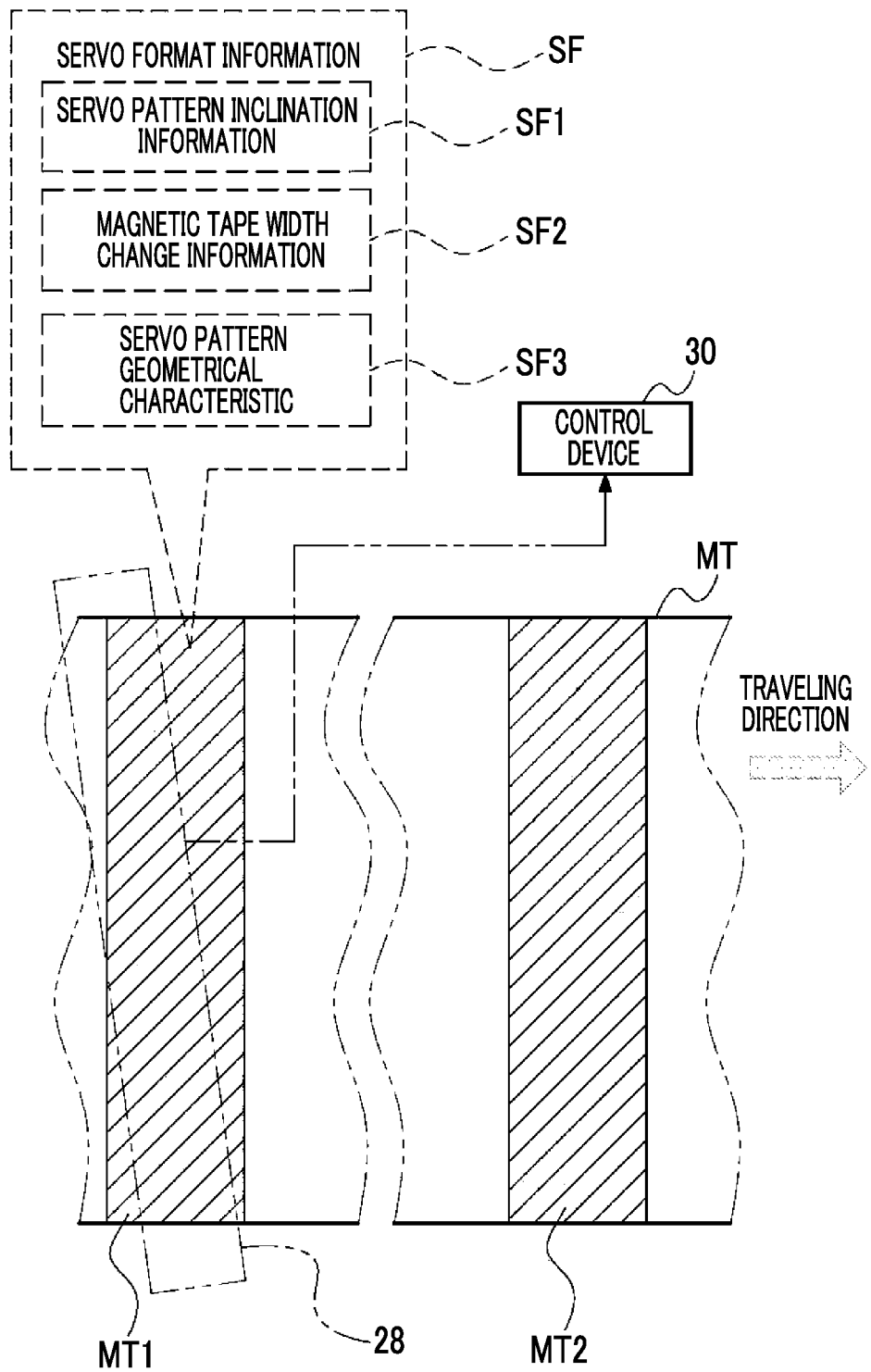
FIG. 41 is a conceptual diagram showing an eleventh modification example, and is a conceptual diagram showing an example of an aspect in which the servo format information is stored in the magnetic tape.

As an example, as shown in FIG. 41, the servo format information SF is stored in the BOT region MT1 provided at the beginning of the magnetic tape MT. The control device 30 acquires a data band signal (that is, a signal indicating the servo format information SF) which is a result of reading the data band DB of the BOT region MT1 by the data read/write element DRW (see FIG. 6). The control device 30 performs the servo control, the skew angle control, and/or the tension control. It should be noted that the servo format information SF may be recorded in the EOT region MT2 provided at the end of the magnetic tape MT, or the servo format information SF may be recorded in the BOT region MT1 and the EOT region MT2. An aspect may be adopted in which a part of the servo format information SF is recorded in the magnetic tape MT and a remainder of the servo format information SF is stored in the cartridge memory 24.

As described above, according to the eleventh modification example, the servo format information SF is recorded in the BOT region MT1 of the magnetic tape MT. Therefore, with the present configuration, it is possible to more easily realize the storage of the servo format information SF than in case in which a separate storage medium is provided for the magnetic tape cartridge 12.

Twelfth Modification Example

Figure 42:
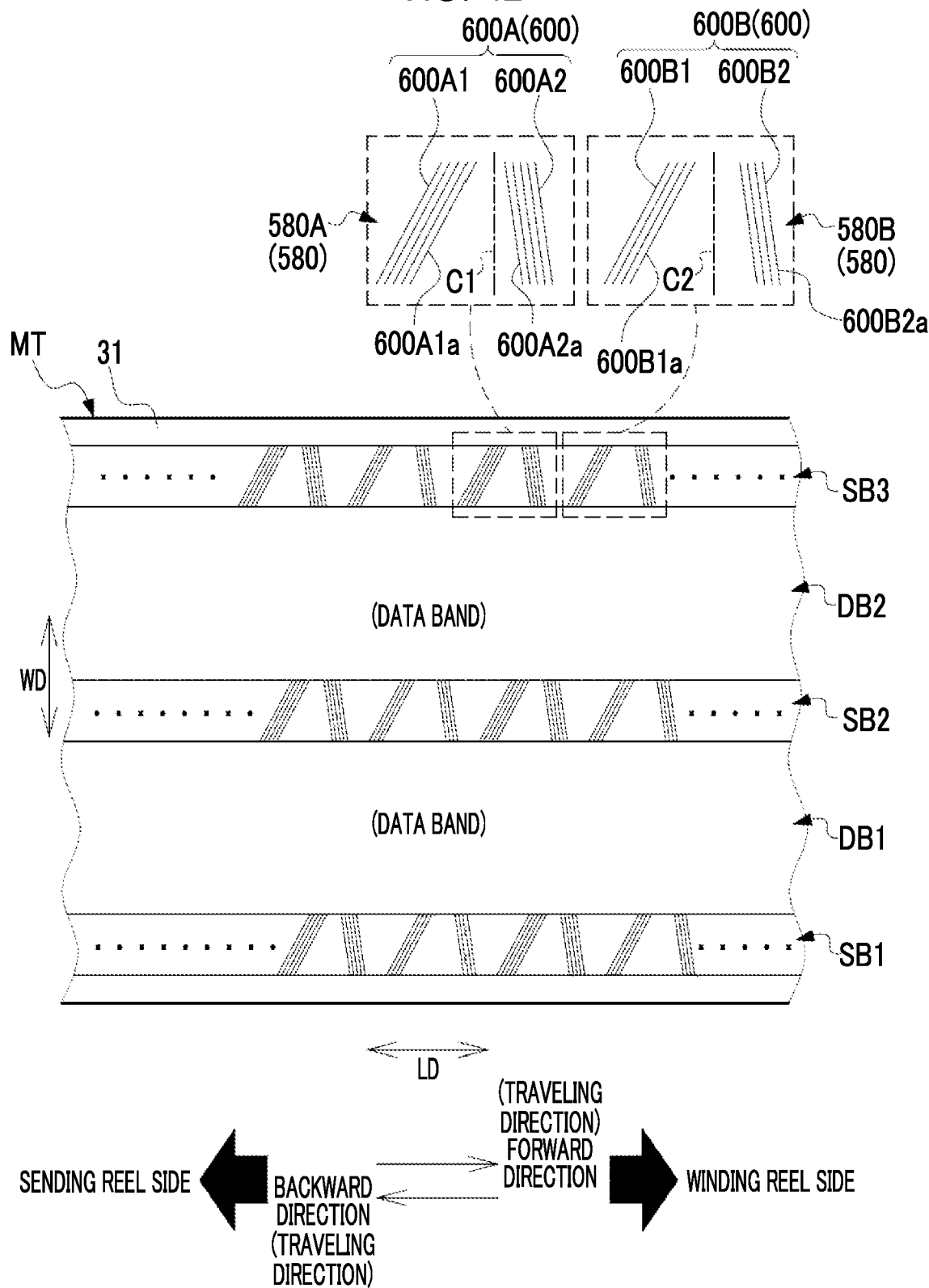
FIG. 42 is a conceptual diagram showing a twelfth modification example, and is a conceptual diagram showing an example of an aspect of the servo pattern included in the magnetic tape.

In the embodiment described above, the form example has been described in which, in the servo pattern 58, the linear magnetization region 60A1 has a steeper inclined angle with respect to the imaginary straight line C1 than the linear magnetization region 60A2, but the technology of the present disclosure is not limited to this. For example, as shown in FIG. 42, a linear magnetization region 600A2 may have a steeper inclined angle with respect to the imaginary straight line C1 than a linear magnetization region 600A1. A plurality of servo patterns 580 are recorded in the servo band SB along the longitudinal direction LD of the magnetic tape MT. The plurality of servo patterns 580 are disposed at regular intervals along the longitudinal direction LD of the magnetic tape MT, similarly to the plurality of servo patterns 58.

The servo pattern 580 consists of a linear magnetization region pair 600. In a twelfth modification example, the linear magnetization region pair 600 is an example of a "linear magnetization region pair" according to the technology of the present disclosure.

The linear magnetization region pair 600 is classified into a linear magnetization region pair 600A and a linear magnetization region pair 600B. That is, the linear magnetization region pair 600 is different from the linear magnetization region pair 60 in that the linear magnetization region pair 600A is provided instead of the linear magnetization region pair 60A, and the linear magnetization region pair 600B is provided instead of the linear magnetization region pair 60B.

The servo pattern 580A consists of the linear magnetization region pair 600A. The linear magnetization region pair 600A is different from the linear magnetization region pair 60A in that the linear magnetization region 600A1 is provided instead of the linear magnetization region 60A1, and the linear magnetization region 600A2 is provided instead of the linear magnetization region 60A2. Each of the linear magnetization regions 600A1 and 600A2 is a linearly magnetized region. In the twelfth modification example, the linear magnetization region 600A1 is an example of a "second linear magnetization region" according to the technology of the present disclosure, and the linear magnetization region 600A2 is a "first linear magnetization region" according to the technology of the present disclosure.

The linear magnetization regions 600A1 and 600A2 are inclined in opposite directions with respect to the imaginary straight line C1. The linear magnetization regions 600A1 and 600A2 are not parallel to each other and are inclined at different angles with respect to the imaginary straight line C1. The linear magnetization region 600A2 has a steeper inclined angle with respect to the imaginary straight line C1 than the linear magnetization region 600A1. Here, "steep" means that, for example, an angle of the linear magnetization region 600A2 with respect to the imaginary straight line C1 is smaller than an angle of the linear magnetization region 600A1 with respect to the imaginary straight line C1. In addition, a total length of the linear magnetization region 600A2 is shorter than a total length of the linear magnetization region 600A1.

The linear magnetization region 600A1 is different from the linear magnetization region 60A1 in that a plurality of magnetization straight lines 600A1$a$ are provided instead of the plurality of magnetization straight lines 60A1$a$. The linear magnetization region 600A2 is different from the linear magnetization region 60A2 in that a plurality of magnetization straight lines 600A2$a$ are provided instead of the plurality of magnetization straight lines 60A2$a$.

The plurality of magnetization straight lines 600A1$a$ are included in the linear magnetization region 600A1, and the plurality of magnetization straight lines 600A2$a$ are included in the linear magnetization region 600A2. The number of the magnetization straight lines 600A1$a$ included in the linear magnetization region 600A1 is the same as the number of the magnetization straight lines 600A2$a$ included in the linear magnetization region 600A2.

The linear magnetization region 600A1 is a linear magnetization region corresponding to a first line symmetry region. The first line symmetry region refers to a region in which the linear magnetization region 60A2 (see FIG. 9) described in the first embodiment is formed line-symmetrically with respect to the imaginary straight line C1. That is, the linear magnetization region 600A1 can be said to be a linear magnetization region formed by a geometrical characteristic of a mirror image of the linear magnetization region 60A2 (see FIG. 9) (that is, geometrical characteristic obtained by performing the mirror image with respect to the linear magnetization region 60A2 (see FIG. 9) with the imaginary straight line C1 as a line symmetry axis).

The linear magnetization region 600A2 is a linear magnetization region corresponding to a second line symmetry region. The second line symmetry region refers to a region in which the linear magnetization region 60A1 (see FIG. 9) described in the first embodiment is formed line-symmetrically with respect to the imaginary straight line C1. That is, the linear magnetization region 600A2 can be said to be a linear magnetization region formed by a geometrical characteristic of a mirror image of the linear magnetization region 60A1 (see FIG. 9) (that is, geometrical characteristic obtained by performing the mirror image with respect to the linear magnetization region 60A1 (see FIG. 9) with the imaginary straight line C1 as a line symmetry axis).

That is, in the example shown in FIG. 10, the geometrical characteristic of the imaginary linear region pair 62 obtained by aligning the positions of both ends of the imaginary linear region 62A and the positions of both ends of the imaginary linear region 62B in a case in which the entirety of the imaginary linear region pair 62 is inclined with respect to the imaginary straight line C1 by inclining the symmetry axis SA1 of the imaginary linear regions 62A and 62B with respect to the imaginary straight line C1 at the angle α clockwise as viewed from the paper surface side of FIG. 10 with the center O1 as the rotation axis corresponds to the geometrical characteristic of the servo pattern 580A.

The servo pattern 580B consists of the linear magnetization region pair 600B. The linear magnetization region pair 600B is different from the linear magnetization region pair 60B in that the linear magnetization region 600B1 is provided instead of the linear magnetization region 60B1, and the linear magnetization region 600B2 is provided instead of the linear magnetization region 60B2. Each of the linear magnetization regions 600B1 and 600B2 is a linearly magnetized region. In the twelfth modification example, the linear magnetization region 600B1 is an example of a "second linear magnetization region" according to the technology of the present disclosure, and the linear magnetization region 600B2 is a "first linear magnetization region" according to the technology of the present disclosure.

The linear magnetization regions 600B1 and 600B2 are inclined in opposite directions with respect to the imaginary straight line C2. The linear magnetization regions 600B1 and 600B2 are not parallel to each other and are inclined at different angles with respect to the imaginary straight line C2. The linear magnetization region 600B2 has a steeper inclined angle with respect to the imaginary straight line C2 than the linear magnetization region 600B1. Here, "steep" means that, for example, an angle of the linear magnetization region 600B2 with respect to the imaginary straight line C2 is smaller than an angle of the linear magnetization region 600B1 with respect to the imaginary straight line C2.

The plurality of magnetization straight lines 600B1$a$ are included in the linear magnetization region 600B1, and the plurality of magnetization straight lines 600B2$a$ are included in the linear magnetization region 600B2. The number of the magnetization straight lines 600B1$a$ included in the linear magnetization region 600B1 is the same as the number of the magnetization straight lines 600B2$a$ included in the linear magnetization region 600B2.

The total number of the magnetization straight lines 600B1$a$ and 600B2$a$ included in the servo pattern 580B is different from the total number of the magnetization straight lines 600A1$a$ and 600A2$a$ included in the servo pattern 580A. In the example shown in FIG. 42, the total number of the magnetization straight lines 600A1$a$ and 600A2$a$ included in the servo pattern 580A is ten, whereas the total number of the magnetization straight lines 600B1a and 600B2a included in the servo pattern 580B is eight.

The linear magnetization region 600B1 is a set of magnetization straight lines 600B1a, which are four magnetized straight lines, and the linear magnetization region 600B2 is a set of magnetization straight lines 600B2a, which are four magnetized straight lines. In the servo band SB, the positions of both ends of the linear magnetization region 600B1 (that is, the positions of both ends of each of the four magnetization straight lines 600B1a) and the positions of both ends of the linear magnetization region 600B2 (that is, the positions of both ends of each of the four magnetization straight lines 600B2a) are aligned in the width direction WD.

As described above, the geometrical characteristic of the servo pattern 580A corresponds to the geometrical characteristic of the mirror image of the linear magnetization region 60A2 (see FIG. 9) and the geometrical characteristic of the mirror image of the linear magnetization region 60A2 (see FIG. 9) (that is, geometrical characteristic of the mirror image of the servo pattern 58A (see FIG. 9) shown in FIG. 9), and the geometrical characteristic of the servo pattern 580B corresponds to the geometrical characteristic of the mirror image of the linear magnetization region 60B2 (see FIG. 9) and the geometrical characteristic of the mirror image of the linear magnetization region 60B2 (see FIG. 9) (that is, geometrical characteristic of the mirror image of the servo pattern 58B (see FIG. 9) shown in FIG. 9). However, this is merely an example, and instead of the servo pattern 580, the servo pattern formed by the geometrical characteristic of the mirror image of the servo pattern 72 shown in FIG. 30, the geometrical characteristic of the mirror image of the servo pattern 78 shown in FIG. 32, the geometrical characteristic of the mirror image of the servo pattern 84 shown in FIG. 34, the geometrical characteristic of the mirror image of the servo pattern 90 shown in FIG. 37, or the geometrical characteristic of the mirror image of the servo pattern 96 shown in FIG. 39 may be applied.

EXAMPLES

A PES fluctuation range of the magnetic tape MT was evaluated by using the magnetic tape system 10 according to the present embodiment. The evaluation results were shown in Table 1.

As shown in Table 1 as an example, in Example 1, the information indicating the skew angle of the servo pattern recording head WH (that is, the inclined angle α of the servo pattern 58 in a case in which the servo pattern 58 is recorded) was stored in the cartridge memory 24 as the servo format information SF. Moreover, based on the information indicating the skew angle of the servo pattern recording head WH, the magnetic head skew angle was adjusted to perform the read/write of the data with respect to the magnetic tape MT. As a result, the PES fluctuation range was 16 nm. In Example 2, the inclined angle α of the servo pattern 58 estimated by magnetic development was stored in the cartridge memory 24 as the servo format information SF. Moreover, based on the inclined angle α of the servo pattern 58 estimated by magnetic development, the magnetic head skew angle was adjusted to perform read/write of the data with respect to the magnetic tape MT. As a result, the PES fluctuation range was 13 nm.

In Example 3, the servo format information SF used in Examples 1 and 2 was stored in the cartridge memory 24 as the servo format information SF. Moreover, based on the servo format information SF used in Examples 1 and 2, the magnetic head skew angle was adjusted to perform read/write of the data with respect to the magnetic tape MT. As a result, the PES fluctuation range was 12 nm. In Example 4, as the servo format information SF, in addition to the servo format information SF used in Examples 1 and 2, the ideal waveform signal 67 in accordance with the inclined angle α of the servo pattern 58 was stored in the cartridge memory 24. Moreover, based on the servo format information SF used in Examples 1 and 2 and the ideal waveform signal 67 in accordance with the inclined angle α of the servo pattern 58, the magnetic head skew angle was adjusted to perform read/write with respect to the magnetic tape MT. As a result, the PES fluctuation range was 10 nm.

In Example 5, the magnetic tape width change information SF2 was stored as the servo format information SF in addition to the servo format information SF used in Examples 1 to 4. Moreover, based on the servo format information SF and the magnetic tape width change information SF2 used in Examples 1 to 4, the magnetic head skew angle was adjusted to perform read/write with respect to the magnetic tape MT. As a result, the PES fluctuation range was 8 nm. In Example 6, as the servo format information SF, in addition to the servo format information SF used in Examples 1 to 5, the width adjustment information SF4 was stored in the cartridge memory 24. Moreover, the magnetic

TABLE 1

|  | Example 1 | Example 2 | Example 3 | Example 4 | Example 5 | Example 6 | Comparative Example 1 | Comparative Example 2 |
|---|---|---|---|---|---|---|---|---|
| Information on skew angle of servo pattern recording head | With storage | Without storage | With storage | With storage | With storage | With storage | Without storage | Without storage |
| Information on inclined angle of servo pattern estimated by magnetic development | Without storage | With storage | With storage | With storage | With storage | With storage | Without storage | Without storage |
| Ideal waveform signal | Without storage | Without storage | Without storage | With storage | With storage | With storage | Without storage | Without storage |
| Information on tape width | Without storage | Without storage | Without storage | Without storage | With storage | With storage | Without storage | With storage |
| Width adjustment information for adjusting tape width | Without storage | Without storage | Without storage | Without storage | Without storage | With storage | Without storage | With storage |
| PES fluctuation range (nm) | 16 | 13 | 12 | 10 | 8 | 7 | 23 | 20 | head skew angle was adjusted based on the servo format information SF used in Examples 1 to 5, and the tape width W was adjusted further based on the width adjustment information SF4 to perform read/write with respect to the magnetic tape MT. As a result, the PES fluctuation range was 7 nm. All the PES fluctuation ranges of Examples 1 to 6 were equal to or less than 18 nm which is a preferable range of the PES fluctuation range.

In Comparative Example 1, read/write with respect to the magnetic tape MT was performed without using the servo pattern inclination information SF1 as the servo format information SF. As a result, the PES fluctuation range was 23 nm. In Comparative Example 2, the magnetic tape width change information SF2 and the width adjustment information SF4 were stored in the cartridge memory 24. Moreover, based on the magnetic tape width change information SF2 and the width adjustment information SF4, the tape width W was adjusted to perform read/write with respect to the magnetic tape MT. As a result, the PES fluctuation range was 20 nm. All the PES fluctuation range of Comparative Example 1 and Comparative Example 2 exceeded the preferable range of the PES fluctuation range (that is, equal to or less than 18 nm).

Other Modification Examples

In the embodiment described above, the magnetic tape system 10 has been described in which the magnetic tape cartridge 12 can be inserted and removed with respect to the magnetic tape drive 14, but the technology of the present disclosure is not limited to this. For example, even in a case of the magnetic tape system in which at least one magnetic tape cartridge 12 is loaded in advance into the magnetic tape drive 14 (that is, the magnetic tape system in which at least one magnetic tape cartridge 12 and the magnetic tape drive 14 are integrated in advance), the technology of the present disclosure is established.

In the embodiment described above, the single magnetic head 28 has been described, but the technology of the present disclosure is not limited to this. For example, a plurality of magnetic heads 28 may be disposed on the magnetic tape MT. For example, the magnetic head 28 for reading and at least one magnetic head 28 for writing may be disposed on the magnetic tape MT. The magnetic head 28 for reading may be used for verifying the data recorded in the data band DB by the magnetic head 28 for writing. In addition, one magnetic head on which the magnetic element unit 42 for reading and at least one magnetic element unit 42 for writing are mounted may be disposed on the magnetic tape MT.

In the embodiment described above, the form example has been described in which the servo format information SF is stored in the cartridge memory 24 at the manufacturing stage of the magnetic tape cartridge 12, but the technology of the present disclosure is not limited to this. For example, the servo format information SF may be recorded after the magnetic tape cartridge 12 is shipped, or may be recorded at a stage of using the magnetic tape cartridge 12 (that is, a stage in which read/write of the data is performed with respect to the magnetic tape MT). In addition, the servo format information SF stored in the cartridge memory 24 may be updated.

In addition, in the embodiment described above, the form example has been described in which the PES is calculated by using Expression (1), but the technology of the present disclosure is not limited to this. For example, the PES may be calculated by using Expression (2).

$$\hat{y} = \frac{d}{\tan(\theta_{Ai}) - \tan(\theta_{Bi})} \left( \frac{1}{2} - \frac{\Sigma A_i}{\Sigma B_i} \right) \quad (2)$$

$\hat{y}$: PES $d$: Pitch width of servo pattern in traveling direction $A_i$: Second distance $B_i$: First distance Here, in Expression (2), the meaning of $\Sigma A_i$ refers to, for example, the sum of the second distances obtained from all the magnetization region pairs in one servo pattern 58A. In addition, the meaning of $\Sigma B_i$ refers to, for example, the sum of the first distances obtained from all the magnetization region pairs in one servo pattern 58A. The magnetization region pair refers to a combination of the magnetization straight line 60A1a and the magnetization straight line 60B1a having a corresponding positional relationship.

In addition, in the embodiment described above, the form example has been described in which the ideal waveform signal 67 is the ideal waveform of the servo pattern signal which is the result read by the servo reading element SR provided in the magnetic head 28, but technology of the present disclosure is not limited to this. For example, the ideal waveform signal may be the ideal waveform signal indicating the ideal waveform of the servo pattern signal which is the result read by the verification head VH.

Figure 43:
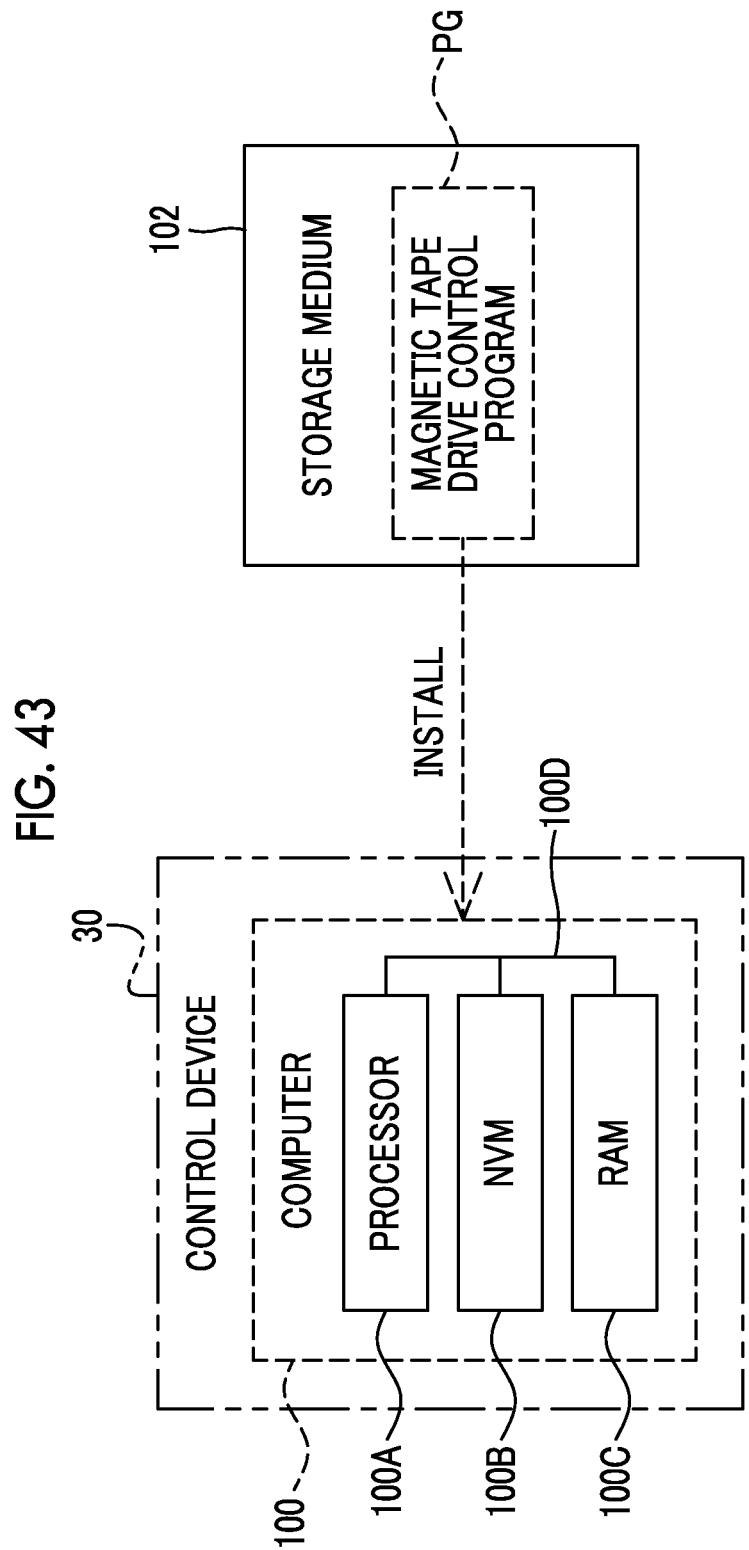
FIG. 43 is a conceptual diagram showing an example of an aspect in which a servo pattern detection program stored in a storage medium is installed in a computer of the control device.

In addition, in the embodiment described above, the form example has been described in which the control device 30 (see FIG. 3) is realized by the ASIC, but the technology of the present disclosure is not limited to this, and the control device 30 may be realized by a software configuration. In addition, only the position detection unit 30B provided in the control device 30 may be realized by the software configuration. In a case in which the position detection unit 30B is realized by the software configuration, for example, as shown in FIG. 43, the position detection unit 30B comprises a computer 100. The computer 100 includes a processor 100A (for example, a single CPU or a plurality of CPUs), an NVM 100B, and a RAM 100C. The processor 100A, the NVM 100B, and the RAM 100C are connected to a bus 100D. A servo pattern detection program PG is stored in a portable storage medium 102 (for example, an SSD or a USB memory) which is a computer-readable non-transitory storage medium.

The servo pattern detection program PG stored in the storage medium 102 is installed in the computer 100. The processor 100A executes the servo pattern detection processing (see FIG. 19) in accordance with the servo pattern detection program PG.

In addition, the servo pattern detection program PG may be stored in a storage device of another computer or server device connected to the computer 100 via a communication network (not shown), and the servo pattern detection program PG may be downloaded in response to a request from the position detection unit 30B and installed in the computer 100. It should be noted that the servo pattern detection program PG is an example of a "program" according to the technology of the present disclosure, and the computer 100 is an example of a "computer" according to the technology of the present disclosure.

In the example shown in FIG. 43, although the computer 100 has been described as an example, the technology of the present disclosure is not limited to this, and a device including an ASIC, an FPGA, and/or a PLC may be applied instead of the computer 100. In addition, instead of the computer 100, a hardware configuration and a software configuration may be used in combination.

As the hardware resource for executing the processing of the control device 30 (see FIG. 3) and/or the servo writer controller SW5 (see FIG. 18), various processors shown below can be used. Examples of the processor include the CPU which is a general-purpose processor functioning as the hardware resource for executing the processing by executing software, that is, a program. In addition, examples of the processor include a dedicated electric circuit which is a processor having a circuit configuration designed to be dedicated to executing specific processing, such as an FPGA, a PLC, or an ASIC described as an example. A memory is built in or connected to any processor, and any processor executes the processing by using the memory.

The hardware resource for executing the processing of the control device 30 and/or the servo writer controller SW5 may be composed of one of those various processors or may be composed of a combination of two or more processors of the same type or different types (for example, a combination of a plurality of FPGAs or a combination of a CPU and an FPGA). In addition, the hardware resource for executing the processing of the control device 30 and/or the servo writer controller SW5 may be one processor.

As a configuring example of one processor, first, there is a form in which one processor is composed of a combination of one or more CPUs and software and the processor functions as the hardware resource for executing the processing. Secondly, as represented by SoC, there is a form in which a processor that realizes the functions of the entire system including a plurality of hardware resources for executing the processing with one IC chip is used. As described above, the processing of the control device 30 and/or the servo writer controller SW5 is realized by using one or more of the various processors described above as the hardware resource.

Further, as the hardware structure of these various processors, more specifically, it is possible to use an electric circuit in which circuit elements, such as semiconductor elements, are combined. In addition, the processing of the control device 30 and/or the servo writer controller SW5 is merely an example. Therefore, it is needless to say that unnecessary steps may be deleted, new steps may be added, or the processing order may be changed within a range that does not deviate from the gist.

The description contents and the shown contents above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate understanding of the parts according to the technology of the present disclosure, in the description contents and the shown contents above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All documents, patent applications, and technical standards described in the present specification are incorporated into the present specification by reference to the same extent as in a case in which the individual documents, patent applications, and technical standards are specifically and individually stated to be described by reference.

What is claimed is:

1. A magnetic tape cartridge comprising:
a magnetic tape in which a plurality of servo patterns are recorded along a longitudinal direction; and
a storage medium that is configured to store servo format information including servo pattern inclination information which is information on an inclination of the servo pattern with respect to a first imaginary straight line,
wherein the first imaginary straight line is a straight line along a width direction of the magnetic tape,
the servo pattern is at least one linear magnetization region pair,
the linear magnetization region pair includes a first linear magnetization region which is linearly magnetized, and a second linear magnetization region which is linearly magnetized,
the first linear magnetization region and the second linear magnetization region are inclined in opposite directions with respect to the first imaginary straight line,
the first linear magnetization region has a steeper inclined angle with respect to the first imaginary straight line than the second linear magnetization region, and
the servo pattern inclination information includes information on the inclined angle of the first linear magnetization region with respect to the first imaginary straight line, and information on an inclined angle of the second linear magnetization region with respect to the first imaginary straight line.

2. The magnetic tape cartridge according to claim 1, wherein positions of both ends of the first linear magnetization region and positions of both ends of the second linear magnetization region are aligned in the width direction of the magnetic tape.

3. The magnetic tape cartridge according to claim 2, wherein a total length of the first linear magnetization region is shorter than a total length of the second linear magnetization region.

4. The magnetic tape cartridge according to claim 1, wherein the first linear magnetization region is a set of a plurality of first magnetization straight lines, and the second linear magnetization region is a set of a plurality of second magnetization straight lines.

5. The magnetic tape cartridge according to claim 1, wherein a geometrical characteristic of the linear magnetization region pair on the magnetic tape corresponds to a geometrical characteristic based on a pair of imaginary linear regions inclined line-symmetrically with respect to the first imaginary straight line in a case in which an entirety of the pair of imaginary linear regions is inclined with respect to the first imaginary straight line by inclining a symmetry axis of the pair of imaginary linear regions with respect to the first imaginary straight line.

6. The magnetic tape cartridge according to according to claim 2,
wherein a geometrical characteristic of the linear magnetization region pair on the magnetic tape corresponds to a geometrical characteristic in which positions of both ends of one imaginary linear region of a pair of imaginary linear regions inclined line-symmetrically with respect to the first imaginary straight line and positions of both ends of the other imaginary linear region are aligned in the width direction in a case in which an entirety of the pair of imaginary linear regions is inclined with respect to the first imaginary straight line by inclining a symmetry axis of the pair of imaginary linear regions with respect to the first imaginary straight line.

7. The magnetic tape cartridge according to claim 1,
wherein the servo format information includes an ideal waveform signal indicating an ideal waveform of a servo pattern signal which is a result of reading the servo pattern by a servo reading element.

8. The magnetic tape cartridge according to claim 7,
wherein the ideal waveform is a waveform determined in accordance with an orientation of the servo reading element on the magnetic tape.

9. The magnetic tape cartridge according to claim 8,
wherein the ideal waveform is a waveform determined in accordance with a geometrical characteristic of the servo pattern and the orientation of the servo reading element on the magnetic tape.

10. The magnetic tape cartridge according to claim 7,
wherein the servo reading element is mounted on a magnetic head, and
the ideal waveform is a waveform determined in accordance with an orientation of the magnetic head on the magnetic tape.

11. The magnetic tape cartridge according to claim 10,
wherein the ideal waveform is a waveform determined in accordance with a geometrical characteristic of the servo pattern and the orientation of the magnetic head on the magnetic tape.

12. The magnetic tape cartridge according to claim 1,
wherein the servo format information includes information on a width of the magnetic tape and/or information on a geometrical characteristic of the servo pattern.

13. The magnetic tape cartridge according to claim 1,
wherein the servo format information includes width adjustment information for adjusting a width of the magnetic tape.

14. The magnetic tape cartridge according to claim 13,
wherein the width adjustment information includes information on tension of the magnetic tape in total length direction.

15. The magnetic tape cartridge according to claim 14,
wherein the information on the tension is determined in accordance with the width of the magnetic tape, a characteristic of the magnetic tape itself, a use history of the magnetic tape, a temperature given to the magnetic tape, and/or humidity given to the magnetic tape.

16. The magnetic tape cartridge according to claim 1,
wherein the servo format information includes information on a skew angle which is an angle at which a magnetic head on which a servo reading element that reads the servo pattern is mounted is skewed on the magnetic tape.

17. The magnetic tape cartridge according to claim 16,
wherein the information on the skew angle is determined in accordance with a width of the magnetic tape, a characteristic of the magnetic tape itself, a use history of the magnetic tape, a temperature given to the magnetic tape, and/or humidity given to the magnetic tape.

18. The magnetic tape cartridge according to claim 1,
wherein the magnetic tape is accommodated in a cartridge, and
a noncontact storage medium is provided in the cartridge as the storage medium.

19. The magnetic tape cartridge according to claim 1,
wherein the storage medium is the magnetic tape.

20. A magnetic tape drive comprising:
a processor,
that is configured to:
acquire the servo format information stored in the storage medium provided in the magnetic tape cartridge according to claim 1, and
execute processing in accordance with the acquired servo format information.

21. A detection method of a servo pattern, the method comprising:
acquiring servo format information that is stored in a storage medium provided in a magnetic tape cartridge including a magnetic tape in which a plurality of servo patterns are recorded along a longitudinal direction, and includes servo pattern inclination information which is information on an inclination of the servo pattern with respect to a first imaginary straight line; and
executing processing in accordance with the acquired servo format information;
wherein the first imaginary straight line is a straight line along a width direction of the magnetic tape,
the servo pattern is at least one linear magnetization region pair,
the linear magnetization region pair includes a first linear magnetization region which is linearly magnetized, and a second linear magnetization region which is linearly magnetized,
the first linear magnetization region and the second linear magnetization region are inclined in opposite directions with respect to the first imaginary straight line,
the first linear magnetization region has a steeper inclined angle with respect to the first imaginary straight line than the second linear magnetization region, and
the servo pattern inclination information includes information on the inclined angle of the first linear magnetization region with respect to the first imaginary straight line, and information on an inclined angle of the second linear magnetization region with respect to the first imaginary straight line.

22. A non-transitory storage medium storing a program causing a computer to execute a process, the process comprising:
acquiring servo format information that is stored in a storage medium provided in a magnetic tape cartridge including a magnetic tape in which a plurality of servo patterns are recorded along a longitudinal direction, and includes servo pattern inclination information which is information on an inclination of the servo pattern with respect to a first imaginary straight line; and
executing processing in accordance with the acquired servo format information;
wherein the first imaginary straight line is a straight line along a width direction of the magnetic tape,
the servo pattern is at least one linear magnetization region pair, the linear magnetization region pair includes a first linear magnetization region which is linearly magnetized, and a second linear magnetization region which is linearly magnetized, the first linear magnetization region and the second linear magnetization region are inclined in opposite directions with respect to the first imaginary straight line, the first linear magnetization region has a steeper inclined angle with respect to the first imaginary straight line than the second linear magnetization region, and the servo pattern inclination information includes information on the inclined angle of the first linear magnetization region with respect to the first imaginary straight line, and information on an inclined angle of the second linear magnetization region with respect to the first imaginary straight line.

* * * * *